(12) United States Patent
Takayama et al.

(10) Patent No.: US 8,740,290 B2
(45) Date of Patent: Jun. 3, 2014

(54) STRUCTURE FOR SIDE SECTION OF VEHICLE BODY

(75) Inventors: Yusuke Takayama, Wako (JP); Hitoshi Mizohata, Wako (JP); Takayuki Yamada, Wako (JP); Kazunori Hida, Wako (JP); Yasunori Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/576,231

(22) PCT Filed: Dec. 24, 2010

(86) PCT No.: PCT/JP2010/073391
§ 371 (c)(1),
(2), (4) Date: Jul. 31, 2012

(87) PCT Pub. No.: WO2011/118107
PCT Pub. Date: Sep. 29, 2011

(65) Prior Publication Data
US 2012/0299334 A1 Nov. 29, 2012

(30) Foreign Application Priority Data

Mar. 23, 2010 (JP) ................................. 2010-066767
Mar. 23, 2010 (JP) ................................. 2010-066804
Mar. 31, 2010 (JP) ................................. 2010-083545

(51) Int. Cl.
*B62D 25/02* (2006.01)
*B62D 25/04* (2006.01)

(52) U.S. Cl.
CPC ................ *B62D 25/02* (2013.01); *B62D 25/04* (2013.01); *B62D 25/025* (2013.01)
USPC .............. 296/193.05; 296/146.6; 296/193.06; 296/203.03

(58) Field of Classification Search
USPC ................. 296/146.6, 181.1, 193.01, 193.04, 296/193.05, 193.06, 203.01, 203.03, 205
See application file for complete search history.

(56) References Cited

U.S. PATENT DOCUMENTS 5,938,275 A 8/1999 Kleinhans et al.
6,910,732 B2 * 6/2005 Miyoshi et al. .......... 296/203.03

(Continued)

FOREIGN PATENT DOCUMENTS

| DE | 19531874 C1 | 10/1996 |
|---|---|---|
| JP | S62-102770 | 6/1987 |
| JP | H05-92063 | 12/1993 |
| JP | 06-219335 | 8/1994 |
| JP | 2001-334957 | 12/2001 |

(Continued)

OTHER PUBLICATIONS

European Search Report dated Oct. 1, 2013, EP Application No. 10848499, 4 pages.

*Primary Examiner* — Glenn Dayoan
*Assistant Examiner* — Jason S Daniels
(74) *Attorney, Agent, or Firm* — Rankin, Hill & Clark LLP

(57) ABSTRACT

A vehicle body side part structure having high strength against a load in a frontal collision and a load in a side collision. A side panel outer member (14) is provided with a front pillar lower section (31) which is formed from a high-tensile steel sheet, a front pillar upper section (37*a*) which is formed from a normal steel sheet, and a reinforcement member (38) which is disposed along the front pillar upper section. The upper end (31*a*) of the front pillar lower section (31) is joined to the inner surface of the lower end (37*c*) of the front pillar upper section. The front end (38*a*) of the reinforcement member (38) is joined to the inner surface of the upper end (31*a*) of the front pillar lower section.

15 Claims, 35 Drawing Sheets

(56) References Cited

U.S. PATENT DOCUMENTS

| | | |
|---|---|---|
| 7,032,959 B2 | 4/2006 | Berstecher et al. |
| 8,118,355 B2 * | 2/2012 | Tamura et al. ................ 296/209 |
| 2003/0102697 A1 | 6/2003 | Yakata et al. |
| 2004/0201253 A1 * | 10/2004 | Kitagawa et al. ........ 296/187.03 |
| 2005/0189790 A1 * | 9/2005 | Chernoff et al. ......... 296/193.05 |
| 2006/0175871 A1 * | 8/2006 | Eipper et al. ............. 296/193.04 |
| 2008/0315628 A1 * | 12/2008 | Obayashi ................ 296/193.06 |

FOREIGN PATENT DOCUMENTS

| | | |
|---|---|---|
| JP | 2003-127899 | 5/2003 |
| JP | 2003-127901 | 5/2003 |
| JP | 2004-131011 | 4/2004 |
| JP | 2007-076617 | 3/2007 |
| JP | 2009-061991 | 3/2009 |
| JP | 4328728 | 6/2009 |
| WO | 03/035453 A1 | 5/2003 |

* cited by examiner

FIG. 20
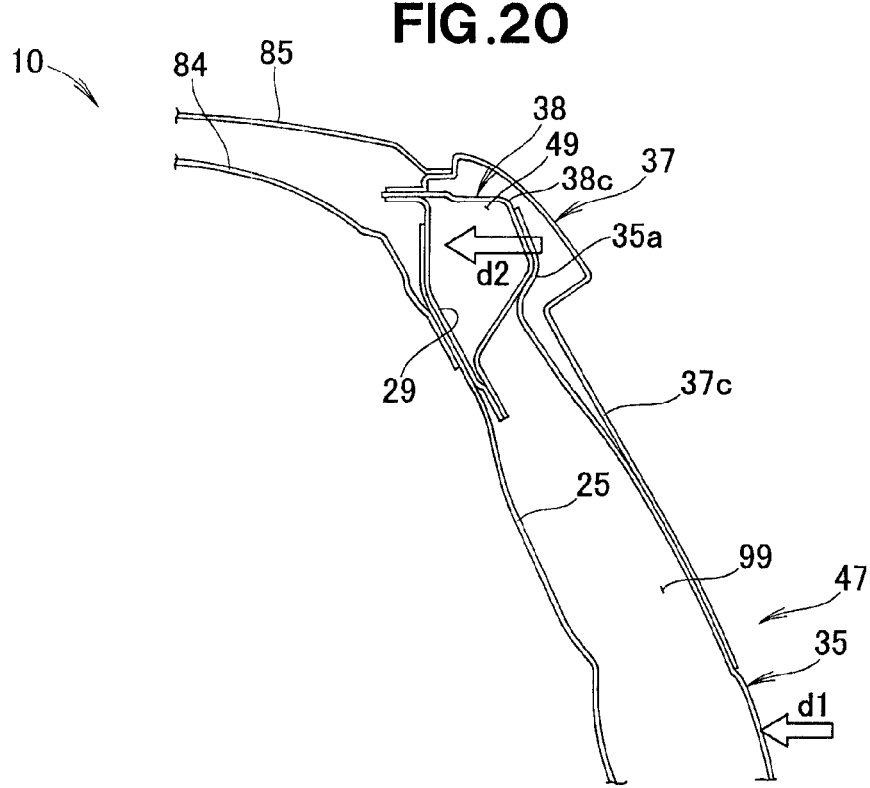
(a)
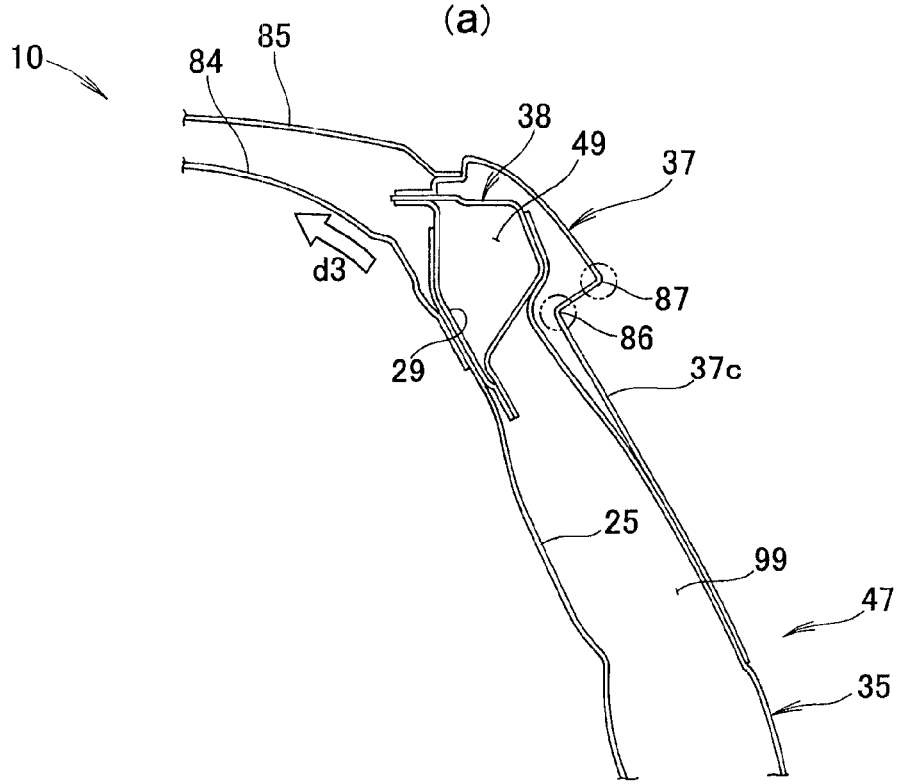
(b)

FIG.29
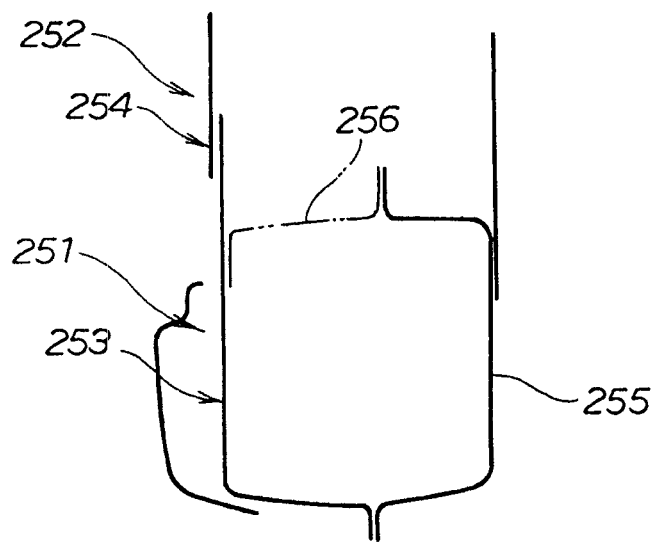
(a) CONVENTIONAL TECHNIQUE 1
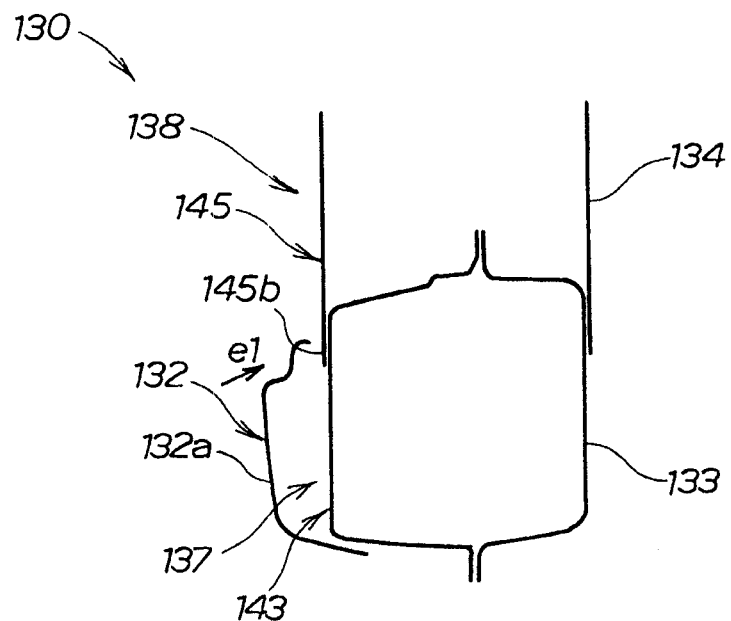
(b) EMBODIMENT

FIG.30
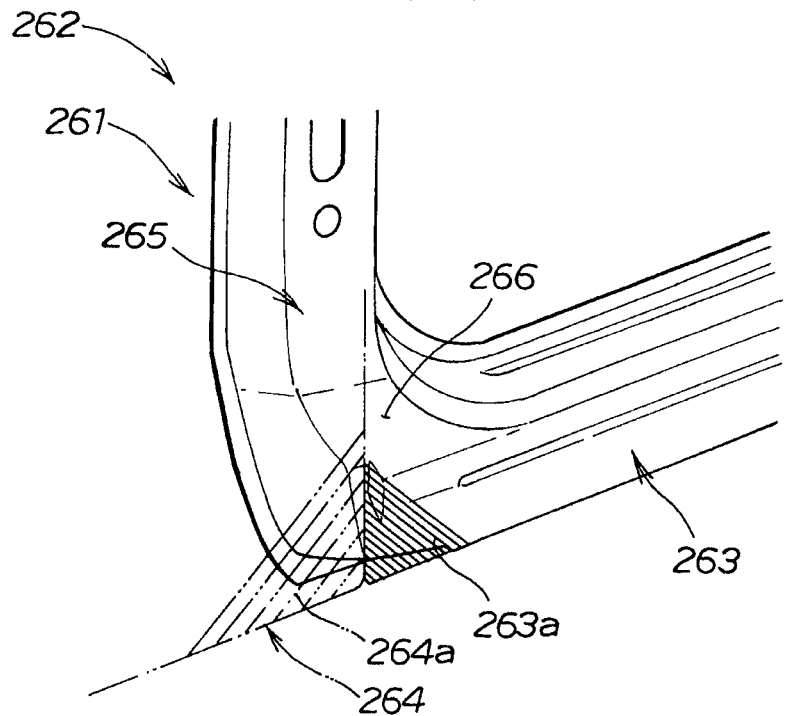
(a) CONVENTIONAL TECHNIQUE 2
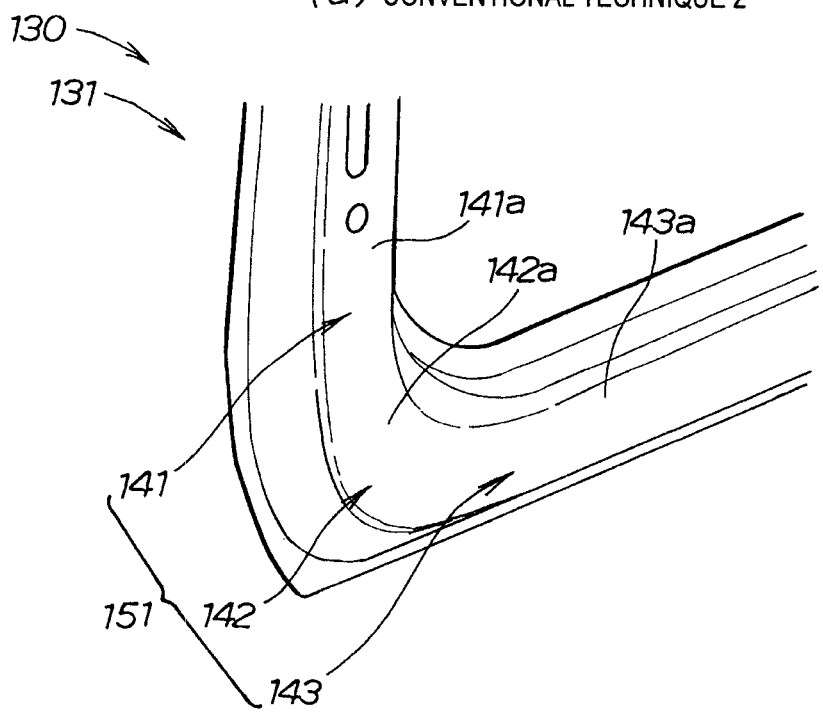
(b) EMBODIMENT

FIG.31
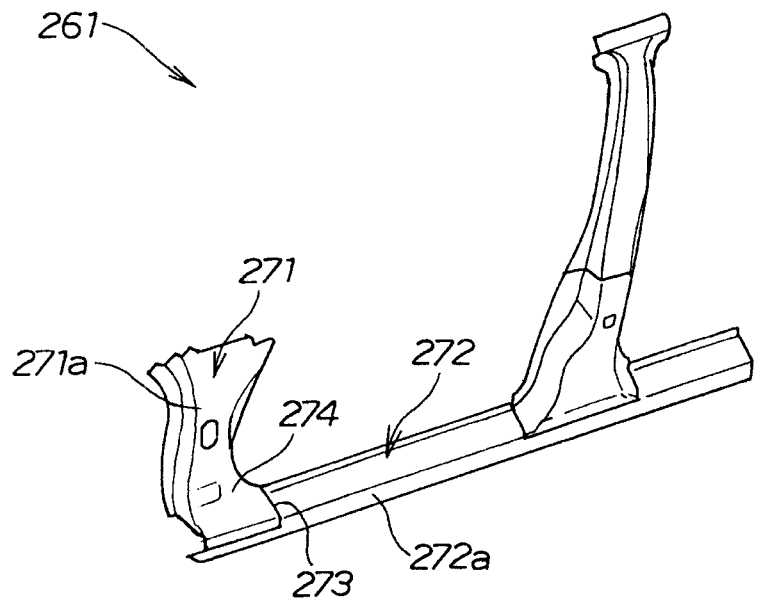
(a) CONVENTIONAL TECHNIQUE 2
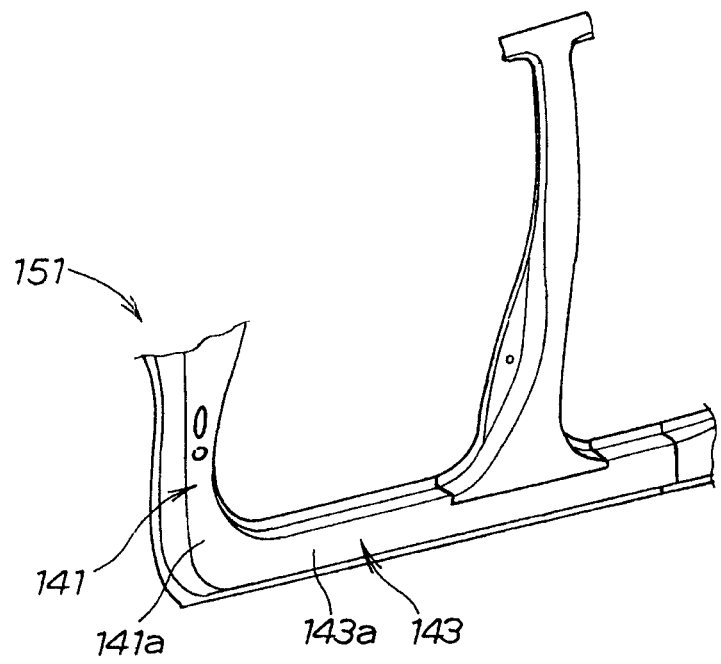
(b) EMBODIMENT

FIG.32
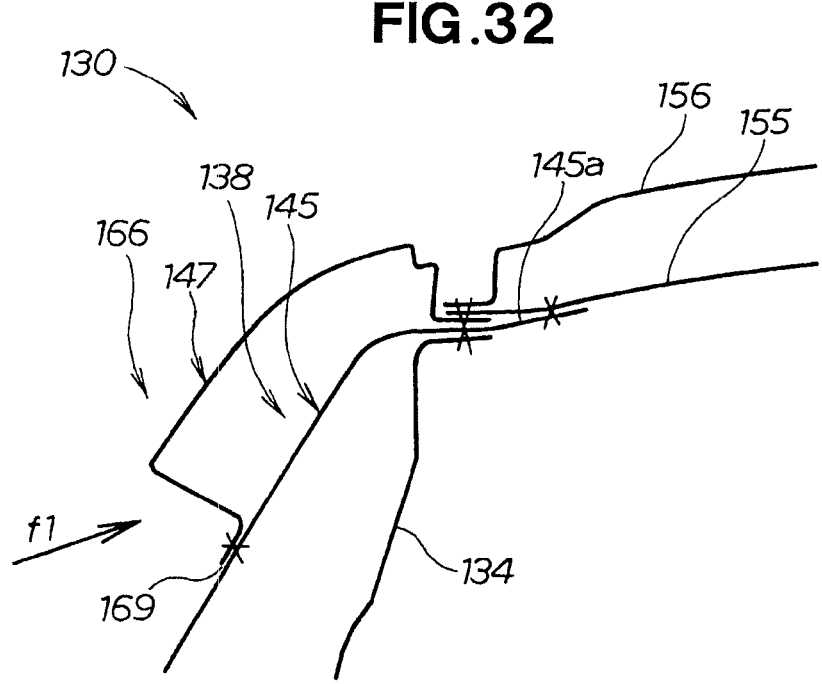
(a)
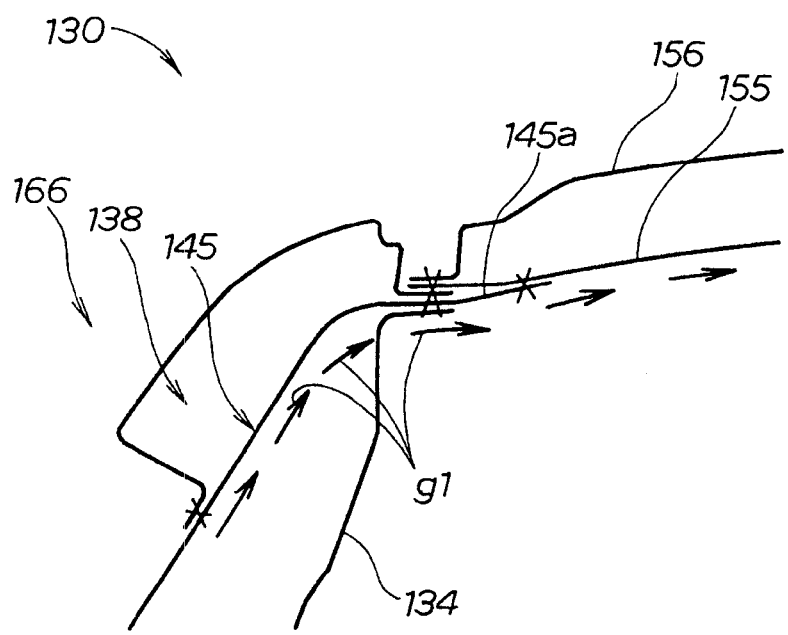
(b)

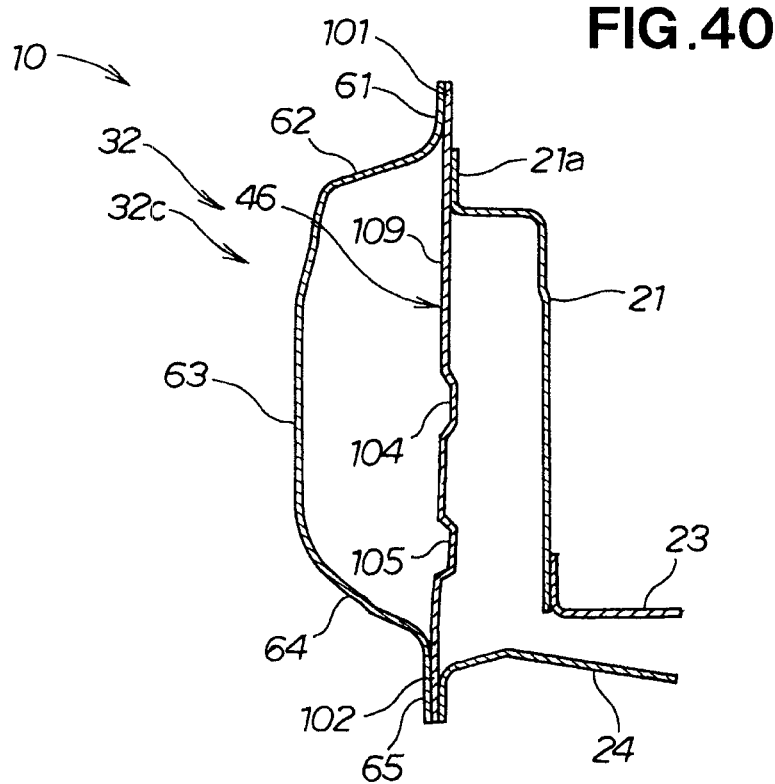
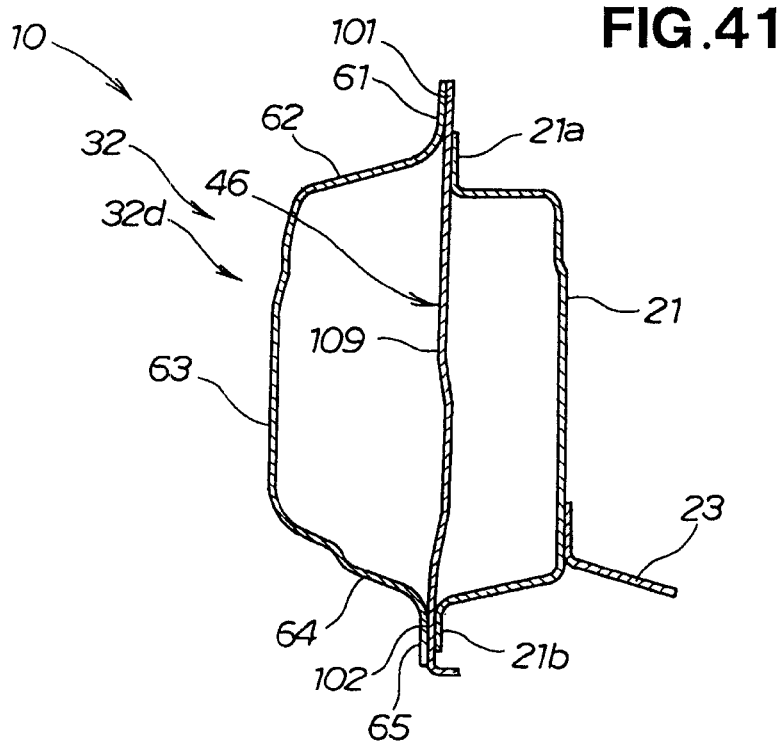

FIG.42
(a) 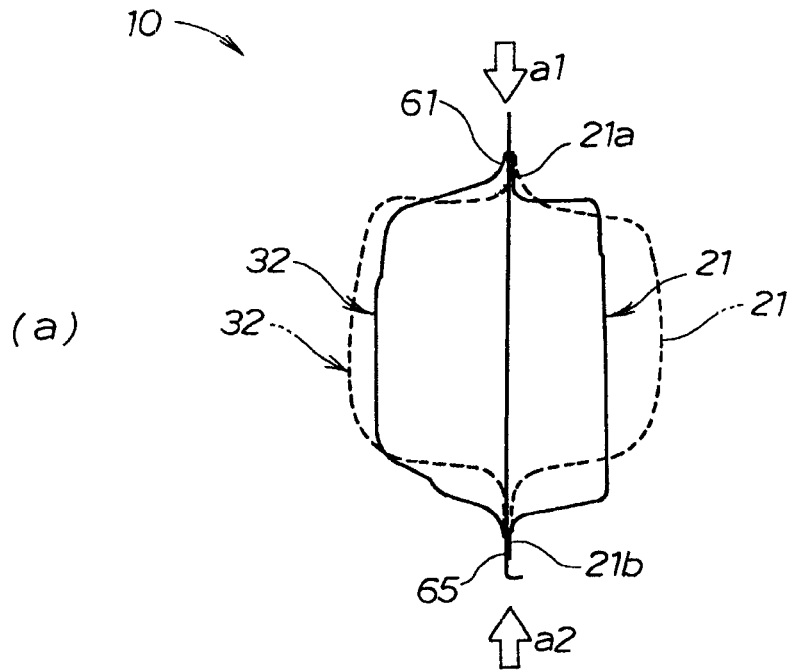
(b) 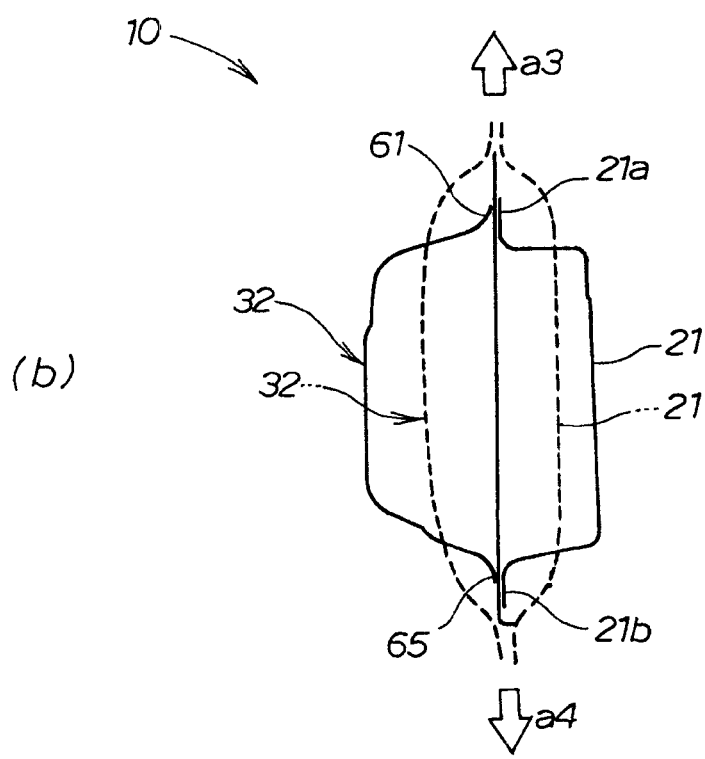

FIG.43
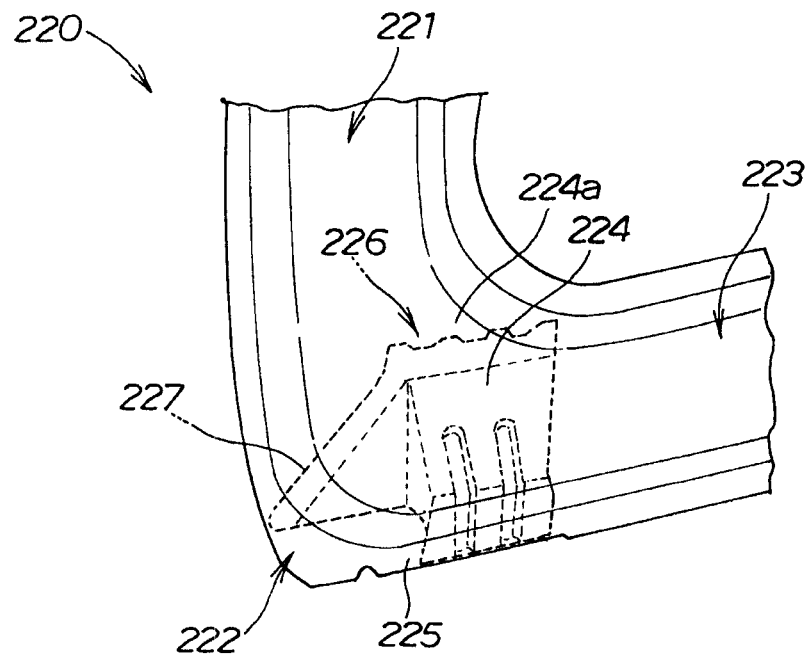
(a) CONVENTIONAL TECHNIQUE
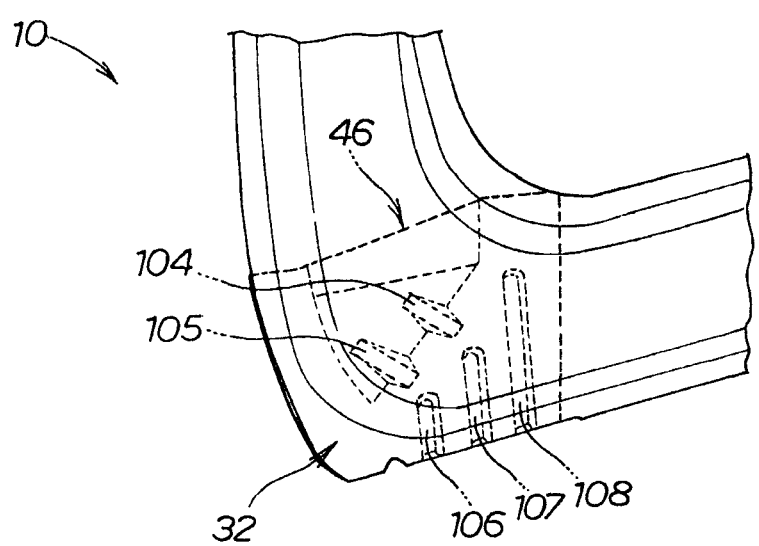
(b) EMBODIMENT

STRUCTURE FOR SIDE SECTION OF VEHICLE BODY

TECHNICAL FIELD

The present invention relates to a vehicle body side part structure provided with a side panel outer member for covering a side of a vehicle body from the outside.

BACKGROUND ART

A vehicle body side part structure includes a side panel outer member and a side panel inner member that are provided with at least one door opening. The side panel outer member and the side panel inner member are joined together so as to form a closed section. The side panel outer member is divided in the longitudinal direction of the vehicle at a portion located rearward of the door opening. A front section of the divided side panel outer member is formed of a high-tensile steel sheet (JIS-SPC590; plate thickness t=0.8 to 1.6 mm), and a rear section of the side panel outer member is formed of an ordinary steel sheet (JIS-SPC270; plate thickness t=0.6 to 0.75 mm).

"SPC" means cold rolled steel sheet. "SPC590" means a cold rolled steel sheet (high-tensile steel sheet) having a tensile strength of 590 MPa or greater. "SPC270" means a cold rolled steel sheet (ordinary steel sheet) having a tensile strength of 270 MPa or greater. A steel sheet having a tensile strength of 340 MPa or greater is a high-tensile steel sheet, and steel sheets other than high-tensile steel sheets are ordinary steel sheets.

In a vehicle body side part structure, forming the front section of the side panel outer member using a high-tensile steel sheet eliminates the need for reinforcement (reinforcing material) and allows for a lighter vehicle body side part structure (see Patent Literature 1, for example).

In the vehicle body side part structure disclosed in Patent Literature 1, a high-tensile steel sheet is used in the front section of the side panel outer member. A high-tensile steel sheet becomes harder and more brittle as the tensile strength of the plate is increased. Consequently, in the vehicle body side part structure according to Patent Literature 1, there is a risk of cracks occurring during press forming in round areas with small bending radius, such as at an end line corner of an upper door edge below the side wall of a roof rail, or a corner of a side wall of an upper roof molding groove.

In order to further reduce the weight of the vehicle body side part structure while ensuring vehicle body stiffness during a collision, there is a need to use high-tensile steel sheets having higher tensile strength than SPC590, such as SPC980 or higher-strength steel sheets. Press forming thus becomes more difficult.

In the vehicle body side part structure according to Patent Literature 1, a side sill section protrudes outward so that a fender panel and an outside surface of the side panel outer member are continuous. A level difference therefore occurs on the outside surface of an elbow section between a front pillar lower member and the side sill.

Due to such effects as upward impacts from front wheels during travel, an upper member positioned in front of the front pillar lower member deforms upward, and the front pillar lower member is bent toward the rear. Stress is therefore concentrated at the level difference on the outside surface of the elbow section, and the front pillar lower member folds inward or outward.

Patent Literature 2 discloses a vehicle body side part structure provided with a side sill joined so that a closed section is formed by a side sill outer member and a side sill inner member. A reinforcing member (jack-up stiffener) for preventing deformation of the side sill inner is provided to a jack-up point of the side sill. This vehicle body side part structure makes it possible to prevent the side sill outer member and side sill inner member from deforming.

At the elbow section (connecting section) between the front pillar lower member and the side sill in Patent Literature 1, an intersection occurs between loads directed horizontally in the longitudinal direction of the side sill and loads directed vertically along the front pillar. Consequently, repeated expansion and contraction occur along the joining surface of the side panel outer member and the side panel inner member, thereby adversely affecting the stability and controllability of the vehicle.

In the vehicle body side part structure according to Patent Literature 2, a reinforcing member is provided in the side sill. Although the side sill inner member can therefore be prevented from deforming, the reinforcing member does not contribute to the strength and stiffness of the elbow section connecting the side sill and the front pillar lower member.

PRIOR ART LITERATURE

Patent Literature

Patent Literature 1: Japanese Patent Application Laid-Open Publication No. 2001-334957
Patent Literature 2: Japanese Patent No. 4328728

SUMMARY OF INVENTION

Technical Problem

A first object of the present invention is to provide a vehicle body side part structure, which can be press-formed to provide acutely angled ridgelines where necessary for the sake of appearance, and which can ensure high strength against front impact loads and/or side impact loads.

A second object of the present invention is to provide a vehicle body side part structure configured so that deformation of a front pillar lower section and a side sill section is suppressed, and stiffness of the vehicle body is enhanced.

A third object of the present invention is to provide a vehicle body side part structure capable of contributing to enhanced strength and stiffness of a bent or elbow section, and whereby the elbow section can be kept from undergoing repeated deformation.

Solution to Problem

According to a first aspect of the present invention, there is provided a vehicle body side part structure including a side panel outer member for covering a side of a vehicle body from the outside, characterized in that the side panel outer member comprises a front pillar lower section formed of a high-tensile steel sheet, a front pillar upper section formed of an ordinary steel sheet, and a reinforcing member disposed along the front pillar upper section, wherein the front pillar lower section has an upper end connected to a lower end of the front pillar upper section, and the reinforcing member has a front end connected to an inner surface of the upper end of the front pillar lower section.

Preferably, the reinforcing member has an extending section extending downward substantially vertically from a lower portion of the front end of the reinforcing member, the extending section being joined to the upper end of the front pillar lower section.

Preferably, the vehicle body side part structure further includes an upper member extending in a longitudinal direction of the vehicle body and having a closed section, the upper member being joined to a front part of the front pillar lower section and to the front end of the reinforcing member, wherein the upper member is shaped to have a vertical width gradually increasing toward the rear, an upper member joint section at which the front part of the front pillar lower section and the front end of the reinforcing member are joined is formed at an end of the upper member having a maximum vertical width, and an extension line extending in the longitudinal direction of the vehicle body along a joint between the front pillar lower section and the reinforcing member passes through a substantial center of the upper member joint section.

Preferably, the front pillar lower section formed of a high-tensile steel sheet is formed integrally with a side sill section extending toward the rear of the vehicle body via an elbow section from a lower portion of the front pillar lower section.

Desirably, each of the front pillar lower section, the elbow section, and the side sill section has side walls, and the side walls are smooth, flat surfaces.

Desirably, the upper member has a reinforcing structure facing the front pillar lower section.

Preferably, the reinforcing member is joined to a side wall and a front wall of the front pillar lower section.

According to a second aspect of the present invention, there is provided a vehicle body side part structure including a side panel outer member for covering a side of a vehicle body from the outside, characterized in that a roof rail section and rear panel section of the side panel outer member constitute an upper frame section formed of an ordinary steel sheet, a front pillar lower section and side sill section of the side panel outer member constitute a lower frame section formed of a high-tensile steel sheet, and a side panel outer frame section is formed by joining ends of the lower frame section and the upper frame section, and an elbow section located between the front pillar lower section and the side sill section has an outer surface formed flat from the front pillar lower section to the side sill section, the side sill section is covered by a separately formed side sill garnish, and an outer surface of the side sill garnish and an outer surface of a fender panel are made continuous with each other.

Preferably, the side panel outer frame section is provided with a hot-stamped center pillar section, and door openings are formed in front of and behind the center pillar section.

Desirably, the center pillar section has an upper end and a lower end, the upper end being attached to an inner side of the side panel outer frame section, and the lower end of the center pillar section being attached to an outer side of the side panel outer frame section.

Preferably, the roof rail section of the side panel outer frame section is provided with a reinforcing member disposed inside the roof rail section and reinforcing the roof rail section, the upper end of the center pillar section is attached to an outer surface of the reinforcing member, and the lower end of the center pillar section is attached to a side surface of the side sill section.

Preferably, a first blank made of an ordinary steel sheet having a first thickness is used in the upper frame section of the side panel outer frame section, the first blank being press-formed, a second blank made of a high-tensile steel sheet having a second thickness is used in the front pillar lower section of the lower frame section, and a third blank made of a high-tensile steel sheet having a third thickness is used in the side sill section of the lower frame section, the second and third blanks being joined to form a composite blank, and the composite blank being press-formed.

According to a third aspect of the present invention, there is provided a vehicle body side part structure including an inner side member provided on a side of a vehicle body and a side panel outer member covering the inner side member from the outside thereof, there being a closed section formed by the inner side member and the side panel outer member, characterized in that the side panel outer member comprises a side sill section extending in a longitudinal direction of the vehicle body, a front pillar lower section extending in a vertical direction of the vehicle body and formed integrally with the side sill section via an elbow section, an inner flange and an outer flange joined to the inner side member and formed continuously with the front pillar lower section, the side sill section, and the elbow section, and a substantially rectangular reinforcing member disposed in the elbow section and in the closed section, wherein the reinforcing member is provided with an inner joint portion formed at one corner of the substantially rectangular shape and joined to the inner flange, and an outer joint portion formed at another corner opposite the one corner and two edges on either side of the corner and joined to the outer flange, and the outer joint portion joined to the outer flange is formed in a substantially radial shape centered at the inner joint portion joined to the inner flange.

Preferably, the outer joint portion of the reinforcing member is offset laterally inward from the inner joint portion, and the reinforcing member has a ridgeline formed so as to protrude toward the side panel outer member and disposed in a central area extending substantially radially from the inner joint portion toward the outer joint portion, and a reinforcing bead is formed astride the ridgeline.

Preferably, the reinforcing member is a jack-up base for accommodating a jack when the vehicle body is to be lifted.

Preferably, the reinforcing member has a cross-sectional variation for reinforcing the elbow section.

Preferably, the outer joint portion is formed so as to span a vertical section, a curved section, and a horizontal section of the elbow section, and the inner joint portion is formed only in a center portion of an arc of the curved section.

Advantageous Effects of Invention

In the first aspect of the present invention, the vehicle body side part structure includes a side panel outer member for covering a side of the vehicle body from the outside. The side panel outer member comprises a front pillar lower section formed of a high-tensile steel sheet, a front pillar upper section formed of an ordinary steel sheet, and a reinforcing member disposed along the front pillar upper section. Thus, forming of the front pillar upper section can be facilitated by using an ordinary steel sheet for the front pillar upper section where, for the sake of appearance, press forming of acutely angled ridgelines is required due to the relationship of the ridgelines with doors or a windshield.

Furthermore, since an upper end of the front pillar lower section is connected to a back surface of a lower end of the front pillar upper section, and a front end of the reinforcing member is connected to a back surface of the upper end of the front pillar lower section, the position of the lower end of the ordinary steel sheet can be extended to a position where the appearance is unaffected, and reinforcement can by a high-strength member be provided through to the rear end (the desired portion) of the upper member to which a front impact load is inputted. High strength against front impact loads or side impact loads can thereby be ensured.

Furthermore, since the reinforcing member has an extending section formed so as to extend downward substantially vertically from a lower portion of the front end of the reinforcing member, and the extending section is joined to the upper end of the front pillar lower section, the reinforcing member can be linked even at a low-elevation point of the front pillar lower section. A greater degree of freedom can thereby be obtained in the design of the side panel outer member.

The upper member extending in a longitudinal direction of the vehicle body and having a closed section is joined to the front part of the front pillar lower section and to the front end of the reinforcing member. The upper member is fan-shaped and broadens toward the rear end thereof, an upper member joint section at which the front part of the front pillar lower section and the front end of the reinforcing member are joined is formed at a flared end of the fan shape, and an extension line extending in the longitudinal direction of the vehicle body along a joint between the front pillar lower section and the reinforcing member passes through the substantial center of the upper member joint section. With this arrangement, a front impact load can be substantially uniformly dispersed to the high-strength front pillar lower section and the reinforcing member of the front pillar upper section.

Since the front pillar lower section formed of a high-tensile steel sheet is formed integrally with the side sill section extending toward the rear of the vehicle body via an elbow section from a lower portion of the front pillar lower section, loads can be continuously transmitted from the front pillar lower section to the side sill section via the elbow section.

Furthermore, since the outside surfaces of the front pillar lower section, elbow section, and side sill section are smooth, flat surfaces, bending at the elbow section can be suppressed.

Additionally, because the upper member has a reinforcing structure facing the front pillar lower section, the majority of a front impact load can be transmitted to the front pillar upper section. The weight of the front pillar lower section can therefore be reduced.

Furthermore, since the reinforcing member is joined to a side wall and a front wall of the front pillar lower section, the majority of a front impact load can be transmitted to the front pillar upper section. As a result, the weight of the front pillar lower section can be reduced.

In the second aspect of the present invention, a roof rail section and rear panel section of the side panel outer member constitute an upper frame section formed of an ordinary steel sheet, a front pillar lower section and side sill section of the side panel outer member constitute a lower frame section formed of a high-tensile steel sheet, and a side panel outer frame section is formed by joining ends of the lower frame section and the upper frame section.

An elbow section positioned between the front pillar lower section and the side sill section has an outer surface formed flat from the front pillar lower section to the side sill section, the side sill section is covered by a separately formed side sill garnish, and an outer surface of the side sill garnish and an outer surface of a fender panel are made continuous with each other.

Specifically, since an ordinary steel sheet having good press-formability is used for the roof rail section, cracking can be suppressed during press forming of the roof rail section. Since the front pillar lower section and the side sill section are formed integrally of high-tensile steel sheets, the stiffness of the vehicle body can be enhanced.

In the front pillar lower section and the side sill section, the outer surfaces are made flat from the front pillar lower section to the side sill section. Deformation of the front pillar lower section can therefore be suppressed, and the stiffness of the vehicle body can be enhanced.

In the side sill section and the front pillar lower section, at which stress tends to concentrate due to thrusting up of front wheels during travel, by adopting a configuration whereby the outer surfaces are made flat from the front pillar lower section to the side sill section, factors which give rise to breakage in the front pillar lower section and the side sill section are eliminated, deformation of the front pillar lower section and the side sill section is suppressed, and the stiffness of the vehicle body can be enhanced.

The side panel outer frame section is provided with a hot-stamped center pillar section, and door openings are formed in front of and behind the center pillar section. The high stiffness and strength of the hot-stamped center pillar section make it possible to further enhance the strength of the vehicle body.

The upper portion of the hot-stamped center pillar section is attached to an inner side of the side panel outer frame section, and the lower portion of the center pillar section is attached to an outer side of the side panel outer frame section. Specifically, since the lower portion of the center pillar section is configured so that the ridgeline of the side sill section can be provided so as to extend without interruption from a rear end to a front end, enhanced collision performance can be obtained in front impacts, rear impacts, and side impacts. Since the upper portion of the center pillar section can be connected to the roof arch, for example, a load acting on the center pillar section can be directly transmitted from the center pillar section to the roof arch. Side impact performance can thereby be enhanced. It is also possible to dispense with reinforcing brackets and other members.

The reinforcing member for reinforcing the roof rail section is provided in the roof rail section of the side panel outer frame section, a top portion of the center pillar section is surface-mated to the outer surface of the reinforcing member, and a lower portion of the center pillar section is surface-mated to the outer surface. A structure can therefore be obtained which inhibits penetration of rain and the like from outside into the upper end of the center pillar section or the lower end of the center pillar section.

A first blank made of an ordinary steel sheet having a first thickness is used in the upper frame section of the side panel outer frame section, and the first blank is press-formed. A second blank made of a high-tensile steel sheet having a second thickness is used in the front pillar lower section of the lower frame section, a third blank made of a high-tensile steel sheet having a third thickness is used in the side sill section of the lower frame section, the second and third blanks are joined to form a composite blank, and the composite blank is press-formed.

The lower frame section formed by the second and third blanks can be hidden by a door and/or the side sill garnish, and a join line between the blanks is therefore hidden and made less noticeable by the door and/or the side sill garnish.

In the third aspect of the present invention, a closed section is formed by the inner side member and the side panel outer member. The side panel outer member comprises a side sill section extending in a longitudinal direction of the vehicle body, a front pillar lower section extending in a vertical direction of the vehicle and formed integrally with the side sill section via an elbow section, an inner flange and an outer flange joined to the inner side member and formed continuously with the front pillar lower section, the side sill section, and the elbow section, and a substantially rectangular reinforcing member disposed in the elbow section and in the closed section.

The reinforcing member is provided with an inner joint portion formed at one corner of the substantially rectangular shape and joined to the inner flange, and an outer joint portion joined to the outer flange and formed by another corner opposite the one corner and by two edges on either side of the corner. The outer joint portion joined to the outer flange is formed in a substantially radial shape centered at the inner joint portion joined to the inner flange. The reinforcing member made of a plate material can therefore be provided throughout the cross-section of the elbow section. This arrangement contributes to the strength and stiffness of the elbow section and makes it possible to reduce breathing deformation in which the cross-section of the elbow section undergoes repeated deformation. As a result, the stiffness of the vehicle body can be enhanced, and the stability and controllability of the vehicle can be enhanced.

Furthermore, since the outer joint portion of the reinforcing member is offset laterally inward from the inner joint portion, the reinforcing member can be made to conform to the side panel outer member and/or the inner side member throughout the cross-section of the elbow section. The reinforcing member has a ridgeline formed so as to protrude toward the side panel outer member and disposed in a central area extending substantially radially from the inner joint portion toward the outer joint portion, and a reinforcing bead is formed astride the ridgeline. Deformation of the reinforcing member can therefore be suppressed. Providing the reinforcing member throughout the cross-section of the elbow section makes it possible to enhance the stiffness of the vehicle body.

Additionally because the reinforcing member serves as a jack-up base for accommodating a jack when the vehicle body is to be lifted, the entire elbow section, the cross-section of which is reinforced, can be used as a jack-up point for lifting the vehicle body. As a result, adequate stiffness and strength can be ensured in the jack-up point.

Furthermore, since the reinforcing member has cross-sectional variations for reinforcing the elbow section, the strength and stiffness of the reinforcing member can be ensured.

The outer joint portion is formed so as to span the vertical section, curved section, and horizontal section of the elbow section, and the inner joint portion is formed only in a center portion of the arc of the curved section. As a result, reinforcement can be provided predominantly to the outer side of the elbow section, and the elbow section can be efficiently reinforced.

BRIEF DESCRIPTION OF DRAWINGS

FIGS. 20(a) and 20(b) are views showing load transmission paths in the vehicle body side part structure shown in FIG. 13;

FIGS. 29(a) and 29(b) are views for discussion about the level difference between the front pillar lower section and the side sill section of FIG. 21;

FIGS. 30(a) and 30(b) are views for discussion about the lower frame body of FIG. 21;

FIGS. 31(a) and 31(b) are views for discussion about the relationship between the front pillar lower section and the side sill section of FIG. 21;

FIGS. 32(a) and 32(b) are views showing a joint at the upper portion of the center pillar of FIG. 21;

FIG. 40 is a cross-sectional view taken along line 40-40 of FIG. 33;

FIG. 41 is a cross-sectional view taken along line 41-41 of FIG. 33;

FIGS. 42(a) and 42(b) are views illustrative of the manner in which the cross-sectional shape of the elbow section undergoes deformation due to vibration of the vehicle body; and FIGS. 43(a) and 43(b) are views explanatory of the vehicle body side part structure according to the fifth embodiment.

Figure 1:
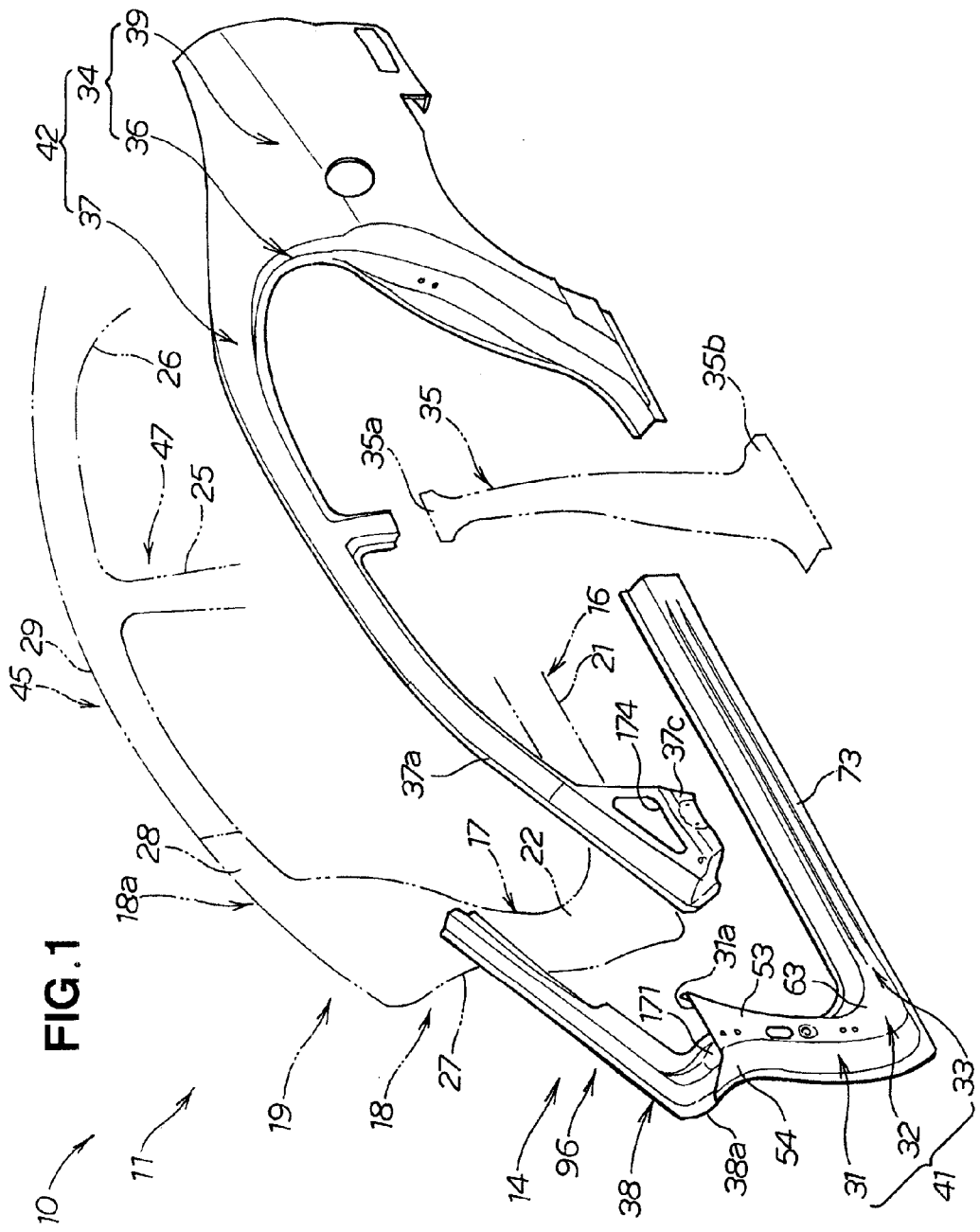
FIG. 1 is an exploded perspective view of a vehicle body side part structure according to a first embodiment of the present invention.

Certain preferred embodiments of the present invention will be described below with reference to the accompanying sheets of drawings.

FIRST EMBODIMENT

As shown in FIGS. 1 through 5, a vehicle body side part structure 10 includes a side panel 11 which forms a side section of a vehicle body. The side panel 11 is composed of a side panel outer member 14 and a side panel inner member 19. The side panel outer member 14 and the side panel inner member 19 are joined together to form a closed section. An upper member 20 is provided to a front end of the side panel outer member 14. The side panel inner member 19 has a side sill inner section 21, a front pillar inner section 27 (including a front pillar lower inner section 22), a center pillar inner section 25, and a rear pillar inner section 26.

The side panel outer member 14 is composed of a side sill section 33 for covering the side sill inner section 21 from the outside of the vehicle body, a front pillar lower section 31 for covering the front pillar lower inner section 22 from the outside of the vehicle body, a center pillar section 35 for covering the center pillar inner section 25 from the outside of the vehicle body, a rear pillar section 36 for covering the rear pillar inner section 26 from the outside of the vehicle body, a rear fender panel 39 formed behind the rear pillar section 36 to cover a rear section of the vehicle body, a roof rail section 37 for covering a roof rail inner section 29 and an inclined section 28 of the front pillar inner section 27 from the outside of the vehicle body, and a stiffener (roof rail stiffener) 38 for reinforcing the roof rail section 37 from the inside thereof.

Figure 2:
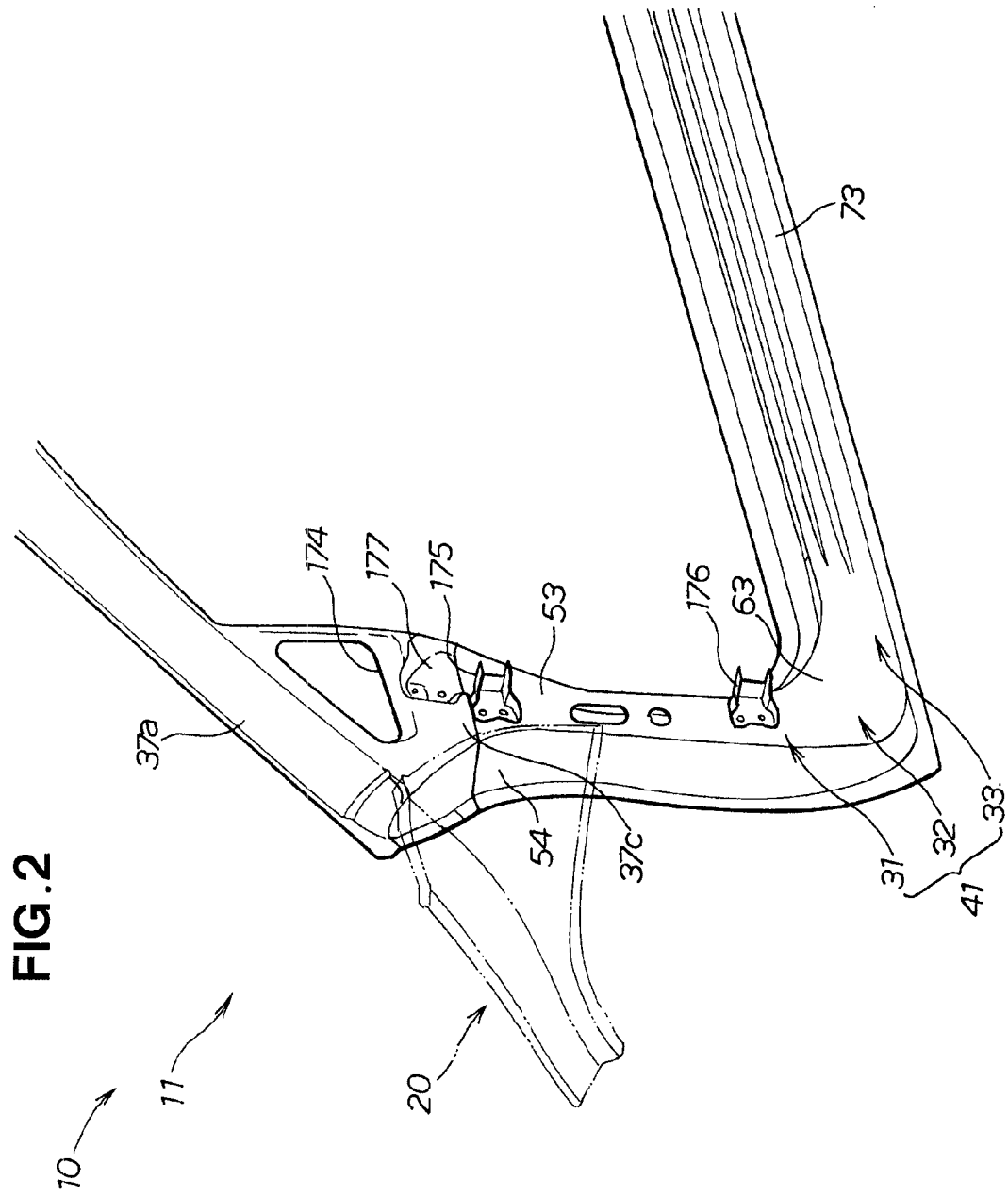
FIG. 2 is a perspective view of the vehicle body side part structure of FIG. 1.

The rear pillar section 36 and the rear fender panel 39 constitute a rear panel section 34. The stiffener 38 is a reinforcing member. Upper and lower front door hinges 175, 176 are attached to a side wall 53 of the front pillar lower section 31, as shown in FIG. 2.

The side sill section 33 extends linearly in the longitudinal direction of the vehicle body. The front pillar lower section 31 is erected substantially vertically from a front end of the side sill section 33. The front pillar lower section 31 and the side sill section 33 are integrally formed via an elbow section 32. Specifically, the front pillar lower section 31, the elbow section 32, and the side sill section 33 are integrally formed of the same material, and constitute an L-shaped lower frame section 41. Side walls 53, 63, 73 of the front pillar lower section 31, elbow section 32, and side sill section 33, respectively, are smooth, flat surfaces.

The center pillar section 35 extends in an I-shape substantially vertically from an intermediate point of the side sill section 33. The roof rail section 37 and the rear panel section 34 (composed of the rear pillar section 36 and the rear fender panel 39) are integrally formed of the same material, and constitute an upper frame section 42. The stiffener 38 is formed so as to conform to the roof rail section 37. Specifically, the stiffener 38 is disposed along a front pillar upper section (front half) 37a.

Specifically, the side panel outer member 14 is formed by joining the center pillar section 35 to the lower frame section 41 and upper frame section 42, which are separately formed. A side panel outer frame section 96 is formed by the lower frame section 41 and the upper frame section 42.

The side sill inner section 21 and the side sill section 33 of the side panel outer member 14 form a side sill 16. The side sill inner section 21 and the side sill section 33 are combined together to form a closed section. The side sill 16 is provided with a side sill garnish 15 (FIG. 13) for covering the side sill section 33.

A front pillar 18 is formed by a front pillar lower member 17 erected from the side sill 16, and a front pillar inclined section 18a extending toward the rear of the vehicle body at an upward incline from an upper portion of the front pillar lower member 17.

The front pillar inclined section 18a is composed of the inclined section 28 of the front pillar inner section 27 and the front pillar upper section (front half) 37a of the roof rail section 37. The front pillar lower member 17 is composed of the front pillar lower inner section 22 and the front pillar lower section 31 of the side panel outer member 14. The placing together of the front pillar lower inner section 22 and the front pillar lower section 31 forms a closed section.

Figure 5:
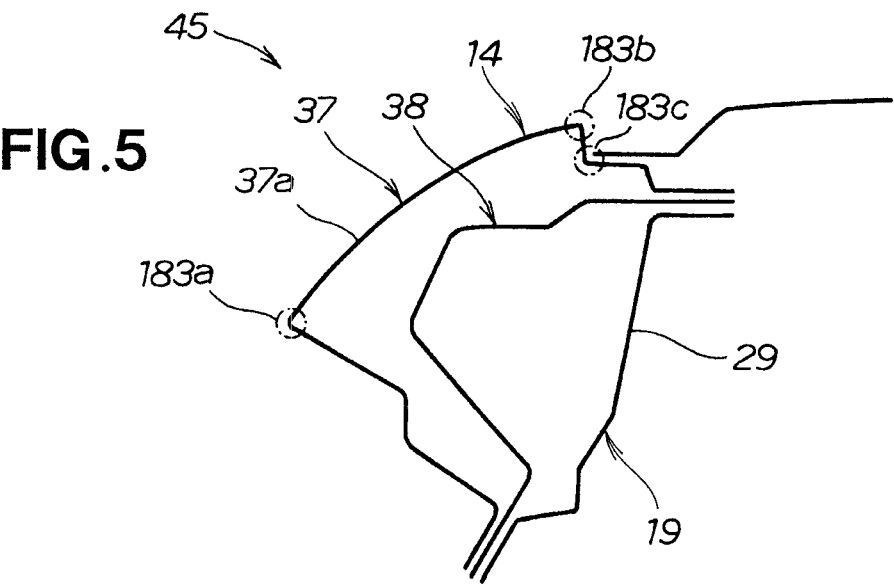
FIG. 5 is a cross-sectional view of a roof rail of FIG. 1.

As shown in FIG. 5, a roof rail 45 is composed of a roof rail inner section 29, the roof rail section 37, and the stiffener 38. The stiffener 38 is provided inside the roof rail section. A closed section is formed by the roof rail inner section 29 and the roof rail section 37, and a closed section is formed by the stiffener 38 and the roof rail inner section 29. An upper portion of the center pillar inner section 25 is joined to an inner side of the roof rail inner section 29. A triangular window 174 is formed in the roof rail section 37. A steering hanger attachment 177 for attaching a steering hanger (not shown) is formed below the triangular window 174.

The reinforcing member (stiffener) 38 is provided with an extending section 171 which extends downward substantially perpendicular to a front end 38a of the stiffener 38. The extending section 171 is joined to an inside surface of an upper end 31a of the front pillar lower section 31. A rear end of the stiffener 38 is provided so as to extend along the roof rail section 37 and is connected to an upper end 35a of the center pillar section 35 and an upper end of the rear pillar section 36. The center pillar inner section 25 and the center pillar section 35 form a center pillar 47.

The upper end 35a of the center pillar section 35 is joined to the stiffener 38 in the roof rail section 37, and a lower end 35b of the center pillar section 35 is joined to the side sill section 33. Front and rear door openings (not shown) are formed by the center pillar section 35, the roof rail section 37, the front pillar lower section 31, the side sill section 33, and the rear pillar section 36.

Figure 3:
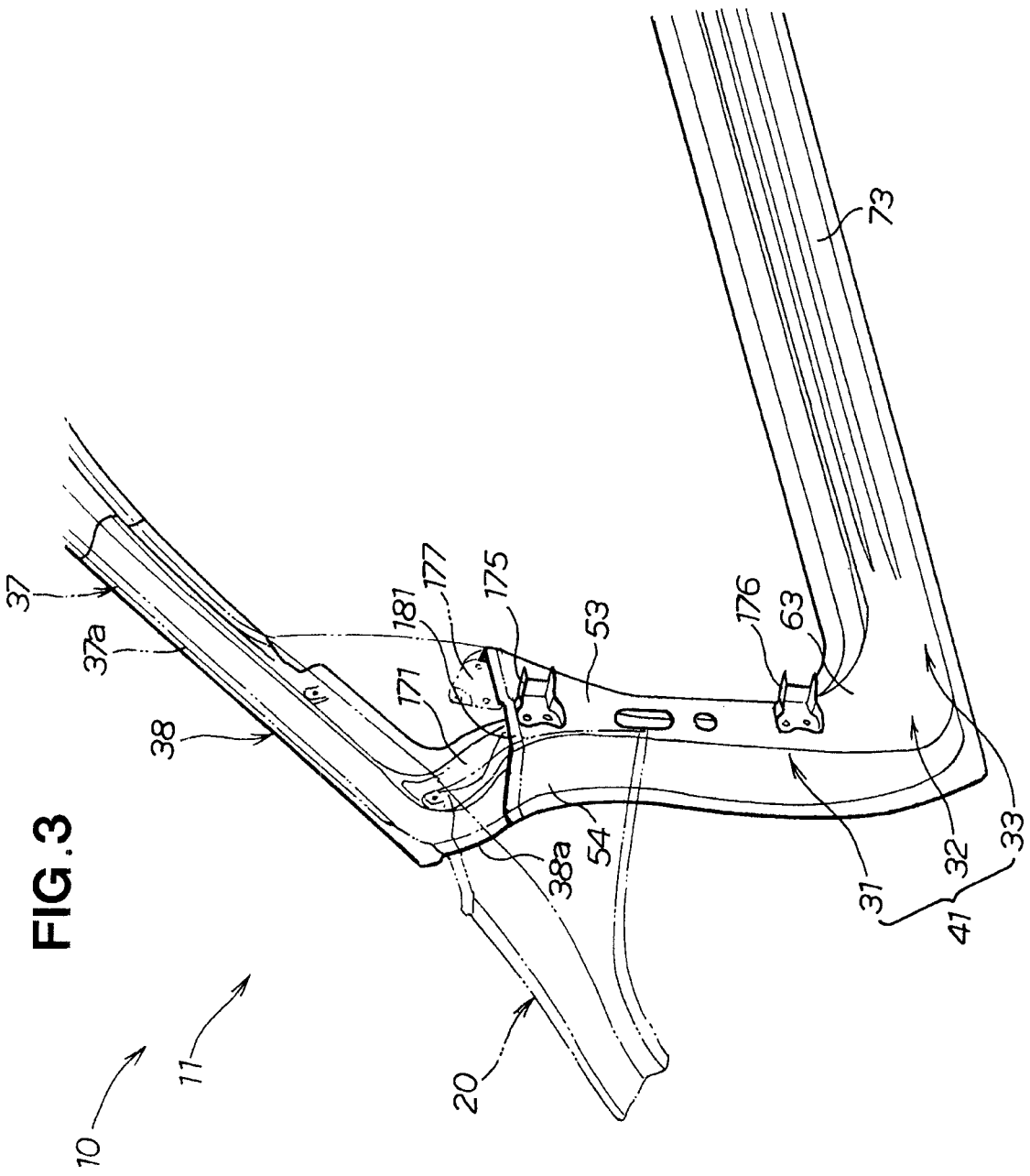
FIG. 3 is a perspective view of a stiffener, lower frame section, and upper member of the vehicle body side part structure of FIG. 1.
Figure 4:
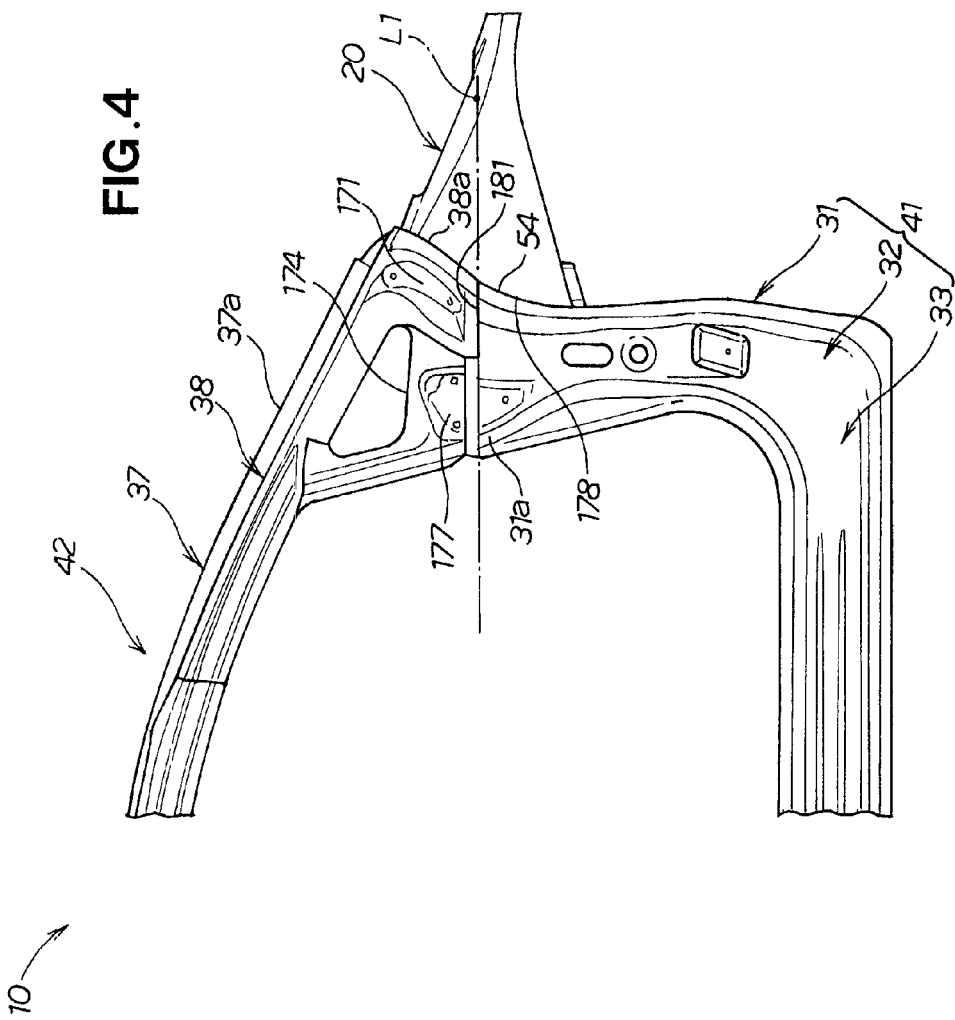
FIG. 4 is a side view of the vehicle body side part structure of FIG. 1 as seen from the interior of a passenger compartment.
Figure 7:
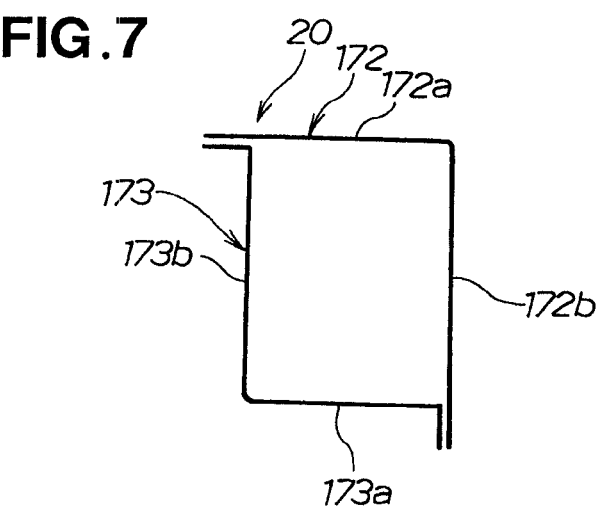
FIG. 7 is a cross-sectional view of the upper member of FIG. 4.

As shown in FIG. 7, the upper member 20 is composed of an upper frame 172 positioned on the outside, and a cowl side panel 173 provided inside and beneath the upper frame 172. The upper member 20 extends in the longitudinal direction of the vehicle body, as shown in FIGS. 2 through 4. A closed section is formed by the upper frame 172 and the cowl side panel 173. The upper frame 172 has a horizontal side 172a and a vertical side 172b. The cowl side panel 173 has a horizontal side 173a and a vertical side 173b. As shown in FIG. 4, the upper member 20 is joined to a front part 54 of the front pillar lower section 31 and to the front end 38a of the stiffener 38.

As shown in FIG. 4, the upper member 20 is fan-shaped and broadens or flares toward the rear end thereof. At a flared end thereof, the fan-shaped upper member 21 has an upper member joint section 178 at which the front part 54 of the front pillar lower section 31 and the front end 38a of the stiffener 38 are joined. An extension line L1 extending in the longitudinal direction of the vehicle body along a joint 181 between the front pillar lower section 31 and the stiffener 38 passes through a substantial center of the upper member joint section 178.

The material used in the vehicle body side part structure 10 will next be described.

The L-shaped lower frame section 41 having the integrated side sill section 33 and front pillar lower section 31 is formed of cold rolled high-tensile steel sheets that are in accordance with Japanese Industrial Standards (JIS)-SPC 980 (referred to hereinafter simply as SPC980) or another specification. Specifically, the side panel outer member 14 of the vehicle body side part structure 10 has a high-strength lower frame section (lower structure) 41 provided with the integrated front pillar lower section 31 and side sill section 33, as shown in FIG. 2. The front pillar lower section 31 formed of a high-tensile steel sheet is formed integrally with the side sill section 33 extending toward the rear of the vehicle body via the elbow section 32 from a lower portion of the front pillar lower section 31.

Figure 6:
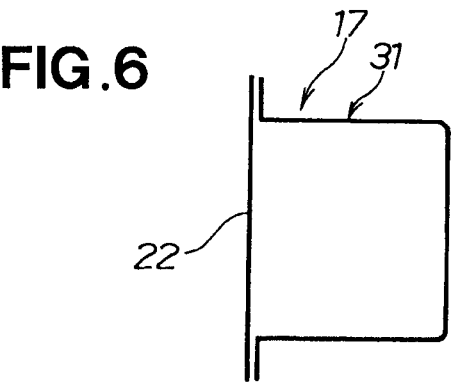
FIG. 6 is a cross-sectional view of a front pillar lower member of FIG. 1.

The front pillar lower section 31 of the front pillar lower member 17 shown in FIG. 6 is formed of an SPC980 or other cold rolled high-tensile steel sheet. The front pillar lower inner section 22 is also formed of an SPC980 or other cold rolled high-tensile steel sheet.

"SPC980" means a cold rolled steel sheet having a tensile strength exceeding 980 MPa. "SPC590" means a cold rolled steel sheet having a tensile strength of 590 MPa or greater, and "SPC270" means a cold rolled steel sheet having a tensile strength of 270 MPa or greater. A cold rolled steel sheet having a tensile strength of 590 MPa or greater is referred to as "high-tensile steel sheet," while a cold rolled steel sheet having a tensile strength of 270 MPa or greater is referred to as "ordinary steel sheet" as opposed to a "high-tensile steel sheet."

A high-tensile steel sheet has high tensile strength, as described above. Thus, the use of a high-tensile steel sheet enables increased product strength. Through use of a high-tensile steel sheet in the side panel outer member, the stiffener used in the conventional technique can be omitted, and the plate thickness of the material is reduced, thereby enabling reduction of weight and cost of the product. Providing a reinforcement (stiffener) inside the side panel outer member leads to increased weight of the vehicle body.

However, a high-tensile steel sheet has lower ductility than an ordinary steel sheet. Therefore, high-tensile steel sheets cannot be used for portions that are designed with small bending radii for an enhanced outer appearance, such as door boundary parts and other parts between the visible roof rail section and the door in the side panel outer member. A high-tensile steel sheet has been used primarily as reinforcement inside the side panel outer member.

The center pillar section 35 is hot-stamp formed of cold rolled steel sheets (hot-stamped steel) having tensile strengths of 590 to 1180 MPa. Hot-stamp forming (hot stamping) is a method whereby a steel sheet is made readily deformable by heating to a high temperature, and then the steel sheet is quenched while being molded in a metal die, so as to attain a greater strength than before the forming process. Specifically, by the rapid cooling of the hot-stamped steel sheets heated to a high temperature, the tensile strength thereof can be increased to about 1500 MPa.

The stiffener 38 is formed of a cold rolled steel sheet having a tensile strength exceeding 980 MPa. Specifically, a galvanized steel sheet (JAC980YL) in accordance with the Japan Iron and Steel Federation standard JFS A 3011 (usually referred to as JAC980YL, for example; simply "JAC . . . " hereinafter) is used. "JAC980YL" is a high-tensile galvanized steel sheet having a tensile strength of 980 MPa or greater. The stiffener 38 has the extending section 171 extending downward from the front end 38a. The extending section 171 is joined to the upper end 31a of the high-strength front pillar lower section 31 formed of an SPC980 or other cold rolled high-tensile steel sheet.

The roof rail section 37 and the rear panel section 34 are integrally formed of cold rolled steel sheets having a tensile strength exceeding 270 MPa that are easily press formed. Specifically, galvanized steel sheets (JAC270E) are used. A JAC270E steel sheet is a galvanized steel sheet made of ordinary steel having a tensile strength of 270 MPa or greater, a low yield point, and good workability. The front pillar upper section 37a is formed of an ordinary steel sheet.

The roof rail inner section 29 shown in FIG. 5 is formed of an SPC980 or other cold rolled high-tensile steel sheet. The roof rail inner section 29 is formed of a cold rolled steel sheet having a tensile strength exceeding 980 MPa, and a closed section is formed by the roof rail inner section 29 and the stiffener 38. The upper frame 172 and cowl side panel 173 of the upper member 20 are formed of an SPC980 or other cold rolled high-tensile steel sheet.

Figure 8:
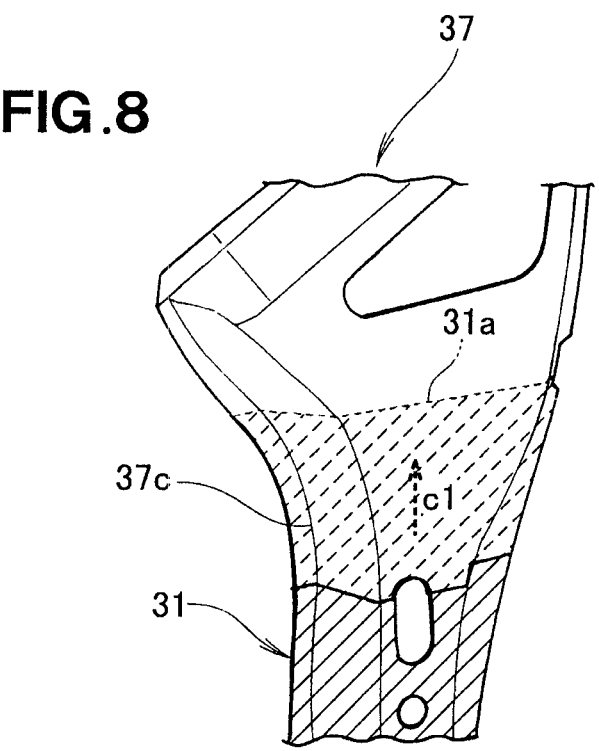
FIG. 8 is a view of a portion of the side panel outer member of FIG. 1.

As shown in FIG. 8, when the roof rail section 37 and rear panel section 34 integrally formed of cold rolled steel sheets having a tensile strength exceeding 270 MPa (referred to hereinafter as "270 steel") and the side sill section 33 and front pillar lower section 31 integrally formed of cold rolled steel sheets having a tensile strength exceeding 980 MPa (referred to hereinafter as "980 steel") are to be joined together, the SPC980 steel sheet is superposed on a back side of the SPC270 steel sheet in the manner indicated by the arrow c1. The desired range of superposition of the SPC980 steel sheet can thereby be obtained irrespective of the position of a division in the SPC270 steel sheet.

Figure 9:
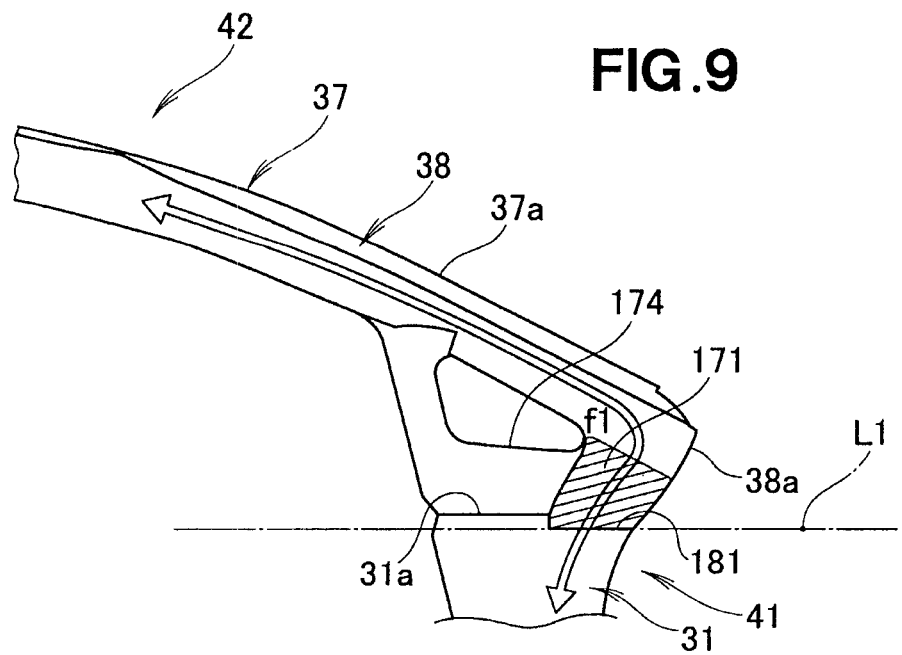
FIG. 9 is a view illustrative of the manner in which the stiffener of FIG. 1 is joined.

As shown in FIG. 9, the extending section 171 extends downward from the front end 38a of the stiffener 38, and the extending section 171 is joined to the upper end 31a of the high-strength front pillar lower section 31 formed of an SPC980 or other cold rolled high-tensile steel sheet. A vehicle body side part structure having high strength and stiffness from the upper frame section 42 to the lower frame section 41 can therefore be realized, and a load path can be created by the interaction of the upper frame section 42 and the lower frame section 41, as indicated by the arrow f1.

Figure 10:
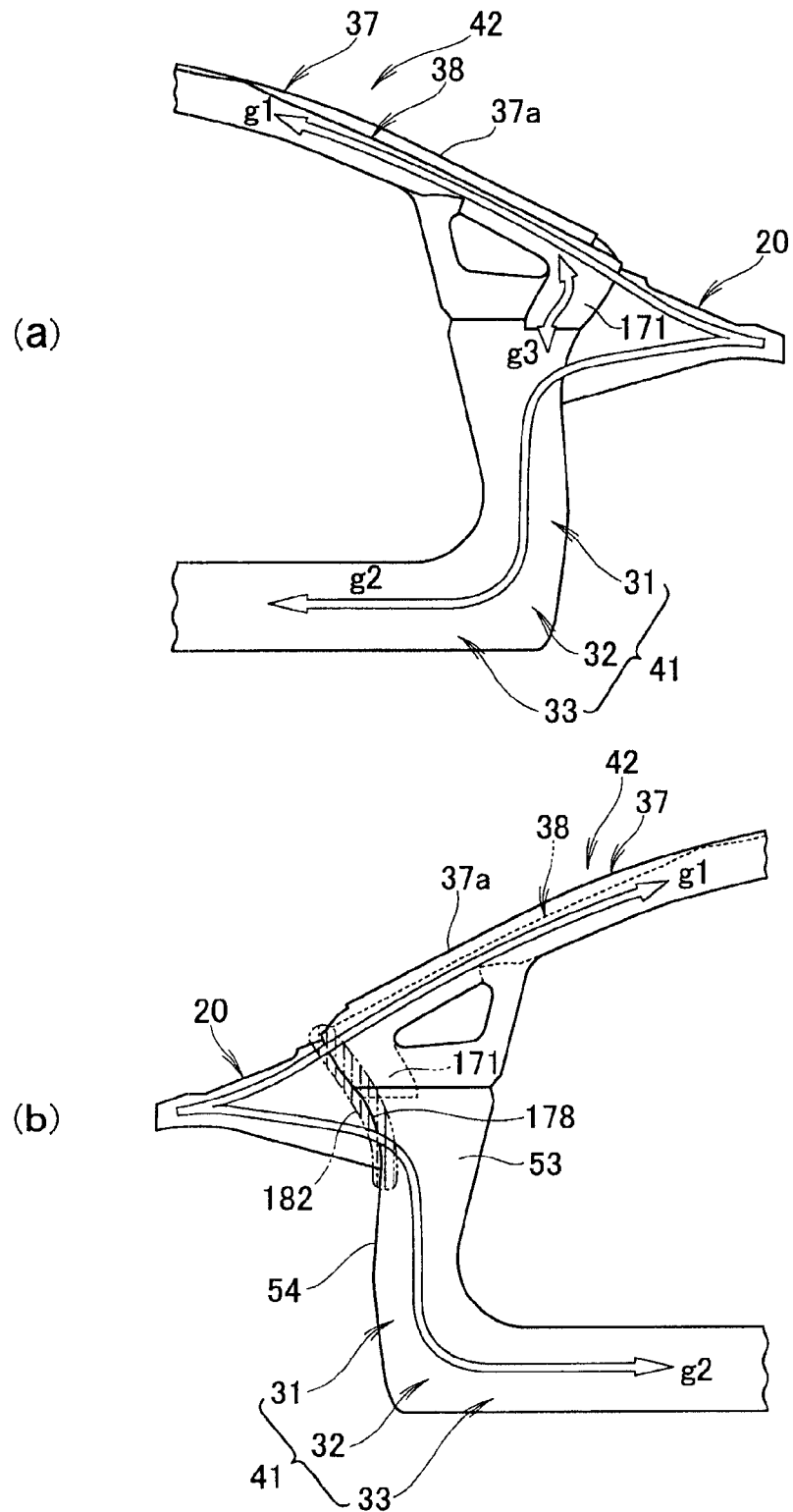
FIGS. 10(a) and 10(b) are views illustrative of the manner in which a front impact load flows or transmits through the vehicle body side part structure shown in FIG. 1.

As shown in FIGS. 10(a) and 10(b), a front impact load acting from the front of the vehicle body is transmitted to the reinforcing member 38 as indicated by the arrow g1 via the horizontal side 172a and vertical side 172b of the upper frame 172 (see FIG. 7). The front impact load acting from the front of the vehicle body is also transmitted to the lower frame section 41 (front pillar lower section 31 and side sill section 33) as indicated by the arrow g2 via the vertical side 172b of the upper frame 172 and the horizontal side 173a of the cowl side panel 173. At this time, the front impact load transmitted as indicated by the arrows g1, g2 is transmitted in a load path indicated by the arrow g3 in the extending section 171 of the stiffener 38.

Specifically, by joining (connecting) the reinforcing member (stiffener) 38 disposed inside the front pillar upper section (front half) 37a to the upper end 31a of the high-strength front pillar lower section 31 disposed at the lower portion of the vehicle body, the amount of deformation during an offset collision can be suppressed (the amount of deformation can be reduced).

In the vehicle body side part structure 10, the upper member joint section 178 of the upper member 20 is placed over (lapped over) the extending section 171 of the strength-enhanced reinforcing member 38 and a front part 54 of the strength-enhanced front pillar lower section 31 to form a lapped section 182. The front impact load acting from the front of the vehicle body is therefore transmitted to the reinforcing member 38 as indicated by the arrow g1, and is dispersed and transmitted to the front pillar lower section 31 and the side sill section 33 as indicated by the arrow g2, as described above. Consequently, the load is smoothly transmitted (load-pathed) to the upper frame section 42 and the lower frame section 41. As a result, the elbow section 32 between the front pillar lower section 31 and the side sill section 33 can be prevented from cracking or breaking.

As shown in FIGS. 1 through 7, the vehicle body side part structure 10 is provided with the side panel outer member 14 for covering the side of the vehicle body from the outside.

The side panel outer member 14 is provided with the front pillar lower section 31 formed of a high-tensile steel sheet, the front pillar upper section 37a formed of an ordinary steel sheet, and the stiffener 38 disposed along the front pillar upper section 37a. Thus, forming of the front pillar upper section 37a can be facilitated by using an ordinary steel sheet for the front pillar upper section 37a where, for the sake of appearance, press forming of acutely angled ridgelines 183a through 183c (see FIG. 5) is required due to the relationship of the doors or a windshield.

Since the upper end 31a of the front pillar lower section 31 is connected to the back surface of a lower end (extending section) 37c of the front pillar upper section 37a, and the front end 38a of the stiffener 38 is connected to the back surface of the upper end 31a of the front pillar lower section 31, the position of the lower end (the lower end 37c of the front pillar upper section 37a) of the ordinary steel sheet can be extended to a position where the appearance is unaffected, and a high-strength member can integrally run through to the rear end (the desired portion) of the upper member 20 to which the front impact load is inputted. High strength against front impact loads or side impact loads can thereby be ensured.

In the vehicle body side part structure 10, since the extending section 171 which extends substantially vertically is formed at the bottom of the front end 38a of the stiffener 38, and the extending section 171 is joined to the upper end 31a of the front pillar lower section 31, the stiffener 38 can be linked even at a low-elevation point of the front pillar lower section 31. A greater degree of freedom can thereby be obtained in the design of the side panel outer member 14.

In the vehicle body side part structure 10, the upper member 20 extending in the longitudinal direction of the vehicle body and forming a closed section is joined to the front part 54 of the front pillar lower section 31 and the front end 38a of the stiffener 38.

The upper member 20 is fan-shaped and broadens or flares toward the rear end thereof, the upper member joint section 178 at which the front part 54 of the front pillar lower section 31 and the front end 38a of the reinforcing member 38 are joined is formed at a flared end of the fan shape, and an extension line L1 extending in the longitudinal direction of the vehicle body along the joint 181 between the front pillar lower section 31 and the reinforcing member 38 passes through the substantial center of the upper member joint section 178. A front impact load can therefore be substantially uniformly dispersed to the high-strength front pillar lower section 31 and the reinforcing member 38 of the front pillar upper section 37a.

Furthermore, in the vehicle body side part structure 10, since the front pillar lower section 31 formed of a high-tensile steel sheet is formed integrally with the side sill section 33 extending toward the rear of the vehicle body via the elbow section 32 from a lower portion of the front pillar lower section 31, loads can be continuously transmitted from the front pillar lower section 31 to the side sill section 33 via the elbow section 32.

Additionally, in the vehicle body side part structure 10, since the side walls 53, 63, 73 of the front pillar lower section 31, elbow section 32, and side sill section 33, respectively, are smooth, flat surfaces, bending at the elbow section 32 can be suppressed.

In the vehicle body side part structure 10, since the reinforcing member 38 is joined to the side wall 53 and front part 54 of the front pillar lower section 31, the majority of a front impact load can be transmitted to the front pillar upper section 37a. As a result, the weight of the front pillar lower section 31 can be reduced.

SECOND EMBODIMENT

Figure 11:
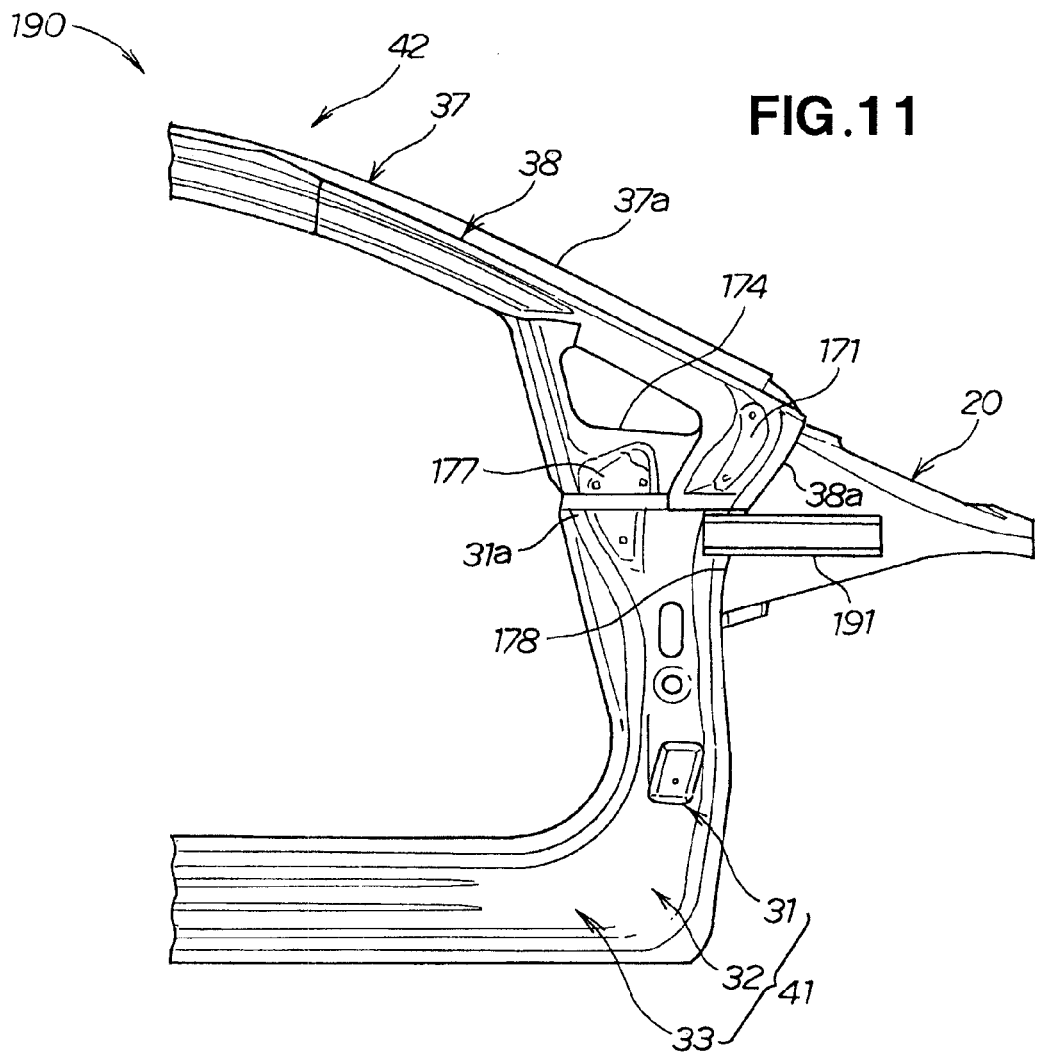
FIG. 11 is a side view of a vehicle body side part structure according to a second embodiment as seen from the interior of a passenger compartment.
Figure 12:
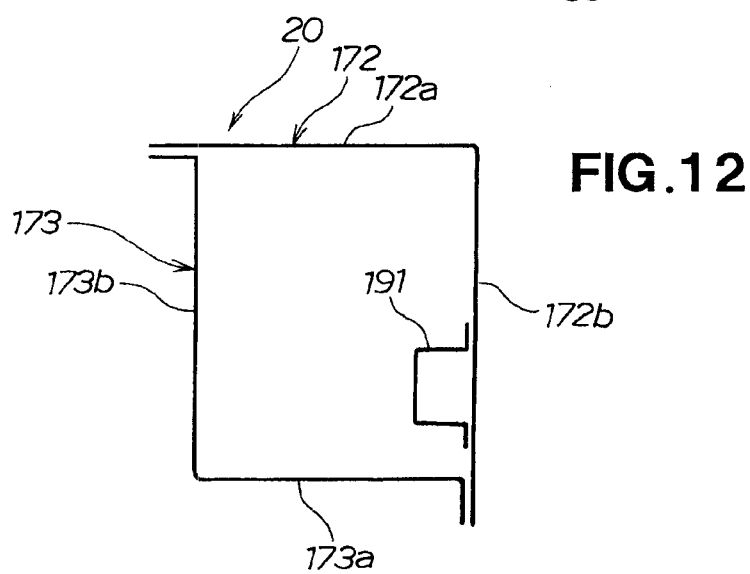
FIG. 12 is a cross-sectional view of an upper member of FIG. 11.

As shown in FIGS. 11 and 12, in a vehicle body side part structure 190 according to a second embodiment, a reinforcing member 191 is provided between the upper member 20 and the front pillar lower section 31. A closed section is formed by the upper member 20 and the reinforcing member (reinforcing structure) 191. Specifically, the vehicle body side part structure 190 has the reinforcing structure 191 facing the front pillar lower section 31 in the upper member 20.

In the vehicle body side part structure 190, since the upper member 20 has a reinforcing structure facing the front pillar lower section 31, the majority of a front impact load can be transmitted to the front pillar lower section 31. This configuration makes it possible to reduce the weight of the front pillar upper section 37a.

In addition to forming a closed section with the roof rail inner section, the reinforcing member 38 of the vehicle body side part structure 10 according to the present invention may be a pipe or other hollow piece.

The reinforcing structure 191 of the vehicle body side part structure 190 according to the present invention may also be a reinforcing shape (bead or the like) formed integrally with the upper member 20.

THIRD EMBODIMENT

A vehicle body side part structure according to a third embodiment will next be described with reference to FIGS. 13 through 20. Constituent elements that are the same as those in the first embodiment are referred to by the same reference numerals, and detailed descriptions thereof will not be repeated.

Figure 15:
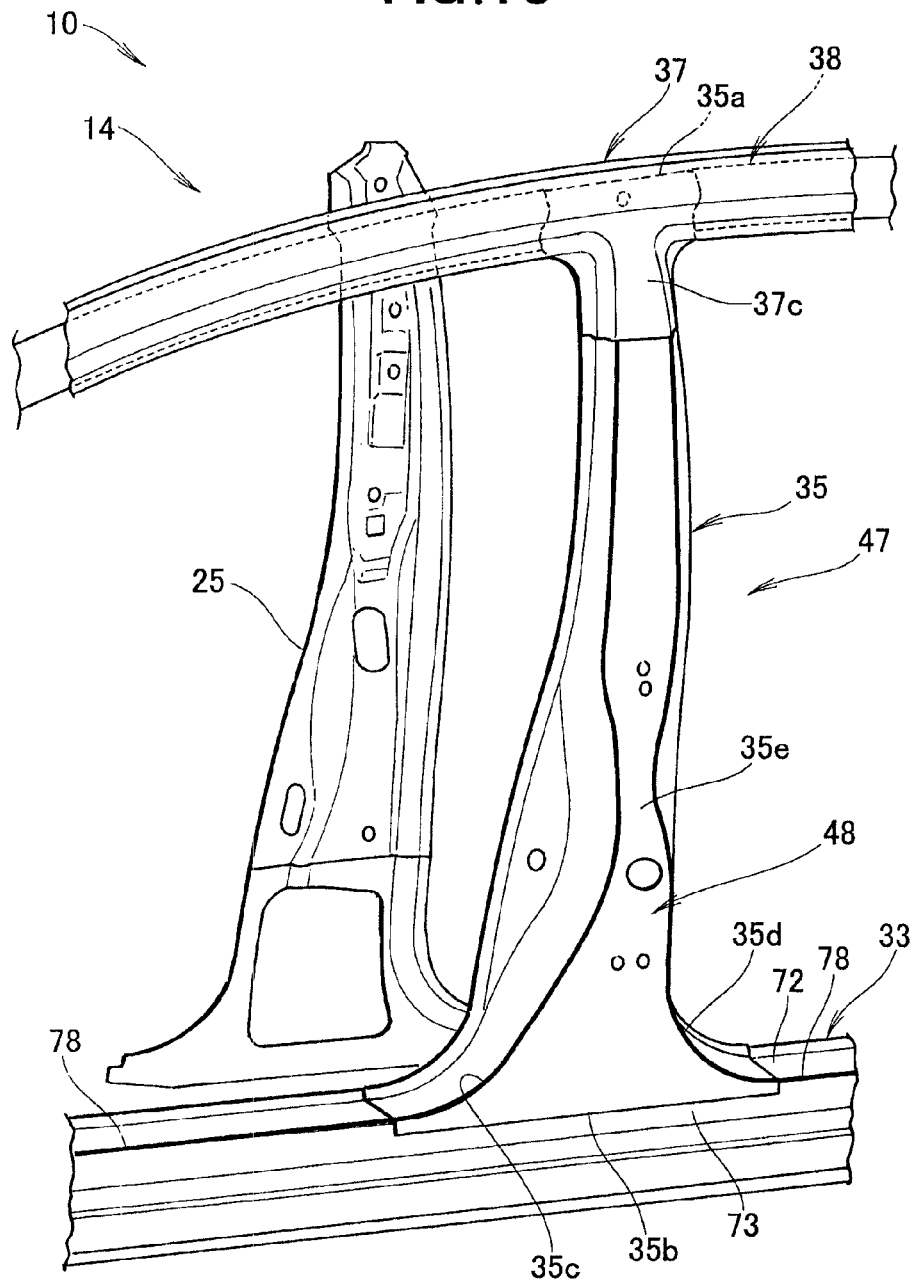
FIG. 15 is a perspective view of a center pillar of FIG. 14.
Figure 18:
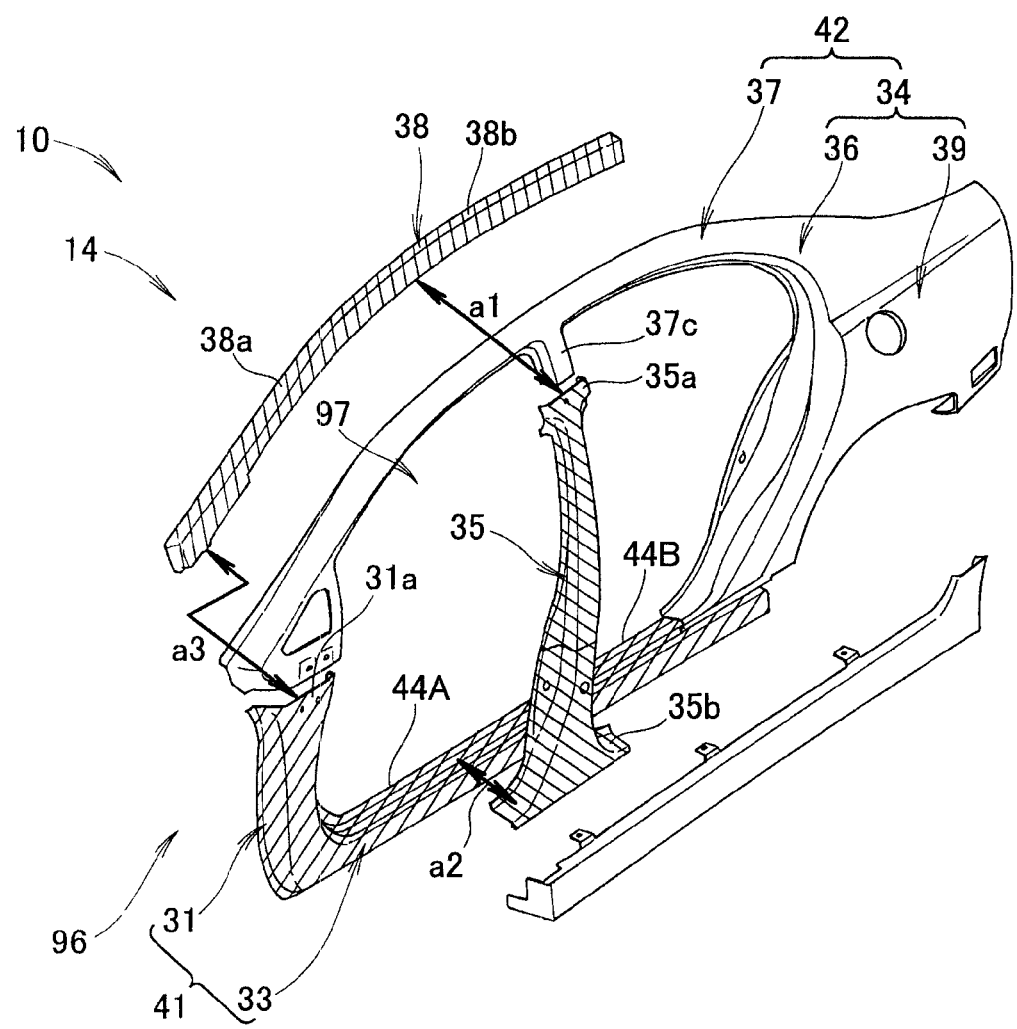
FIG. 18 is a view of the assembly of the vehicle body side part structure of FIG. 13.
Figure 19:
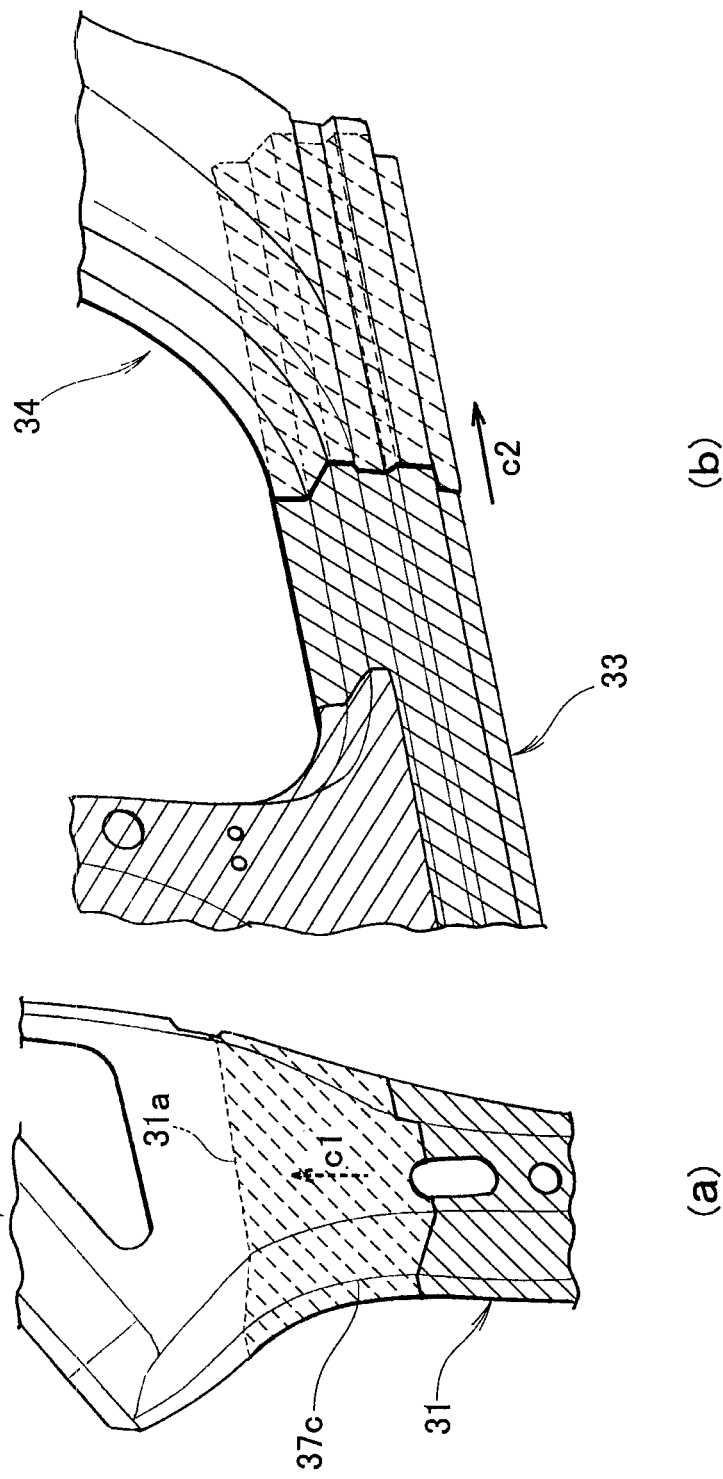
FIGS. 19(a) and 19(b) are views showing the state of superposition or lapping at the joint locations of the side panel outer member of FIG. 14.

As shown in FIGS. 15 and 18, a front end 38a of a stiffener 38 is joined to an upper end 31a of a front pillar lower section 31, and a rear section (rear intermediate section) 38b of the stiffener 38 is joined to an upper end 35a of a center pillar section 35.

Figure 13:
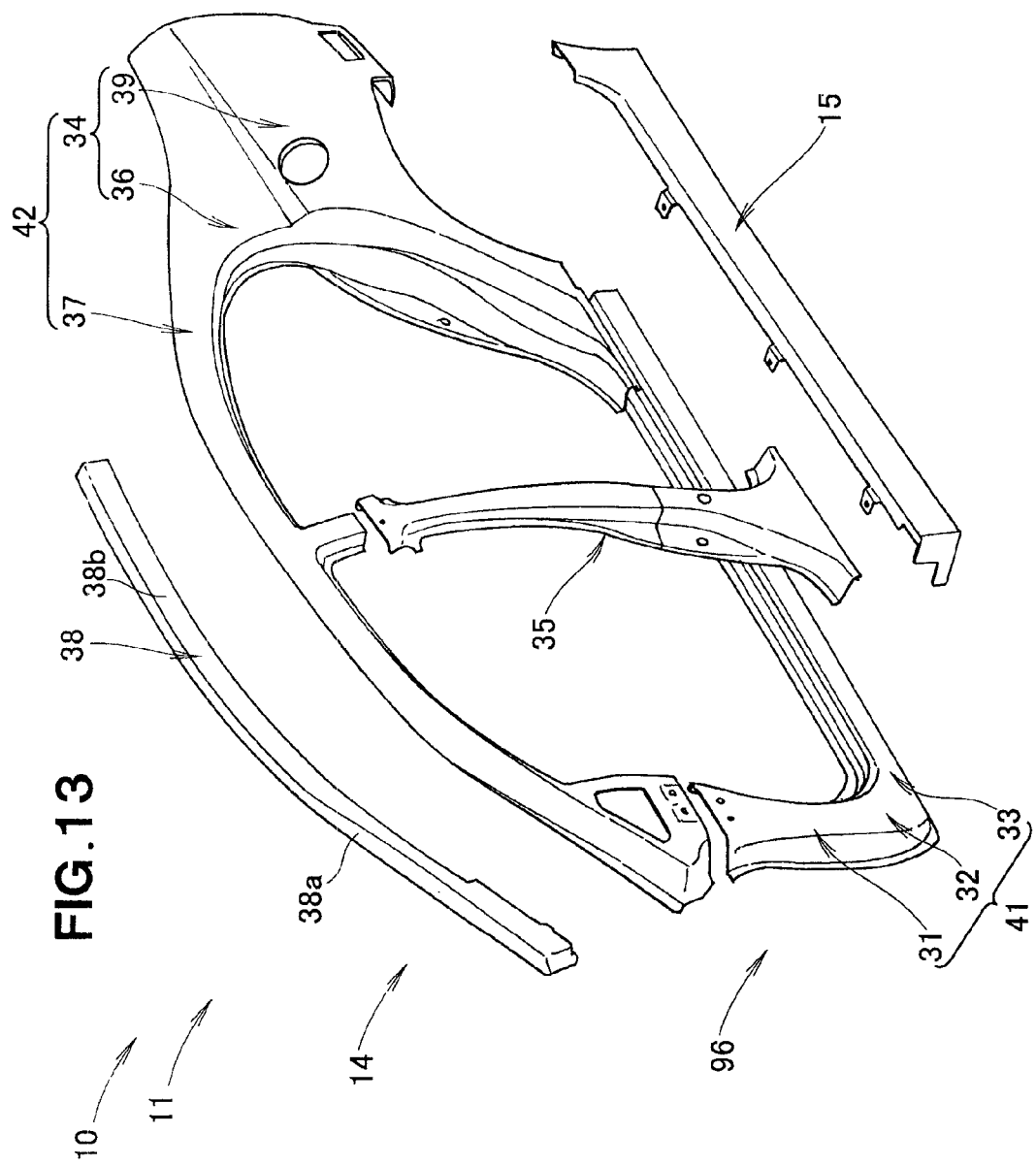
FIG. 13 is an exploded perspective view of a vehicle body side part structure according to a third embodiment.
Figure 14:
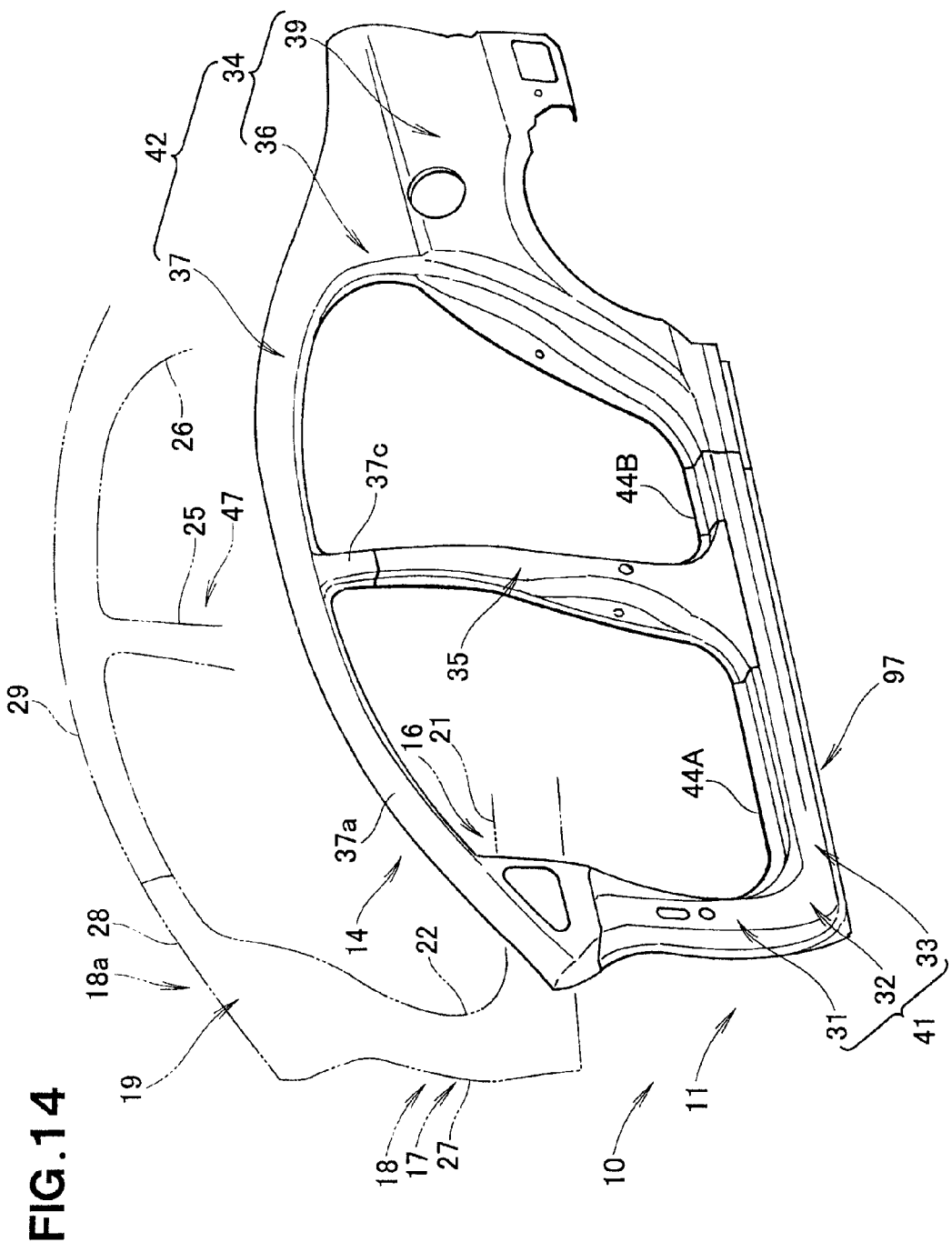
FIG. 14 is a perspective view of a side panel outer member of FIG. 13.

As shown in FIGS. 13 through 15, the upper end 35a of the center pillar section 35 is joined to an outer surface 38c (see FIG. 20(a)) of the stiffener 38 in a roof rail section 37, and a lower end 35b is joined to a side sill section 33. Front and rear door openings 44A, 44B (see FIG. 18) are formed by the center pillar section 35, the roof rail section 37, the front pillar lower section 31, the side sill section 33, and a rear pillar section 36. A door hinge surface 48 formed by a side surface (lateral surface) 35e of the center pillar section 35 is made continuous and even with a lateral outer surface (side wall) 73 (see FIG. 17(a)) of the side sill section 33.

The roof rail section 37 has an extending section 37c which extends toward the center pillar section (center pillar outer) 35. The extending section 37c is placed over a lower surface of the upper end 35a of the center pillar section 35 so that a lower end of the extending section 37c is hidden by the doors (not shown). In other words, the center pillar section 35 is concealed in the extending section 37c of the roof rail section 37. The upper end 35a of the center pillar section 35 is joined to an outer surface 38c of the stiffener 38. A sealant (not shown) is applied at the meeting of the center pillar section 35 and the extending section 37c.

At the lower end 35b of the center pillar section 35, the center pillar section 35 is placed over the side sill section 33, the cross-section of which is hat-shaped. Ridgelines 35c, 35d of the cross-sectionally hat-shaped center pillar section 35 are continuous with a ridgeline 78 of the side sill section 33.

Figure 16:
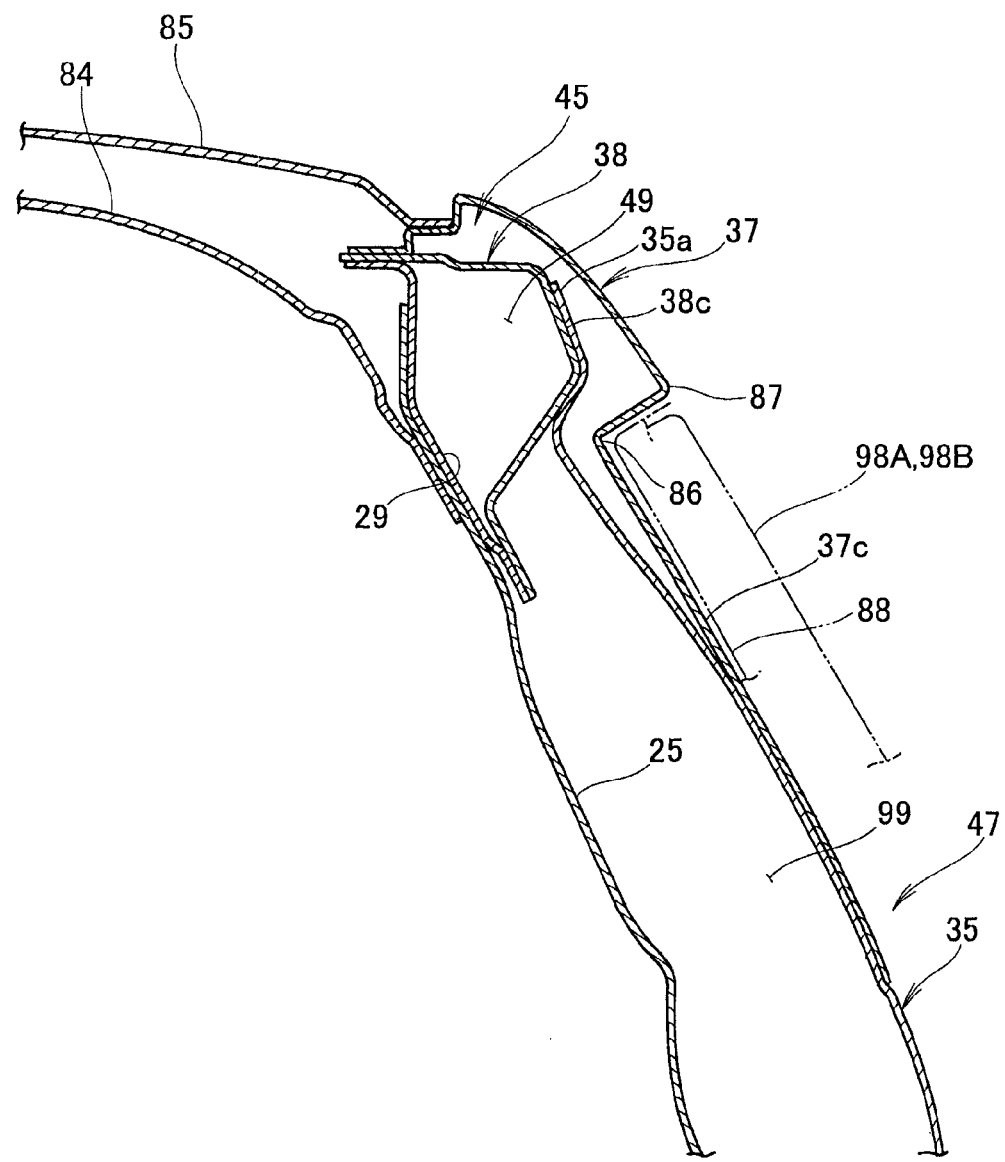
FIG. 16 is a cross-sectional view of the vehicle body side part structure of FIG. 13.
Figure 17:
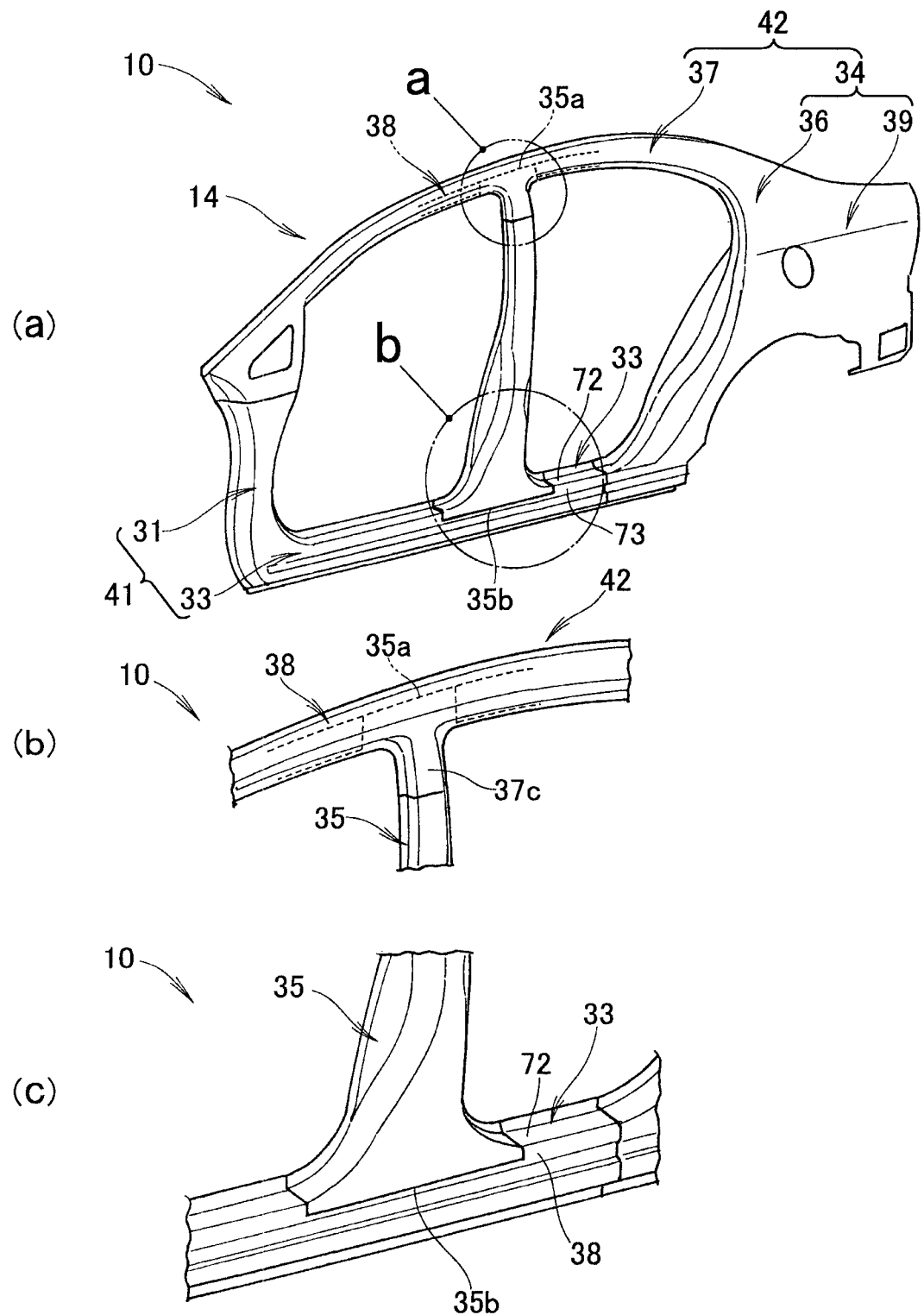
FIGS. 17(a), 17(b) and 17(c) are views showing joint portions of the center pillar shown in FIG. 15.

As shown in FIG. 16, a roof rail 45 is composed of a roof rail inner section 29, the roof rail section 37, and the stiffener 38. The stiffener 38 is provided inside the roof rail section 37. A closed section (rail side closed section) 49 is formed by the stiffener 38 and the roof rail inner section 29. An upper portion of the center pillar inner section 25 is joined to an inner side of the roof rail inner section 29.

The center pillar section 35 is linked to a roof arch 84 extending laterally from the upper portion of the center pillar inner section 25 via the stiffener 38 and the center pillar inner section 25. The area above the roof arch 84 is covered by a roof panel 85.

A plurality of roof arches may also be arranged in the longitudinal direction of the vehicle body at the height of the closed section 49.

As shown in FIG. 15, the center pillar section 35 is hot-stamp formed of cold rolled steel sheets (hot-stamped steel) having tensile strengths of 590 to 1180 MPa. Here, hot-stamp forming (hot stamping) is a method whereby a steel sheet is made readily deformable by heating to a high temperature, and then the steel sheet is quenched while being molded in a metal die, so as to attain a greater strength than before the forming process. Specifically, by the rapid cooling of the hot-stamped steel sheets heated to a high temperature, the tensile strength thereof can be increased to about 1500 MPa.

The cold rolled steel sheets having tensile strengths of 590 to 1180 MPa may be formed into a tailored blank having different pre-joined materials (steel sheets having different thicknesses or tensile strengths). This makes it possible to use a high-tensile material only for portions where such a material is needed.

The center pillar section 35 may be obtained by press-forming portions of cold rolled steel sheets having a different tensile strengths of 590 to 1180 MPa and subsequently connecting the plates.

The center pillar inner section 25 may also be hot-stamp formed of a cold rolled high-tensile steel sheet, and the center pillar 47 may be formed by the center pillar section 35 and the center pillar inner section 25.

By hot-stamp forming the center pillar section 35 of cold rolled steel sheets having tensile strengths of 590 to 1180 MPa, it is possible to eliminate the need for a large forming load during press working, and thus to prevent cracks and other defects from occurring in the center pillar section 35. A consistent level of quality can also be maintained.

By using a tailored blank obtained by joining together different materials in advance consisting of cold rolled steel sheets having tensile strengths of 590 to 1180 MPa to form the center pillar section 35, it is possible use a high-tensile material only for portions where such a material is needed.

The center pillar section 35 and the center pillar inner section 25 together form a closed section 99 which does not house a center pillar stiffener.

The stiffener 38 is formed of a cold rolled steel sheet having a tensile strength exceeding 980 MPa. Specifically, a galvanized steel sheet (JAC980YL) is used. A "JAC980YL" is a high-tensile galvanized steel sheet having a tensile strength of 980 MPa or greater.

The roof rail section 37 and the rear panel section 34 are integrally formed of cold rolled steel sheets having a tensile strength exceeding 270 MPa that are easily press formed. Specifically, galvanized steel sheets (JAC270E) are used. A JAC270E steel sheet is a galvanized steel sheet made of ordinary steel having a tensile strength of 270 MPa or greater, a low yield point, and good workability.

In the vehicle body side part structure 10 (side panel outer member 14) configured as shown in FIGS. 17 through 20, the roof rail section 37, rear pillar section 36, and rear fender panel 39 of the side panel outer member 14 are composed of JAC270E steel, the front pillar lower section 31 and the side sill section 33 are composed of JAC980YL high-tensile steel sheets (high-tensile steel), the center pillar section 35 is formed of a high-tensile steel sheet (hot-stamped steel) having a tensile strength of 1000 MPa or greater, the upper end 35a of the center pillar section 35 is joined to the outer surface 38c (see FIG. 20(a)) of the stiffener 38 made of a high-tensile steel sheet (high-tensile steel), and the lower end 35b is joined to the side sill section 33 made of a high-tensile steel sheet (high-tensile steel).

Specifically, JAC270E steel having good formability is used for the roof rail section 37. Cracking can thereby be suppressed during press forming of corners 86, 87 having a small bending radius in the roof rail section 37, as shown in FIG. 20(b).

The front pillar lower section 31 and the side sill section 33 are integrally formed of JAC980YL high-tensile steel sheets (high-tensile steel). The stiffness and side impact strength of the vehicle body are thereby enhanced.

To reduce weight, the center pillar section 35 is formed of hot-stamped steel having a tensile strength of 1180 MPa or greater. Forming is thereby facilitated, and the center pillar section 35 is endowed with high strength. The upper end 35a of the center pillar section 35 is joined to the outer surface 38c of the stiffener 38 made of a high-tensile steel sheet (high-tensile steel), and the lower end 35b is joined to the side sill section 33 made of a high-tensile steel sheet (high-tensile steel). A frame section 97 (FIG. 18) provided with the front door opening 44A (FIG. 18) is thereby endowed with high strength, the stiffness of the vehicle body is enhanced, and side impact load-bearing strength is increased.

As shown in FIG. 17(a), in the vehicle body side part structure 10, the center pillar section 35 is joined to the upper frame section 42 to which the separately formed lower frame section 41 is joined, and the side panel outer member 14 is thereby formed. During welding of the center pillar section 35 to the roof rail section 37 and the side sill section 33, the upper end 35a of the center pillar section 35 is set on the inside of the extending section 37c of the upper frame section 42 and welded, and the lower end 35b is set on an outer surface 72 of the lower frame section 41 and welded.

FIG. 17(b) is an enlarged view of portion 'a' of FIG. 17(a). Since the extending section 37c of the ordinary steel sheet roof rail section 37 is placed over a front surface side of the upper end 35a of the center pillar section 35, which is a high-strength member (FIG. 18), at the upper end 35a of the center pillar section 35 (FIG. 16), a high-strength member can be connected to the high-strength stiffener 38 on the inside of the roof rail section 37 (see FIG. 20).

FIG. 17(c) is an enlarged view of portion 'b' of FIG. 17(a). Since the center pillar section 35, which is a high-strength member, is placed over the side sill section 33, which is also a high-strength member, at the lower end 35b of the center pillar section 35, there is no need to form an opening in the outer surface 72 of the side sill section 33, the chance for breakage of the side sill section 33 is eliminated, and the side sill section 33 can be made to work effectively against front impacts and/or side impacts.

As shown in FIG. 18, the side panel outer member 14 is obtained by connecting the separately hot-stamped center pillar section 35 to a side panel outer frame section (side frame) 96 obtained by welding (or crimping) together the upper frame section 42, in which the roof rail section 37, rear pillar section 36, and rear fender panel 39 are integrally formed by press-forming ordinary steel sheets, and the lower frame section 41, in which the side sill section 33 is integrally formed from the front pillar lower section 31 by press-forming high-tensile steel (980 steel). On the inside of the roof rail section 37, the high-tensile steel stiffener 38 is connected to form a high-strength frame section 97 around the front door opening 44A.

The upper end 35a of the center pillar section 35 is joined (connected) as indicated by the arrow a1 to the stiffener 38 formed of a high-tensile steel sheet in the roof rail section 37, and the lower end 35b of the center pillar section 35 is joined (connected) as indicated by the arrow a2 to the side sill section 33 formed of a high-tensile steel sheet. The stiffener 38 formed of a high-tensile steel sheet, and the front pillar lower section 31 formed of a high-tensile steel sheet are joined together as indicated by the arrow a3. The frame section 97 (composed of the stiffener 38, the front pillar lower 17, the side sill 16, and the center pillar 47; see FIG. 14) forming the front door opening 44A can thereby be formed as a high-strength frame. As a result, the stiffness of the vehicle body can be enhanced and side impact load-bearing strength can be increased.

As shown in FIGS. 19(a) and 19(b), when the roof rail section 37 and rear panel section 34 (composed of the rear pillar section 36 and the rear fender panel 39, as shown in FIG. 6) integrally formed of cold rolled steel sheets (270 steel) having a tensile strength exceeding 270 MPa, and the side sill section 33 and front pillar lower section 31 integrally formed of cold rolled steel sheets (980 steel) having a tensile strength exceeding 980 MPa are to be joined together, the 980 steel is placed on an inner surface of the 270 steel in the manner indicated by the arrows c1 and c2. The 980 steel can thereby be integrally superposed to extend to the portion in which strength is required, irrespective of the position of the division in the 270 steel.

As shown in FIG. 20(a), a side impact load acts on the center pillar section (center pillar outer) 35 in the manner indicated by the arrow d1. In the vehicle body side part structure 10, since the upper end 35a of the center pillar section 35 is directly joined to the stiffener 38 of the roof rail section 37, the load inputted to the center pillar section 35 during a side impact is inputted to the stiffener 38 as indicated by the arrow d2.

As shown in FIG. 20(b), the load inputted to the stiffener 38 is dispersed to the roof arch 84 via the roof rail inner section 29 and the center pillar inner section 25 in the manner indicated by the arrow d3.

Since the roof rail section 37 is made of an ordinary steel sheet (270 steel), the bending radii of the press-formed corner 86 and corner 87 can be reduced. The gap between the roof rail section 37 and a front door 98A or back door 98B (FIG. 16) can be reduced in size, and the appearance of the vehicle can be improved.

In the vehicle body side part structure 10, the reinforcing member 38 for reinforcing the roof rail section 37 is provided in the roof rail section 37 of the side panel outer frame section 96 (FIG. 18), the upper portion (upper end) 35a of the center pillar section 35 is surface-mated to the outer surface 38c of the reinforcing member 38, and the lower portion (lower end) 35b of the center pillar section 35 is surface-mated to the outer surface (lateral outer surface) 72. A structure can therefore be obtained which inhibits penetration of rain and the like from outside into the upper end 35a of the center pillar section 35 or the lower end 35b of the center pillar section 35.

FOURTH EMBODIMENT

Figure 21:
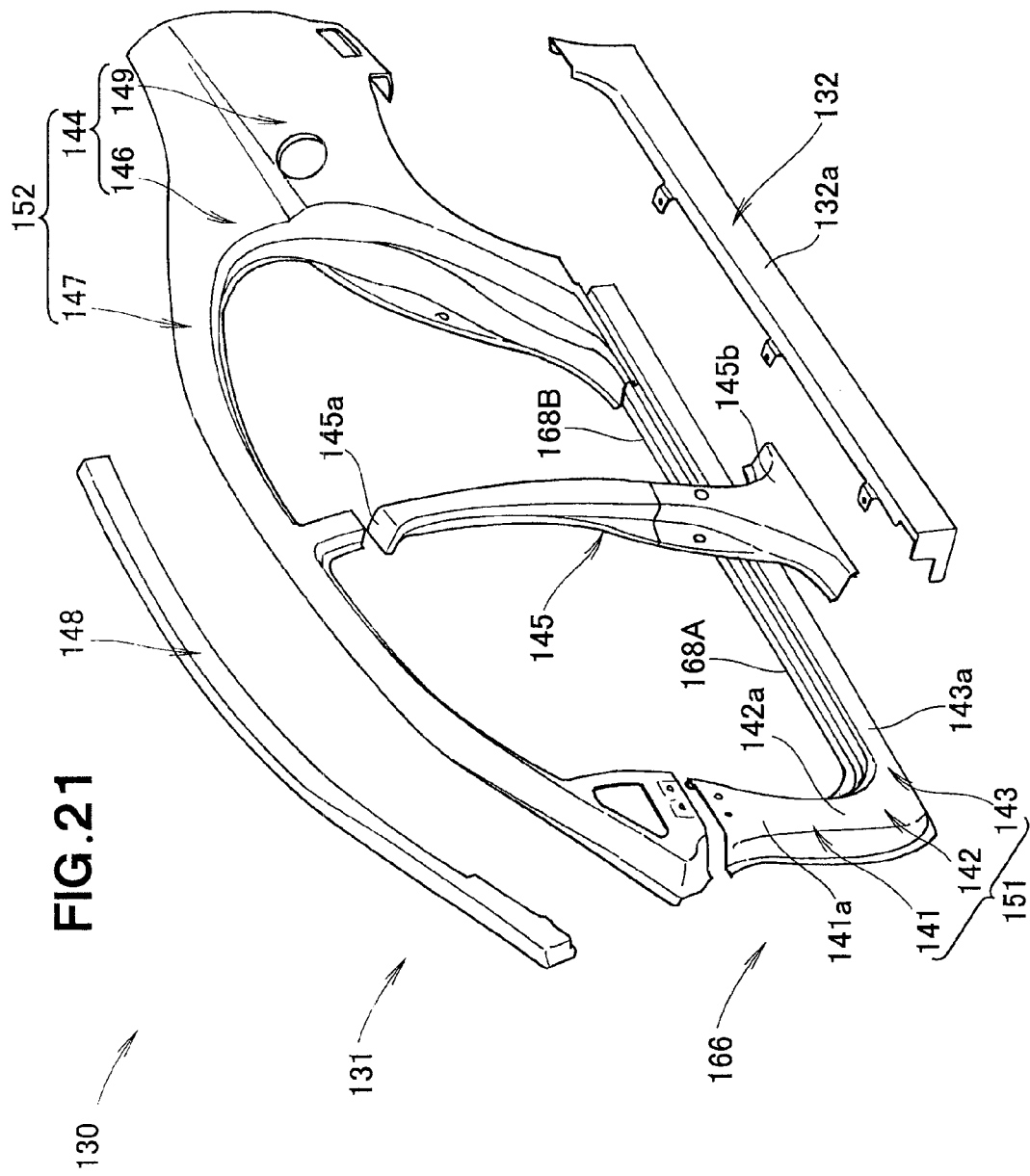
FIG. 21 is an exploded perspective view of a vehicle body side part structure according to a fourth embodiment.
Figure 22:
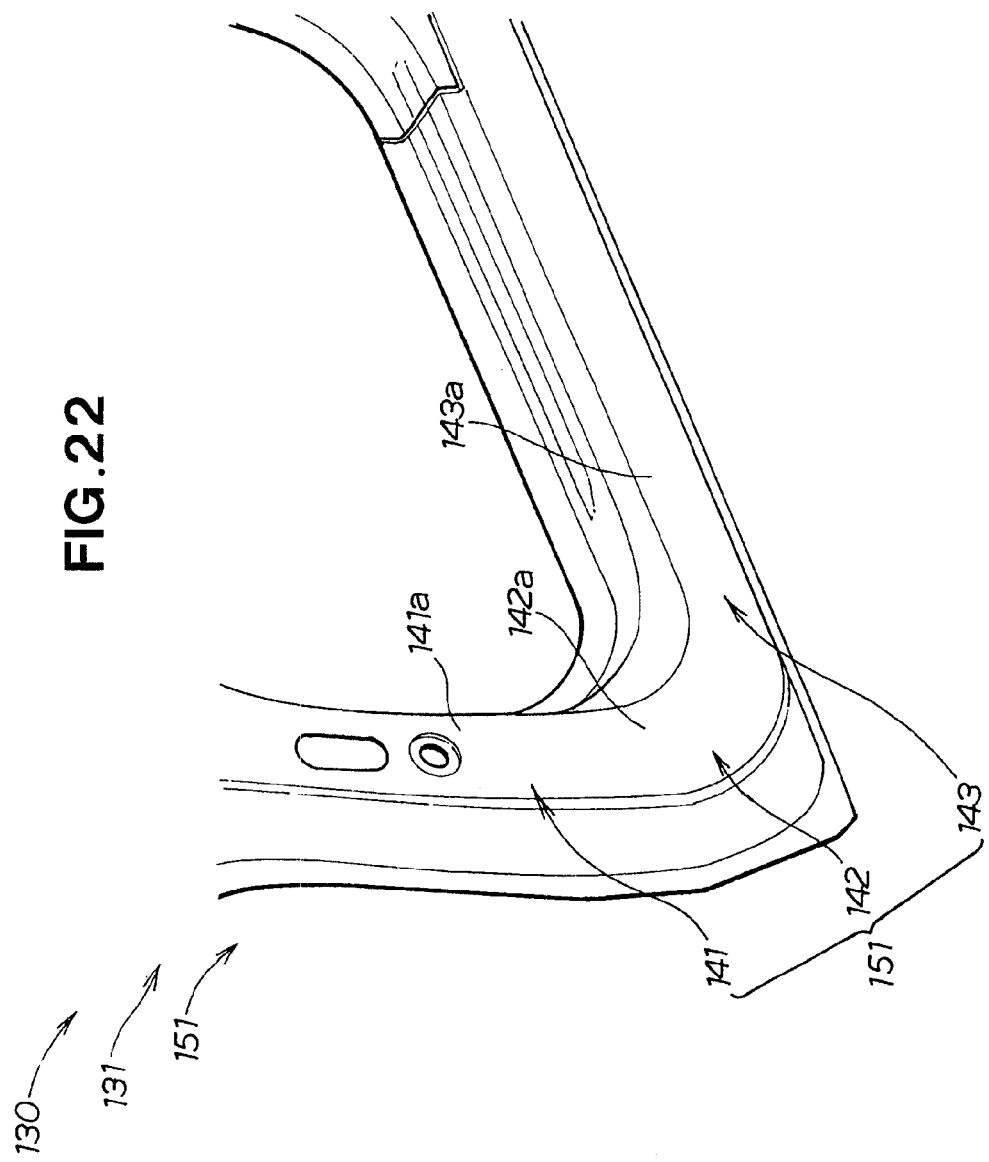
FIG. 22 is a perspective view of a front pillar lower section and a side sill section of FIG. 21.

As shown in FIGS. 21 and 22, a vehicle body side part structure 130 according to a fourth embodiment is provided with a side panel outer member 131 and a side sill garnish 132.

Figure 24:
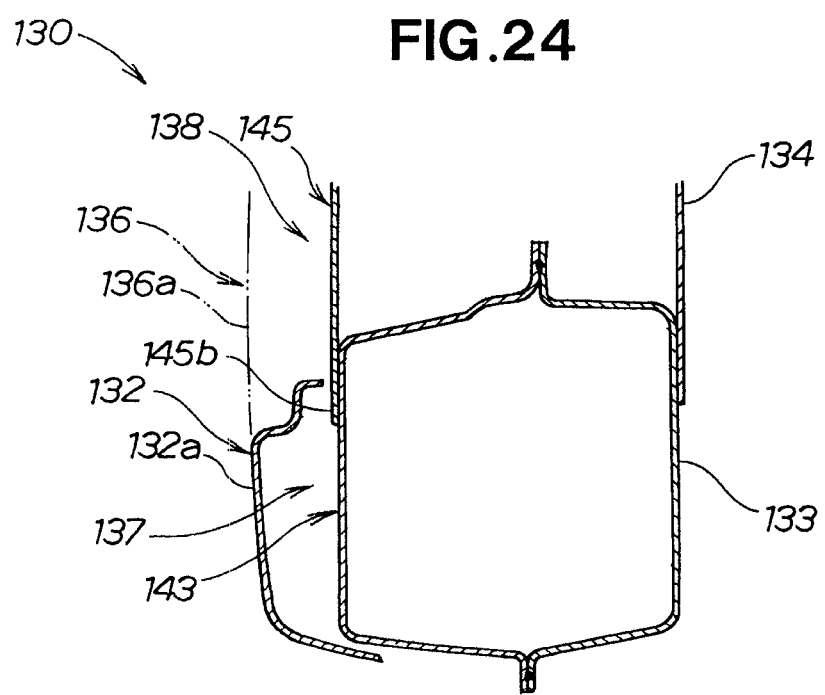
FIG. 24 is a cross-sectional view taken along line 24-24 of FIG. 23.
Figure 25:
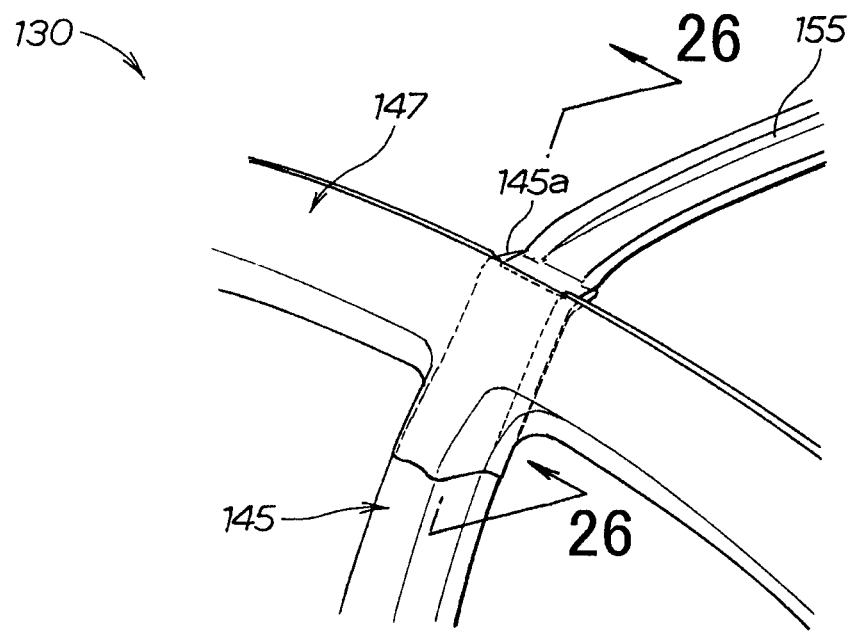
FIG. 25 is a perspective view of a roof rail section of FIG. 21.
Figure 26:
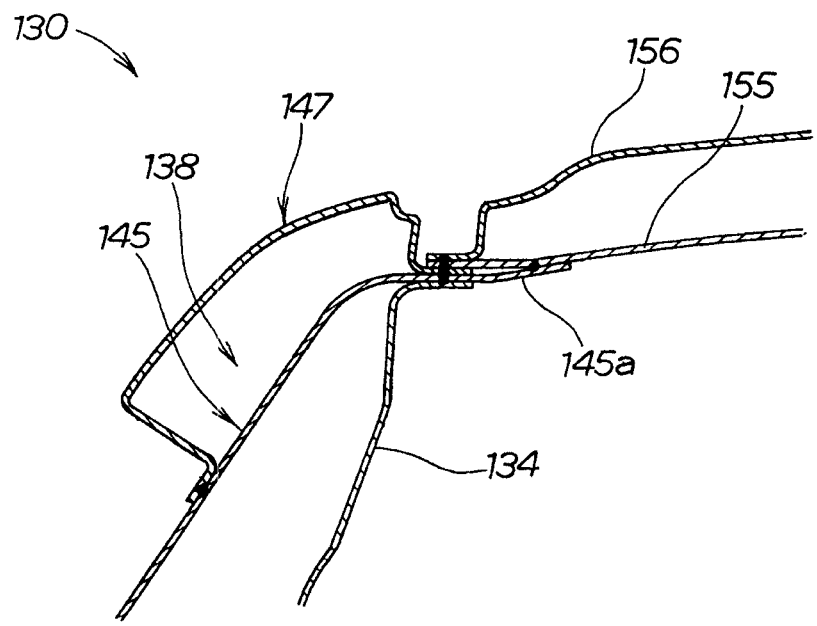
FIG. 26 is a cross-sectional view taken along line 26-26 of FIG. 25.

As shown in FIG. 24, the side panel outer member 131 is joined to a side sill inner section 133, a center pillar inner section 134, and other side panel inner members to form a closed section.

The side panel outer member 131 is composed of a side sill section 143 for covering the side sill inner section 133 from the outside of the vehicle body, a front pillar lower section 141 provided in front of the side sill section 143, a center pillar section 145 for covering the center pillar inner section 134 from the outside of the vehicle body, a rear pillar section 146 which constitutes a rear section of the side section of the vehicle body, a rear fender panel 149 formed behind the rear pillar section 146 to cover a rear section of the vehicle body, a roof rail section 147 which constitutes a top section of the vehicle body, and a reinforcing member (stiffener) 148 for reinforcing the roof rail section 147 from the inside thereof. The rear pillar section 146 and the rear fender panel 149 constitute a rear panel section 144.

The side sill section 143 extends linearly in the longitudinal direction of the vehicle body. The front pillar lower section 141 is erected substantially vertically from a front end of the side sill section 143.

The side sill section 143 and the front pillar lower section 141 are integrally formed via an elbow section 142. The front pillar lower section 141, the elbow section 142, and the side sill section 143 formed of different materials are joined together and press-formed in advance to form a lower frame section 151, as described hereinafter.

The roof rail section 147 and the rear panel section 144 are integrally formed of the same material, and constitute an upper frame section 152. The stiffener 148 is formed along the roof rail section 147.

In the front pillar lower section 141, side sill section 143, and elbow section 142, outside surfaces of side walls 141a, 142a, 143a extending between the front pillar lower section 141 and the side sill section 143 are formed flat. The side sill section 143 is sheathed or covered by the separately formed side sill garnish 132. An outer surface 132a of the side sill garnish 132 is continuous with an outer surface 136a of a fender panel (front fender panel) 136 shown in FIG. 24.

Specifically, the front pillar lower section 141, the side sill section 143, and the elbow section 142 are configured so that the outer surfaces of the side walls 141a, 142a, 143a thereof are at the same lateral position. As a result, at the elbow section 142 between the front pillar lower section 141 and the side sill section 143, at which stress is concentrated due to upward impacts or thrusts from front wheels particularly during travel, since the side walls 141a, 142a, 143a are made flat with no level difference from the front pillar lower section 141 to the side sill section 143 in the vehicle body side part structure 130, the chance for breakage is eliminated, out-of-plane deformation can be suppressed, and stiffness can be enhanced.

In the vehicle body side part structure 130, a flat exterior surface is formed by the fender panel (front fender panel) 136 and the side sill garnish 132, which is a separate component made of resin, as shown in FIG. 24.

Since an exterior surface is formed by the side sill garnish 132, which is a separate component made of resin, the outwardly protruding shape of the side sill section 143 is eliminated, and flattening of the side sill section 143 and of the front pillar lower section 141 that includes the elbow section 142 can therefore be easily accomplished.

As shown in FIGS. 23 through 26, a side sill 137 is composed of the side sill section 143 of the side panel outer member 131, and the side sill inner section 133 which forms a closed section with the side sill section 143. A center pillar 138 is composed of the center pillar section 145 of the side panel outer member 131 (FIG. 21), and the center pillar inner section 134 which forms a closed section with the center pillar section 145.

The center pillar section 145 is a member extending in an I-shape substantially vertically from an intermediate point of the side sill section 143 (see FIG. 21). An upper portion 145a of the center pillar section 145 is directly connected to a laterally extending roof arch 155. A lower portion 145b of the center pillar section 145 is directly joined to the side sill section 143. The roof arch 155 is covered by a roof panel 156. Weld points are indicated by bullet marks in FIG. 26.

As shown in FIG. 21, a side panel outer frame section 166 is formed by joining the ends of the lower frame section 151 and the upper frame section 152 (also including the reinforcing member 148).

The side panel outer member 131 is formed by joining the center pillar section 145 to the side panel outer frame section 166 formed from the lower frame section 151 and upper frame section 152.

Figure 27:
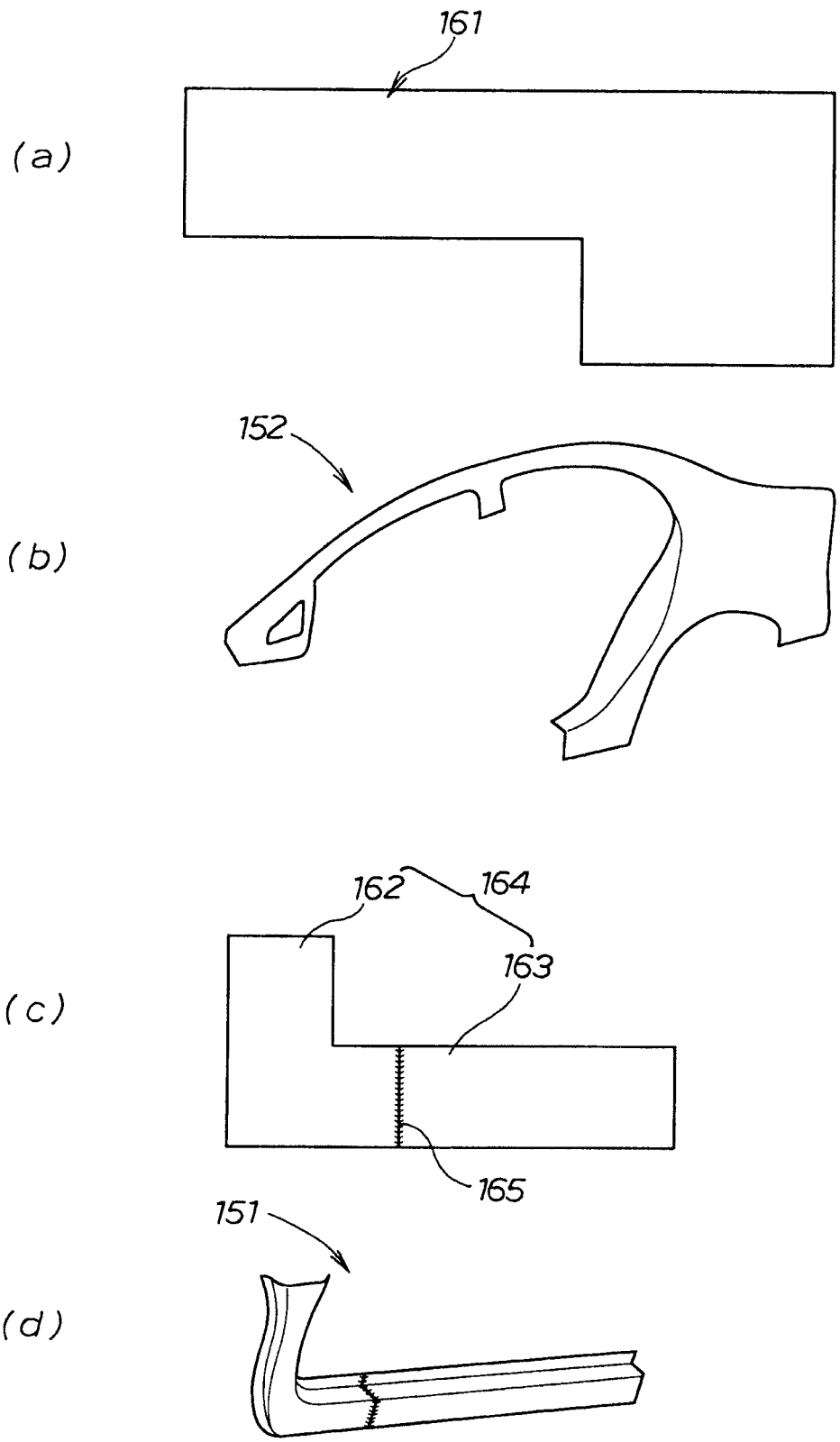
FIGS. 27(a) through 27(d) are views illustrative of the manner in which an upper frame section and a lower frame section are press-formed from blanks.

As shown in FIGS. 27(a) and 27(b), the upper frame section 152 is integrally formed of a cold rolled steel sheet (ordinary steel sheet) having a tensile strength exceeding 270 MPa that is easily press-formed, and of a cold rolled steel sheet of the same thickness. Specifically, a first blank 161 made of an ordinary steel sheet having a first thickness is used in the upper frame section 152 of the side panel outer frame section 166 (FIG. 21), and the first blank 161 is press-formed.

As shown in FIGS. 27(c) and 27(d), a second blank 162 made of a high-tensile steel sheet (tensile strength: 980 MPa) having a second thickness is used in the front pillar lower section 141 (as well as the elbow section 142) of the lower frame section 151, and a third blank 163 made of a high-tensile steel sheet (tensile strength: 980 MPa) having a third thickness is used in the side sill section 143. The second and third blanks 162, 163 are joined to form a composite blank (tailored blank) 164, and the composite blank 164 is press-formed. The third thickness is greater than the second thickness.

Figure 28:
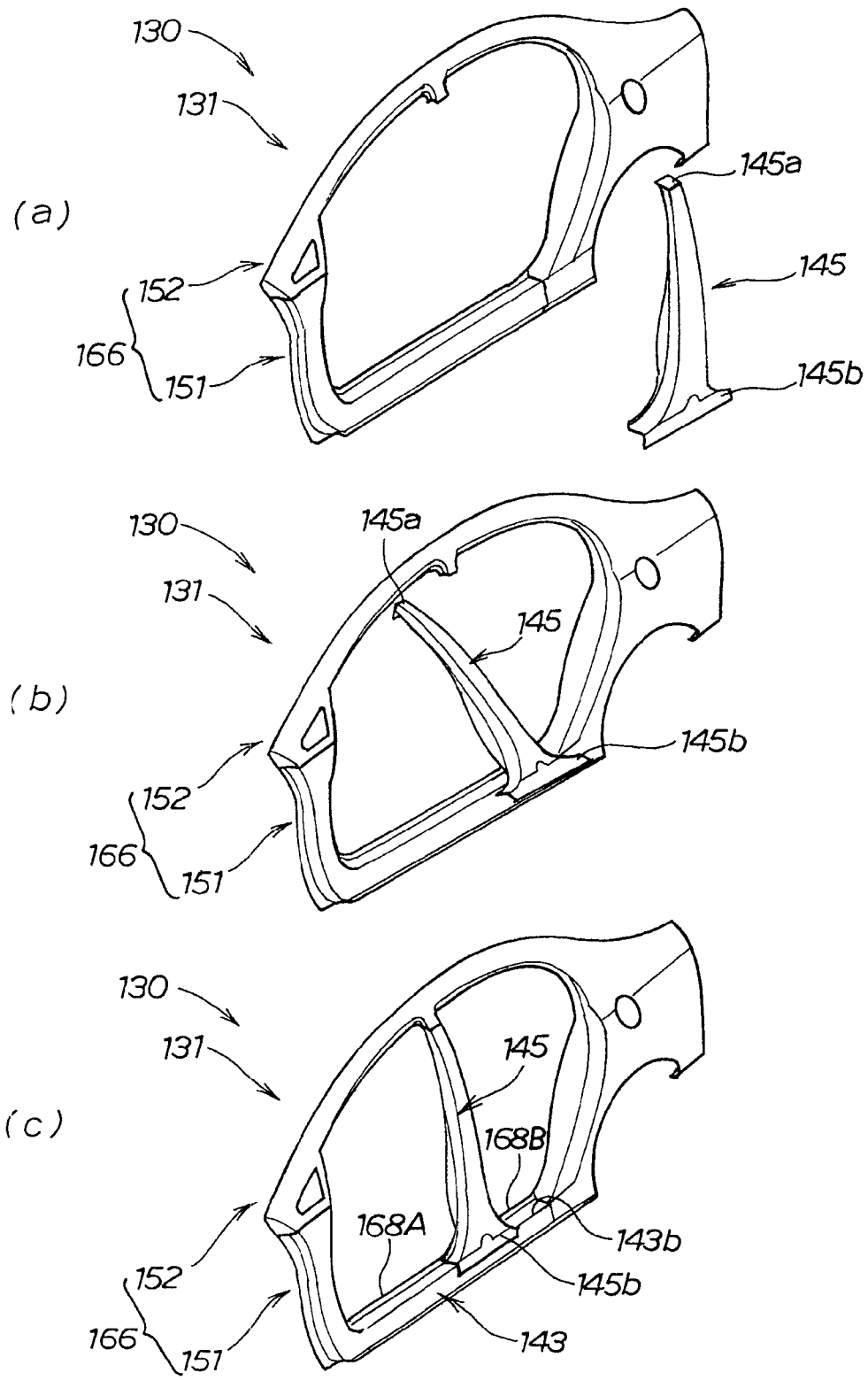
FIGS. 28(a) through 28(c) are views illustrative of the manner in which the center pillar section shown in FIG. 21 is assembled.

As shown in FIG. 28(a), the center pillar section 145 is hot-stamp formed of cold rolled steel sheets (hot-stamped steel) having tensile strengths of 590 to 1180 MPa. As shown in FIG. 28(b), the upper portion 145a of the hot-stamp formed center pillar section 145 is attached from inside the side panel outer frame section 166, and the lower portion 145b of the center pillar section 145 is attached from outside the side panel outer frame section 166.

Figure 23:
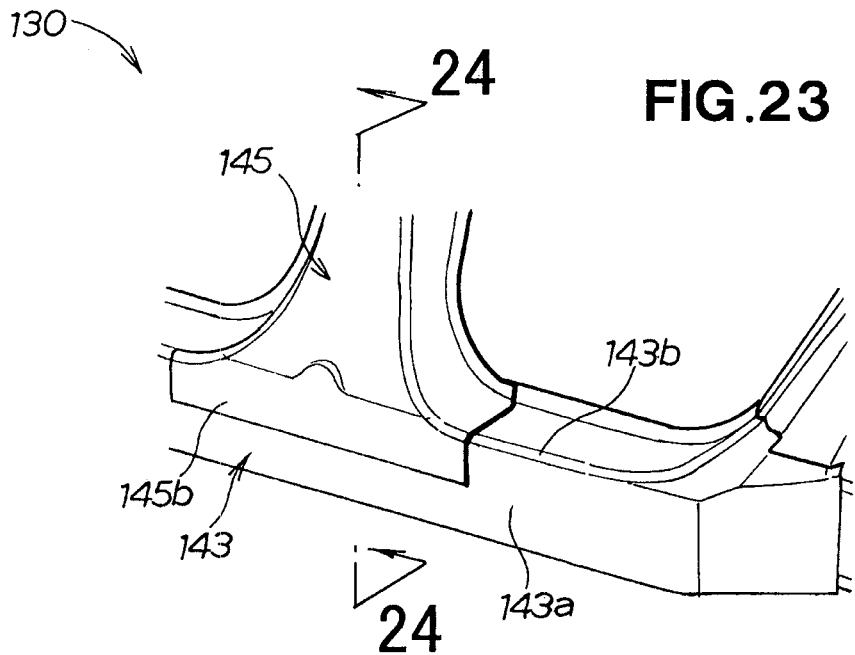
FIG. 23 is a perspective view illustrative of the manner in which a center pillar section and a side sill section of FIG. 21 are joined.

As shown in FIG. 28(c), since the lower portion 145b of the center pillar section 145 is placed in contact with the side sill section 143 and joined thereto, a ridgeline 143b in the side sill section 143 can be provided so as to extend without interruption from a rear end to a front end (see also FIG. 23). Specifically, the hot-stamp formed center pillar section 145 is attached to the side panel outer frame section 166, and the door openings 168A, 168B are formed in front of and behind the center pillar section 145.

As shown in FIG. 29(a), in a side sill 251 and center pillar 252 according to Conventional Technique 1, when a side sill section 253 and a center pillar section 254 are formed continuously with each other, the side sill section 253 cannot form a closed section with a side sill inner section 255. Consequently, a separately formed barrier (bulkhead) 256 is needed, and a closed section is difficult to form in the side sill 251.

As shown in FIG. 29(b), in the vehicle body side part structure 130 of the fourth embodiment, the center pillar section 145 is attached to the side panel outer frame section 166. Consequently, a closed section is easily formed in the side sill 137 and center pillar 138 by the side sill 137.

In this configuration, the lower portion 145b of the center pillar section 145 is also oriented downward with respect to the side sill section 143, and the lower portion 145b of the center pillar section 145 is covered by the side sill garnish 132. Consequently, the intrusion of rainwater in the direction indicated by the arrow e1 can be effectively prevented.

As shown in FIG. 30(a), in a lower frame section 261 according to Conventional Technique 2, a side panel outer member 262 forms an exterior surface, and is therefore integrally formed of a cold rolled steel sheet having low tensile strength. An outer surface 263a of a side sill section 263 is also continuous with an outer surface 264a of a fender panel (front fender panel) 264, and the side sill section 263 therefore protrudes outward. Consequently, a level difference 266 occurs between a front pillar lower section 265 and the side sill section 263.

Due to such effects as upward impacts or thrusts from the front wheels during travel, an upper member (not shown) positioned in front of the front pillar lower section 265 deforms upward, the front pillar lower section 265 is bent toward the rear, stress is concentrated at the level difference 266 between the front pillar lower section 265 and the side sill section 263, and an inward- or outward-folding load is exerted on the front pillar lower section 265 (causing out-of-plane deformation).

As shown in FIG. 30(b), in the lower frame section 151 of the vehicle body side part structure 130 according to the fourth embodiment, the front pillar lower section 141 and the side sill section 143 (including the elbow section 142) are configured so that the outer surfaces (outside surfaces) of the side walls 141a, 142a, 143a thereof are at the same lateral position. As a result, in the vehicle body side part structure 130, stress can be prevented from concentrating at the elbow section 142 between the front pillar lower section 141 and the side sill section 143, at which stress is concentrated due to upward impacts or thrusts from front wheels particularly during travel.

Specifically, since the outer surfaces of the side walls 141a, 142a, 143a are made flat (with no level difference) from the front pillar lower section 141 to the side sill section 143 (including the elbow section 142), factors which give rise to breakage are removed (the chance for breakage is eliminated), out-of-plane deformation can be suppressed, and stiffness can be enhanced.

As shown in FIG. 31(a), in the lower frame section 261 according to Conventional Technique 2, a front pillar lower stiffener 271 and a side sill reinforcement 272 are configured as separate components and connected so that outside surfaces of these two components are curved. These components are therefore brittle. Since the front pillar lower stiffener 271 and the side sill reinforcement 272 are configured as two components, localized deformation occurs at a joint 273 therebetween when a load is inputted, and the load cannot be efficiently transmitted.

A side wall surface 271a of the front pillar lower stiffener 271 and a side wall surface 272a of the side sill reinforcement 272 are also at different lateral positions, and a level difference 274 is therefore formed. When a load is inputted from in front of the front pillar lower stiffener 271 during travel or a collision, a moment occurs whereby the front pillar lower stiffener 271 tends to collapse toward the side sill reinforcement 272 from the level difference 274 portion. Specifically, the shearing force of the side wall surfaces 271a, 272a cannot be efficiently used.

As shown in FIG. 31(b), in the lower frame section 151 according to the fourth embodiment, since high-tensile steel sheets (tensile strength: 980 MPa) are used, and the outside surface 141a of the front pillar lower section 141 and the outside surface 143a of the side sill section 143 are formed flat, the chance for breakage is eliminated, out-of-plane deformation can be suppressed, and stiffness can be enhanced. As a result, bending stiffness and other aspects of static stiffness can be enhanced in the vehicle body, and it is also possible to enhance dynamic stiffness of the vehicle body in dynamic states created by such effects as upward impacts or thrusts of the front wheels during travel.

As shown in FIG. 32(a), since a surface mating 169 of the center pillar section 145 and the side panel outer frame section 166 is oriented downward in the vehicle body, the intrusion of rainwater in the direction indicated by the arrow f1 can be effectively prevented. As also shown in FIG. 29(b), the center pillar section 145 is structured so that rainwater is effectively prevented from intruding at the lower portion 145b.

As shown in FIG. 32(b), the center pillar section 145 is hot-stamp formed of cold rolled steel sheets (hot-stamped steel) having tensile strengths of 590 to 1180 MPa. Since the upper portion 145a of the high-strength center pillar section 145 is directly joined to the roof arch 155 without the interposition of a thin plate, in the case of a side impact to the center pillar section 145, the load can be efficiently transmitted from the center pillar section 145 to the roof arch 155 as indicated by the arrows g1.

The vehicle body side part structure 130 according to the fourth embodiment is provided with the side panel outer member 131 for covering a side of the vehicle body from the outside, as shown in FIGS. 21 through 26.

The roof rail section 147 and the rear panel section 144 of the side panel outer member 131 form the upper frame section 152 made of ordinary steel sheets, the front pillar lower section 141 and the side sill section 143 of the side panel outer member 131 form the lower frame section 151 made of high-tensile steel sheets, and the ends of the frame sections 151, 152 are connected to form the side panel outer frame section 166.

In the front pillar lower section 141, side sill section 143, and elbow section 142, the outside surfaces 141a, 142a, 143a extending from the front pillar lower section 141 to the side sill section 143 are formed flat, the side sill section 143 is sheathed or covered by the separately formed side sill garnish 132, and the outer surface 132a of the side sill garnish 132 and the outer surface 136a of the fender panel (front fender panel) 136 are made continuous with each other.

Specifically, since an ordinary steel sheet having good press-formability is used for the roof rail section 147, cracking can be suppressed during press forming of the roof rail section 147. Since the front pillar lower section 141 and the side sill section 143 are formed integrally of high-tensile steel sheets, the stiffness of the vehicle body can be enhanced.

In the front pillar lower section 141 and the side sill section 143, the outside surfaces 141a, 142a, 143a are made flat from the front pillar lower section 141 to the side sill section 143. Deformation of the front pillar lower section 141 can therefore be suppressed, and the stiffness of the vehicle body can be enhanced.

In the side sill section 143 and the front pillar lower section 141, at which stress due to such effects as upward impacts or thrusts of the front wheels during travel is concentrated, by adopting a configuration whereby the outside surfaces 141a, 142a, 143a are made flat from the front pillar lower section 141 to the side sill section 143, factors which give rise to breakage in the front pillar lower section 141 and the side sill section 143 are eliminated, deformation of the front pillar lower section 141 and the side sill section 143 is suppressed, and the stiffness of the vehicle body can be enhanced.

In the vehicle body side part structure 130 according to the fourth embodiment, the hot-stamped center pillar section 145 is attached to the side panel outer frame section 166, and door openings 168A, 168B are formed in front of and behind the center pillar section 145. The high stiffness and strength of the hot-stamped center pillar section 145 make it possible to further enhance the strength of the vehicle body.

Furthermore, in the vehicle body side part structure 130, the upper portion 145a of the hot-stamped center pillar section 145 is attached from the inside of the side panel outer frame section 166, and the lower portion 145b of the center pillar section 145 is attached from outside the side panel outer frame section 166. Specifically, since the lower portion 145b of the center pillar section 145 is configured so that the ridgeline 143b of the side sill section 143 can be provided so as to extend without interruption from a rear end to a front end, enhanced collision performance can be obtained in front impacts, rear impacts, and side impacts.

Since the upper portion 145a of the center pillar section 145 can be connected to the roof arch 155, for example, a load acting on the center pillar section 145 can be directly transmitted from the center pillar section 145 to the roof arch 155. Side impact performance can thereby be enhanced. It is also possible to dispense with reinforcing brackets and other members.

In the side panel outer frame section 166 of the vehicle body side part structure 130, a first blank 161 made of an ordinary steel sheet having a first thickness is used in the upper frame section 152, and the first blank 161 is press-formed. A second blank 162 made of a high-tensile steel sheet having a second thickness is used in the front pillar lower section 141 of the lower frame section 151, and a third blank 163 made of a high-tensile steel sheet having a third thickness is used in the side sill section 143 of the lower frame section 151. The second and third blanks 162, 163 are joined to form a composite blank 164, and the composite blank 164 is press-formed.

The lower frame section 151 formed by the second and third blanks 162, 163 can be hidden by a door (not shown) and/or the side sill garnish 132, and a join line 165 between the blanks 162, 163 is therefore hidden and made less noticeable by the door and/or the side sill garnish 132.

In the vehicle body side part structure 10 according to the third embodiment, the center pillar section 35 is hot-stamped of cold rolled steel sheets having tensile strengths of 590 to 1180 MPa, as shown in FIG. 15, but this configuration is not limiting and does not preclude other portions from also being hot-stamped of cold rolled steel sheets having tensile strengths of 590 to 1180 MPa.

In the vehicle body side part structure 10 as shown in FIG. 13, a cold rolled steel sheet having a tensile strength exceeding 980 MPa is used inside the stiffener 38 of the roof rail section 37, but this configuration is not limiting and does not preclude the use of cold rolled steel sheets having a tensile strength exceeding 980 MPa from being used in other portions as well.

In the vehicle body side part structure 10 as shown in FIG. 16, the center pillar section 35 is linked to the roof arch 84 extending laterally from the upper portion of the center pillar inner section 25, via the closed section 49, but a plurality of roof arches may also be provided.

In the vehicle body side part structure 10, since a plurality of longitudinally arranged roof arches is joined to the closed section 49, side impact loads can be dispersed to the plurality of roof arches via the closed section.

In addition to forming a closed section with the roof rail inner section, the reinforcing member may be a pipe or other hollow piece.

FIFTH EMBODIMENT

A vehicle body side part structure according to a fifth embodiment will next be described.

Figure 33:
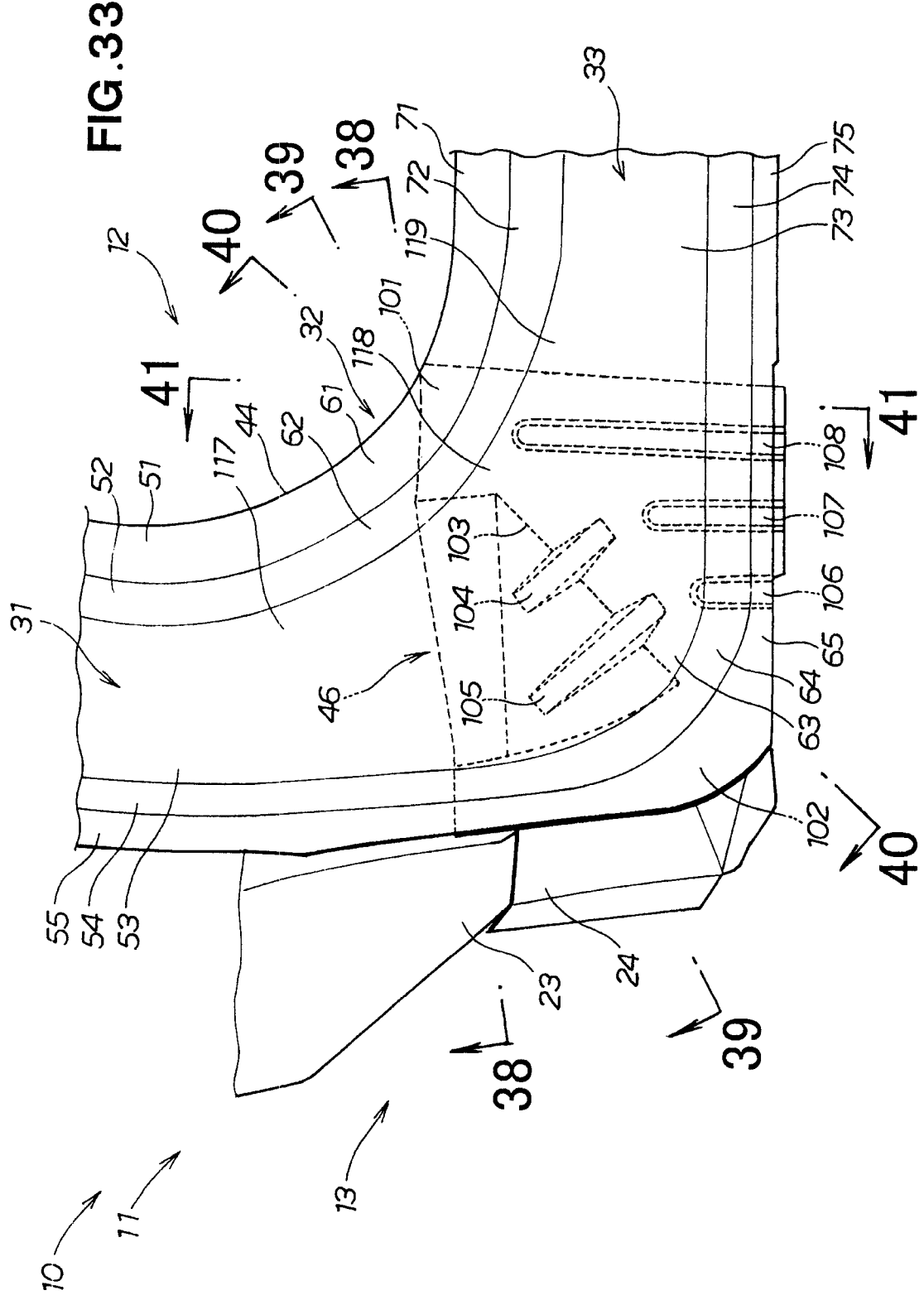
FIG. 33 is a side view of a vehicle body side part structure according to a fifth embodiment.
Figure 34:
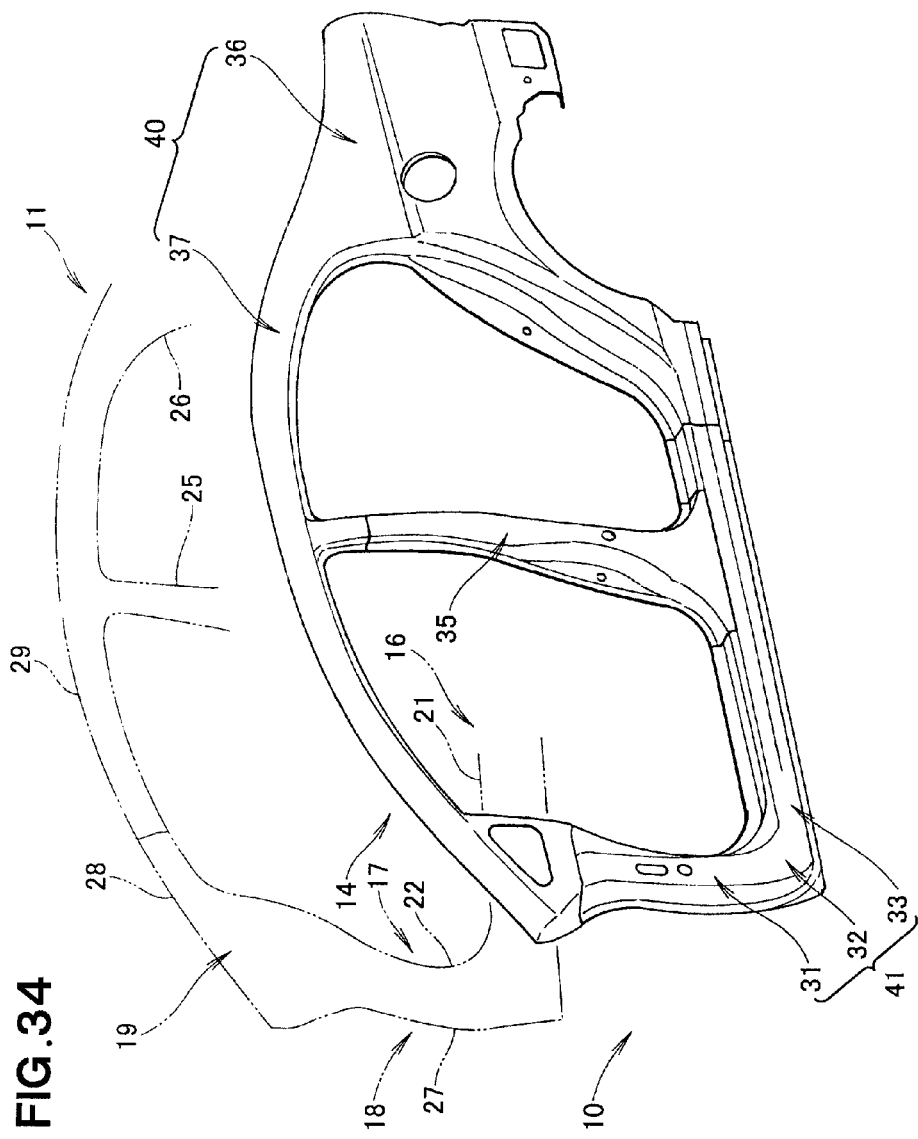
FIG. 34 is a perspective view of a side panel outer member used in the vehicle body side part structure according to the fifth embodiment.
Figure 35:
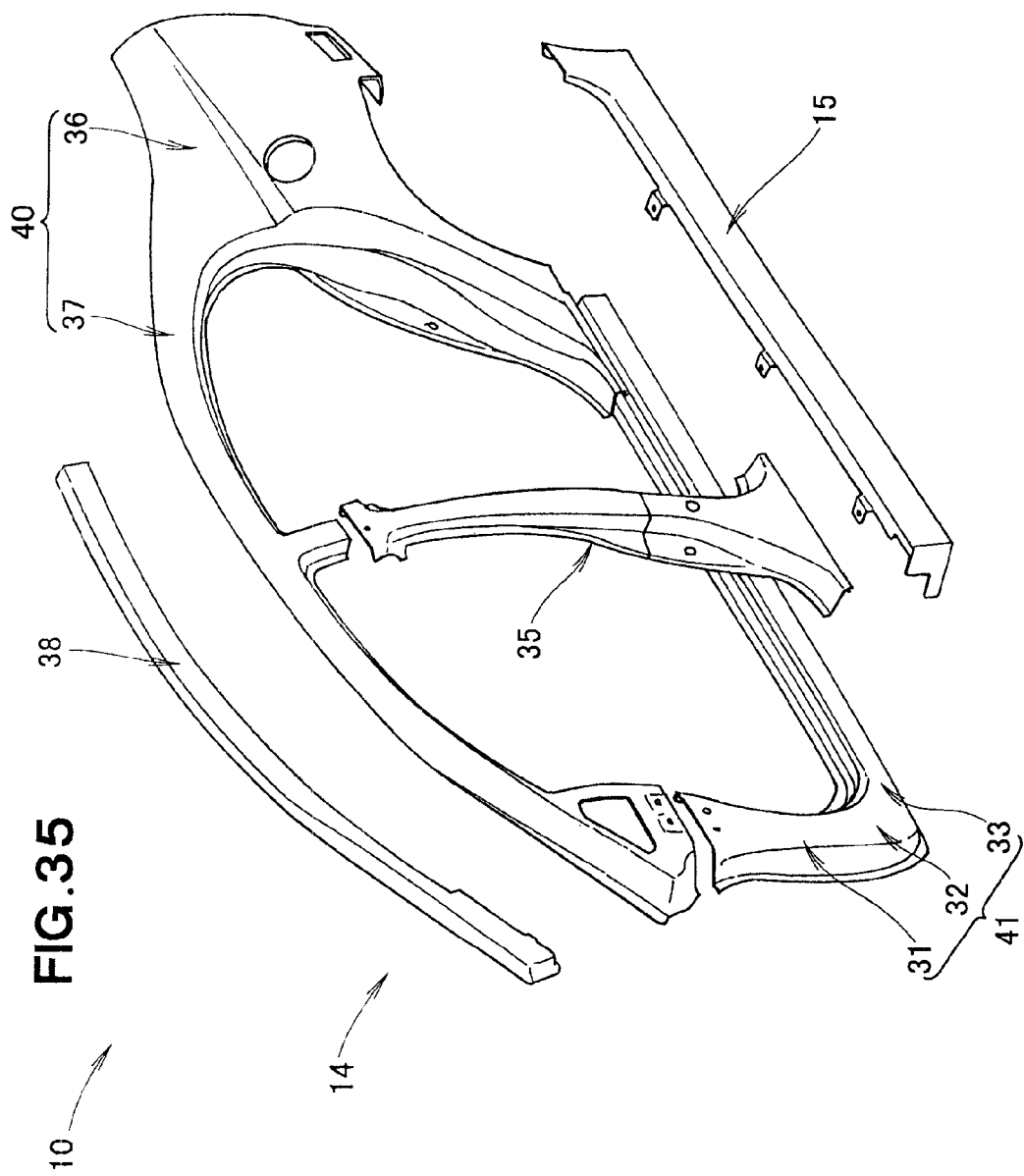
FIG. 35 is an exploded perspective view of the side panel outer member of FIG. 34.

As shown in FIGS. 33 through 35, the vehicle body includes a dashboard lower member 23 for partitioning an engine compartment 13 and a passenger compartment 12, an outrigger 24 for connecting a side sill 16 and a floor frame (not shown), a side sill inner section 21 extending in a longitudinal direction of the vehicle body, a front pillar inner section 27 extending in a vertical direction of the vehicle body, a roof rail inner section 29 extending in the longitudinal direction of the vehicle body at an upper portion of the vehicle body, a rear pillar inner section 26 provided on a side of a rear part of the vehicle body, a side panel outer member 14 for covering the side sill inner section 21, front pillar inner section 27, roof rail inner section 29, and rear pillar inner section 26 from the outside of the vehicle body, and a side sill garnish 15 for covering a side sill section 33 of a side panel outer member 14 from the outside.

A side panel 11 is composed of the side panel outer member 14 and a side panel inner member 19.

The side panel outer member 14 is composed of the side sill section 33 for covering the side sill inner section 21 from the outside of the vehicle body, a front pillar lower section 31 for covering the front pillar lower inner section 22 from the outside of the vehicle body, a center pillar section 35 for covering the center pillar inner section 25 from the outside of the vehicle body, a rear pillar section 36 for covering the rear pillar inner 26 from the outside of the vehicle body, a roof rail section 37 for covering the roof rail inner section 29 and an inclined section 28 of the front pillar inner section 27 from the outside of the vehicle body, and a roof rail stiffener 38 for reinforcing the roof rail section 37 from inside thereof.

The side sill section 33 extends linearly in the longitudinal direction of the vehicle body. The front pillar lower section 31 is erected substantially vertically from the front end of the side sill section 33.

The side sill section 33 and the front pillar lower section 31 are integrally formed via an elbow section 32. Specifically, the front pillar lower section 31, the elbow section 32, and the side sill section 33 constitute an L-shaped member (lower frame section) 41.

A substantially rectangular reinforcing member 46 for increasing the stiffness and strength of the elbow section 32 is provided on the elbow section 32 and disposed inside a closed section of the elbow section 32. The reinforcing member 46 is specifically a jack-up base against which a jack (not shown) is placed when the vehicle body is to be lifted.

The dashboard lower member 23, outrigger 24, side sill inner section 21, front pillar inner section 27 (including the front pillar lower inner section 22), roof rail inner section 29, and rear pillar inner section 26 correspond to the side panel inner member (inner side member) 19 provided on the side of the vehicle body.

The elbow section 32 is composed of a vertical section 117 connected to the front pillar lower section 31, a curved section 118 as a center portion, and a horizontal section 119 connected to the side sill section 33.

The center pillar section 35 is a member extending in an I shape substantially vertically from an intermediate point of the side sill section 33. The roof rail section 37 and the rear pillar section 36 are integrally formed of the same material and form a composite member 42. The reinforcing stiffener 38 is formed so as to conform to the roof rail section 37.

Specifically, the side panel outer member 14 is formed by joining the separately formed L-shaped member 41, the upper frame section 42, the center pillar section 35, and the reinforcing stiffener 38.

The L-shaped member 41 having the integrated side sill section 33 and front pillar lower section 31 is formed of SPC 980 or another cold rolled high-tensile steel sheet.

The front pillar 18 is composed of the front pillar inner section 27 and a front part of the front pillar lower section 31 and roof rail section 37. The front pillar inner section 27 is composed of the front pillar lower inner section 22 and the inclined section 28. The front pillar lower member 17 is composed of the front pillar lower inner section 22 and the front pillar lower section 31.

The side sill 16 is composed of the side sill inner section 21 and the side sill section 33.

The front pillar lower section 31, the elbow section 32, and the side sill section 33 are hat-shaped in cross-section. Specifically, a hat-shaped section (front pillar lower section 31, elbow section 32, and side sill section 33) is composed of inner flanges 51, 61, 71 formed on the inside of the vehicle body along a door opening 44, inner walls (inner surfaces) 52, 62, 72 leading laterally outward from the inner flanges 51, 61, 71, side walls (side surfaces) 53, 63, 73 formed along the lateral outer surface from the inner walls 52, 62, 72, outer walls (outer surfaces) 54, 64, 74 leading laterally inward from the side walls 53, 63, 73, and outer flanges 55, 65, 75 hanging down from the outer walls 54, 64, 74.

Figure 36:
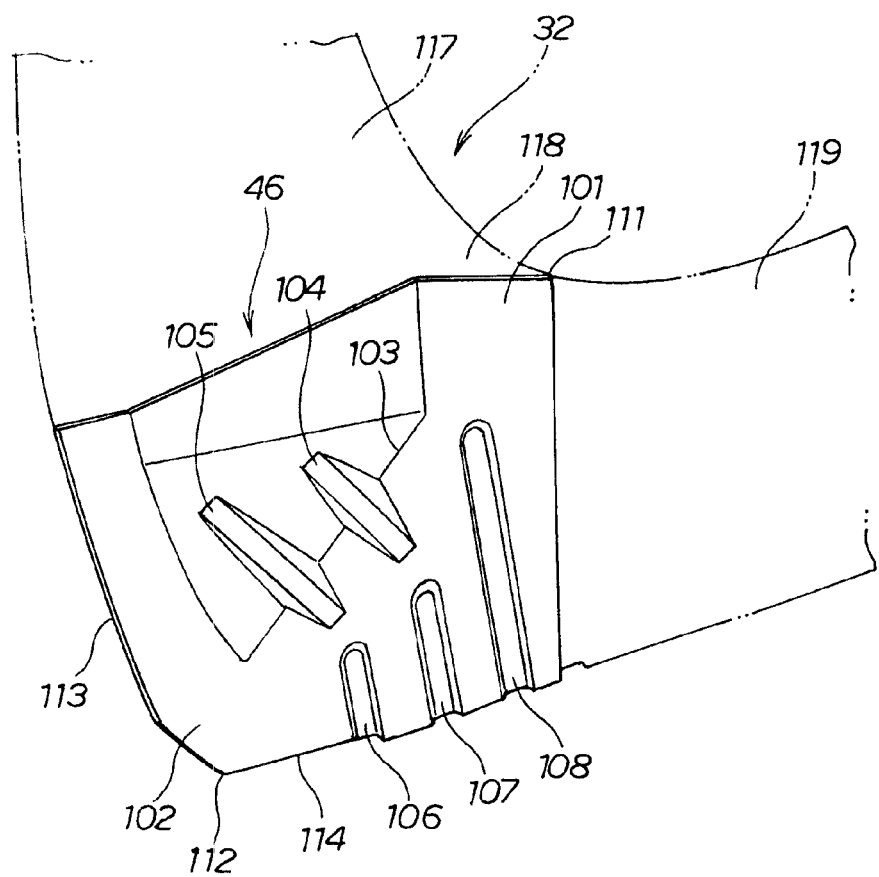
FIG. 36 is a perspective view of a reinforcing member used in the vehicle body side part structure according to the fifth embodiment.
Figure 37:
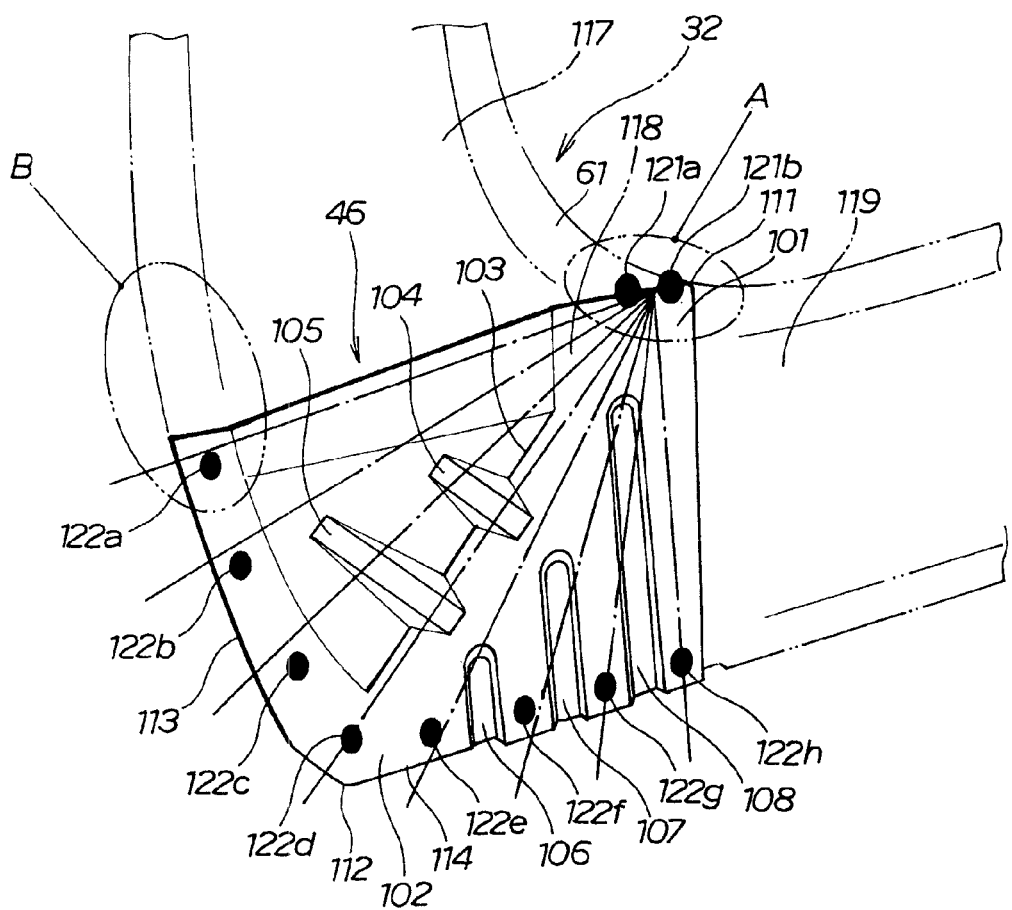
FIG. 37 is a perspective view showing weld points on the reinforcing member shown in FIG. 36.

As shown in FIGS. 36 and 37, the reinforcing member 46 has an inner joint portion 101 connected to the inner flange 61 of the elbow section 32, an outer joint portion 102 connected to the outer flange 65 of the elbow section 32, a ridgeline (bend) 103 formed in a center portion of an arc of the outer joint portion 102 from the inner joint portion 101, a first cross bead 104 and second cross bead 105 formed so as to intersect the ridgeline 103, and first through third vertical beads 106 through 108 extending upward from the bottom of the outer joint portion 102.

The ridgeline (bend) 103, the first cross bead 104, the second cross bead 105, and the first through third vertical beads 106 through 108 correspond to cross-sectional variations for reinforcing the elbow section 32.

The reinforcing member 46 has the inner joint portion 101 formed at one corner 111 of the substantially rectangular shape and joined to the inner flange 61, and the outer joint portion 102 joined to the outer flange 65 and formed by another corner 112 opposite the corner 111 and by two edges 113, 114 on either side of the corner 112. The outer joint portion 102 joined to the outer flange 65 (FIG. 33) is formed in a substantially radial shape centered at the inner joint portion 101 joined to the inner flange 61.

As shown in FIG. 37, the inner joint portion 101 is formed only in a center portion of the arc of the curved section 118 of the elbow section 32. The outer joint portion 102 is formed so as to span the vertical section 117, curved section 118, and horizontal section 119 of the elbow section 32. The inner joint portion 101 is welded only in the center portion of the arc of the inner flange 61 in the curved section 118, at weld points 121a, 121b. The outer joint portion 102 is welded to the outer flange 65 (FIG. 33) in the vertical section 117, the curved section 118, and the horizontal section 119 at weld points 122a through 122h.

The reinforcing member 46 is welded to the inner flange 61 and the outer flange 65 at the weld points 122a through 122h arranged in a substantially radial pattern having the weld points 121a, 121b at the substantial center thereof. Specifically, the reinforcing member 46 composed of substantially rectangular plates can be disposed on the inside of the cross-sectionally U-shaped elbow section 32 to minimize variation or deformation of the cross-section of the elbow section 32.

The reinforcing member 46 is also provided throughout elbow section 32 directly above the jack-up point. A predetermined strength can thus be ensured in the elbow section 32.

Figure 38:
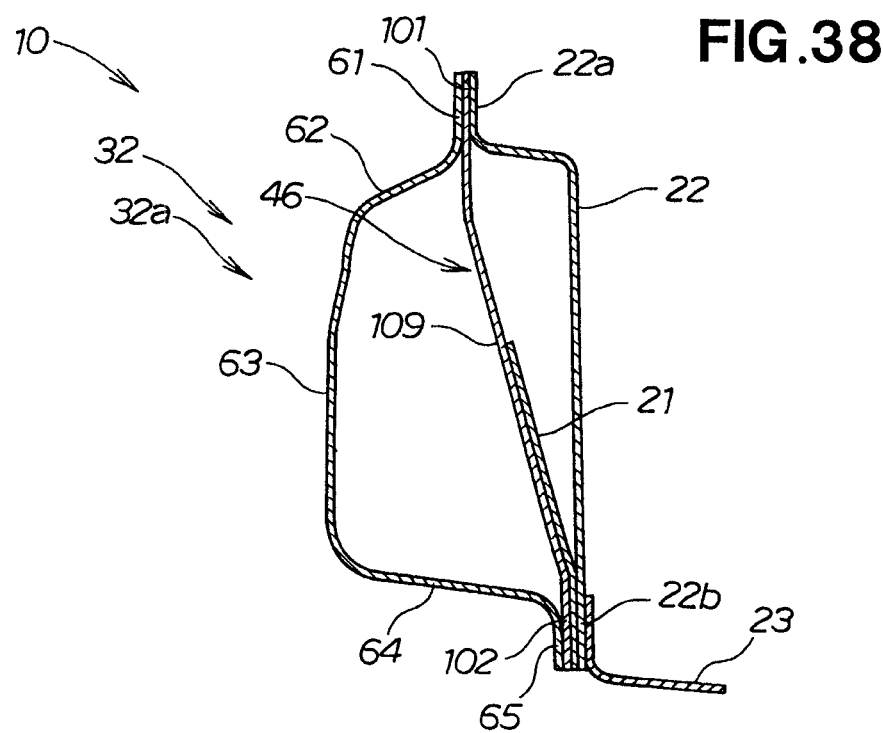
FIG. 38 is a cross-sectional view taken along line 38-38 of FIG. 33.

FIGS. 38 through 41 show cross-sectional shapes where the elbow section 32 is cut radially about a point of the inner flange 61 of the elbow section 32. As shown in FIG. 38, in an upper portion 32a of the elbow section 32, the inner joint portion 101 of the reinforcing member 46 is joined to the inner flange 61, the outer joint portion 102 of the reinforcing member 46 is joined to the outer flange 65, the side sill inner section 21 is joined to the reinforcing member 46 from a middle portion 109 thereof to the outer joint portion 102, an inner flange 22a of the front pillar lower inner section 22 is joined to the inner joint portion 101 of the reinforcing member 46, an outer flange 22b of the front pillar lower inner section 22 is joined to the side sill inner section 21, and the dashboard lower member 23 is joined to the outer flange 22b of the front pillar lower inner section 22.

Figure 39:
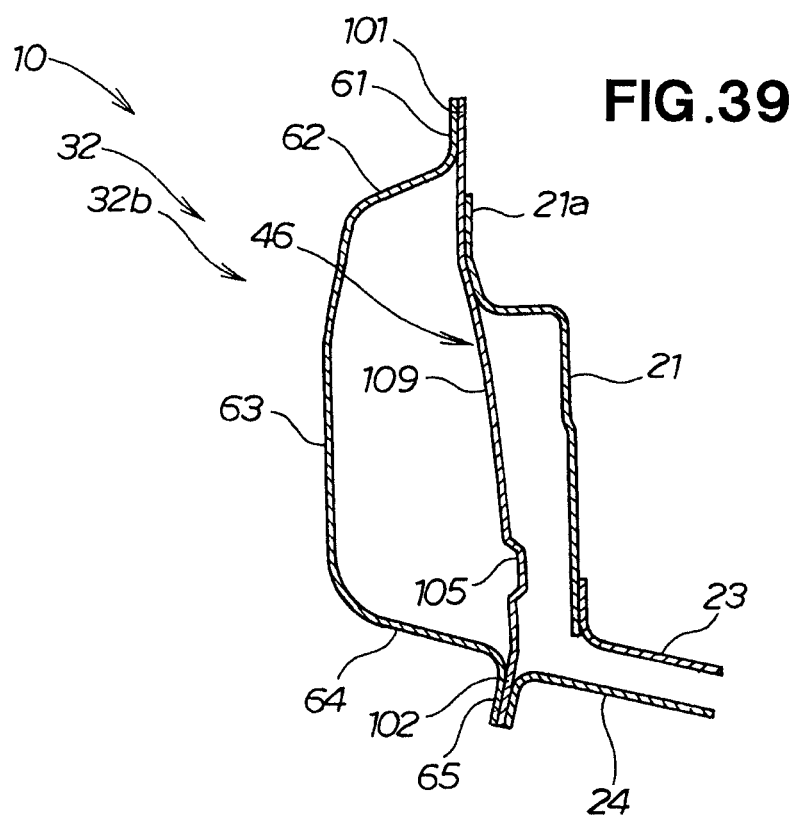
FIG. 39 is a cross-sectional view taken along line 39-39 of FIG. 33.

As shown in FIG. 39, in an upper middle portion 32b of the elbow section 32, the inner joint portion 101 of the reinforcing member 46 is joined to the inner flange 61, the outer joint portion 102 of the reinforcing member 46 is joined to the outer flange 65, an inner flange 21a of the side sill inner section 21 is joined to the reinforcing member 46 at a point thereof near the inner joint portion 101, the outrigger 24 is joined to the outer joint portion 102 of the reinforcing member 46, and the dashboard lower member 23 is joined to the side sill inner section 21.

As shown in FIG. 40, in a lower middle portion 32c of the elbow section 32, the inner joint portion 101 of the reinforcing member 46 is joined to the inner flange 61, the outer joint portion 102 of the reinforcing member 46 is joined to the outer flange 65, the inner flange 21a of the side sill inner section 21 is joined to the reinforcing member 46 at a point thereof near the inner joint portion 101, the outrigger 24 is joined to the outer joint portion 102 of the reinforcing member 46, and the dashboard lower member 23 is joined to the side sill inner section 21.

As shown in FIG. 41, in a rear section 32d of the elbow section 32, the inner joint portion 101 of the reinforcing member 46 is joined to the inner flange 61, the outer joint portion 102 of the reinforcing member 46 is joined to the outer flange 65, the side sill inner section 21 is joined to the reinforcing member 46 from a point thereof near the inner joint portion 101 to the outer joint portion 102, the inner flange 21a of the side sill inner section 21 is joined to the reinforcing member 46 at a point thereof near the inner joint portion 101, an outer flange 21b of the side sill inner section 21 is joined to the outer joint portion 102 of the reinforcing member 46, and the dashboard lower member 23 is joined to the side sill inner section 21.

Specifically, as shown in FIGS. 38 through 41, the vehicle body side part structure 10 is composed of the side panel outer member 14 shown in FIG. 35 and formed with the front pillar lower section 31, the elbow section 32, and the side sill section 33; the substantially rectangular reinforcing member 46 disposed in the elbow section 32 and in a closed section; and the inner side member 19 (see FIG. 34) made up of the dashboard lower member 23, outrigger 24, side sill inner section 21, front pillar inner section 27, and other components. The stiffness and strength of the elbow section 32 is enhanced by causing the reinforcing member 46 to reach every part of the elbow section 32.

As shown in FIGS. 37, 38, and 40, the inner flange 61 in portion A and the outer flange 65 in portion B are at different lateral positions. Specifically, the outer joint portion 102 and inner joint portion 101 of the reinforcing member 46 are normally offset laterally inward, it is often difficult to pass the reinforcing member 46 in a straight line between the outer joint portion 102 and inner joint portion 101, and the reinforcing member 46 is crooked. The ridgeline 103 is therefore included in the reinforcing member (jack-up base) 46, creating a shape that is prone to deformation.

Therefore, by forming the first and second cross beads 104, 105 so as to intersect the ridgeline 103 of the reinforcing member 46, deformation of the reinforcing member 46 can be suppressed. The reinforcing member 46 can be provided throughout the cross-section of the elbow section 32, and the stiffness of the vehicle body can be further enhanced.

Specifically, in the vehicle body side part structure 10, the outer joint portion 102 is formed in a radial shape centered at the inner joint portion 101 in the substantially rectangular reinforcing member 46, the inner joint portion 101 is joined to the inner flange 61, and the outer flange 65 is welded in a radial pattern to the outer joint portion 102. The reinforcing member 46 is thereby provided throughout the cross-section of the elbow section 32, and cross-sectional deformation of the elbow section 32 is minimized. Meanwhile, the substantially rectangular reinforcing member 46, the cross-section of which is reinforced by the first through third vertical beads 106 through 108, is provided on the entire elbow section 32 directly above the jack-up point, and the strength of the jack-up point can thereby be ensured.

FIGS. 42(a) and 42(b) show deformation of a sectional space by expansion and contraction (breathing). The term "breathing deformation" is used to refer to cross-sectional deformation consisting of repeated instances of a process in which the inner flanges 61, 21a and the outer flanges 65, 21b approach each other as indicated by the arrows a1, a2, causing the entire cross-section composed of the elbow section 32 and the side sill inner section 21 to expand in the direction orthogonal to a line connecting the inner flanges 61, 21a and the outer flanges 65, 21b, as shown in FIG. 42(a), and a process in which the inner flanges 61, 21a and the outer flanges 65, 21b move apart as indicated by the arrows a3, a4, causing the entire cross-section composed of the elbow section 32 and the side sill inner section 21 to collapse in the direction orthogonal to a line connecting the inner flanges 61, 21a and the outer flanges 65, 21b, as shown in FIG. 42(b).

By providing the reinforcing member 46 shown in FIGS. 38 through 41 throughout the cross-section of the elbow section 32 in the vehicle body side part structure 10, (breathing) deformation of the cross-section is prevented.

As shown in FIG. 43(a), in a vehicle body side part structure 220 according to a conventional technique, a reinforcing member (jack-up base) 226 is joined to an outer flange 225 and a front-end inner section 224a of a side wall 224 on the side of a side sill section (horizontal section) 223 of an elbow section 222, and an extending section 227 of the reinforcing member 226 is joined to the outer flange 225 on the side of a front pillar lower section (vertical section) 221.

Specifically, in a structure configured so that the reinforcing member 226 is joined to the outer flange 225 and the front-end inner section 224a of the elbow section 222 and the extending section 227 of the reinforcing member 226 is joined to the outer flange 225 of the elbow section 222, the reinforcing member 226 is not provided throughout the cross-section of the elbow section 222, and significant deformation of the cross-section of the elbow section 222 therefore occurs.

As shown in FIG. 43(b), in the vehicle body side part structure 10 according to the embodiment of the present invention, providing the reinforcing member 46 throughout the cross-section of the elbow section 32 leads to reduced breathing deformation of the cross-section of the elbow section 32. Since the reinforcing member 46 also serves as a jack-up base, and the first through third vertical beads 106 through 108 are formed for suppressing deformation of the reinforcing member 46, cross-sectional deformation can be further suppressed.

As shown in FIGS. 33 through 37, in the vehicle body side part structure 10, the inner side member 19 provided on the vehicle body side is covered from the outside by the side panel outer member 14, and a closed-section structure is formed by the inner side member 19 and the side panel outer member 14.

The side panel outer member 14 is provided with the side sill section 33 extending in the longitudinal direction of the vehicle body, the front pillar lower section 31 extending in the vertical direction of the vehicle body and formed integrally with the side sill section 33 via the elbow section 32, the inner flanges 51, 61, 71 and outer flanges 55, 65, 75 joined to the inner side member 19 and formed continuously with the front pillar lower section 31, side sill section 33, and elbow section 32, and the substantially rectangular reinforcing member 46 disposed in the closed section in the elbow section 32.

The reinforcing member 46 is provided with the inner joint portion 101 formed at one corner 111 of the substantially rectangular shape and joined to the inner flange 61, and the outer joint portion 102 joined to the outer flange 65 and formed by another corner 112 opposite the corner 111 and by two edges 113, 114 on either side of the corner 112, and the outer joint portion joined to the outer flange 65 is formed in a substantially radial shape centered at the inner joint portion 101 joined to the inner flange 61. The reinforcing member 46 can therefore be provided throughout the cross-section of the elbow section 32. This arrangement contributes to the strength and stiffness of the elbow section 32 and makes it possible to reduce breathing deformation in which the cross-section of the elbow section 32 undergoes repeated deformation. As a result, the stiffness of the vehicle body can be enhanced, and the maneuvering and stability (stability and controllability) of the vehicle can be enhanced.

In the vehicle body side part structure 10, since the outer joint portion 102 of the reinforcing member 46 is offset laterally inward from the inner joint portion 101, the reinforcing member 46 can be made to conform to the side panel outer member 14 and/or the inner side member 19 throughout the cross-section of the elbow section 32.

The reinforcing member 46 has the ridgeline 103 formed so as to protrude toward the side panel outer member 14 and disposed in a central area extending substantially radially from the inner joint portion 101 toward the outer joint portion 102, and the reinforcing beads 104, 105 are formed astride the outer flange 65. Deformation of the reinforcing member 46 can therefore be suppressed. Providing the reinforcing member 46 throughout the cross-section of the elbow section 32 also makes it possible to further enhance the stiffness of the vehicle body.

In the vehicle body side part structure 10, since the reinforcing member 46 serves as a jack-up base against which a jack (not shown) is placed when the vehicle body is to be lifted, the entire elbow section 32, the cross-section of which is reinforced, can be used as a jack-up point for lifting the vehicle body. As a result, adequate stiffness and strength can be ensured in the jack-up point.

In the vehicle body side part structure 10, since the reinforcing member 46 has cross-sectional variations (the ridgeline 103, the first cross bead 104, the second cross bead 105, and the first through third vertical beads 106 through 108) for reinforcing the elbow section 32, the strength and stiffness of the reinforcing member 46 can be ensured.

In the vehicle body side part structure 10, the outer joint portion 102 is formed so as to span the vertical section 117, curved section 118, and horizontal section 119 of the elbow section 32, and the inner joint portion 101 is formed only in a center portion of the arc of the curved section 118. As a result, reinforcement can be provided predominantly to the outside of the elbow section 32, and the elbow section 32 can be efficiently reinforced.

As shown in FIG. 40, the first and second cross beads 104, 105 and the first through third vertical beads 106 through 108 are formed separately in the vehicle body side part structure according to the present invention, but this configuration is not limiting, and the cross beads and vertical beads may be formed continuously with each other.

INDUSTRIAL APPLICABILITY

The vehicle body side part structure according to the present invention is suitable for use in a passenger vehicle provided with a vehicle body side part structure having a side panel outer member for covering a side of the vehicle body from the outside.

REFERENCE SIGNS LIST

10: Vehicle Body Side Part Structure,
11: Side Panel,
14: Side Panel Outer Member,
19: Side Panel Inner Member,
20: Upper Member,
21: Side Sill Inner, 31: Front Pillar lower Section,
31a: Upper End,
32: Elbow Section,
33: Side Sill Section,
35: Center Pillar Section,
35a: Upper Portion (upper end),
35b: Lower Portion (lower end),
37: Roof Rail Section,
37a: Front Pillar Upper Section,
37c: Lower End,
38: Reinforcing Member (stiffener),
38a: Front End,
38c: Outer Surface,
46: Reinforcing Member,
51, 61, 71: Inner flange,
55, 65, 75: Outer flange,
53, 63, 73: Side Wall,
54: Front Part,
72: Outer Surface (lateral outer surface),
96: Side Panel Outer Frame Section,
101: Inner Joint Portion,
102: Outer Joint Portion,
103: Ridgeline,
104, 105: Reinforcing Beads (first and second cross beads),
111, 112: Corner,
113, 114: Edge,
117: Vertical Section,
118: Curved Section,
119: Horizontal Section,
130: Vehicle Body Side part Structure,
131: Side Panel Outer Member,
132: Side Sill Garnish,
132a: Outer Surface,
36: Fender Panel (front fender panel),
136a: Outer Surface,
141: Front Pillar Lower Section,
141a, 142a, 143a: Outside Surface,
142: Elbow Section,
143: Side Sill Section,
143b: Ridgeline,
145: center Pillar Section,
145a: Upper Portion,
145b: Lower Portion,
151: Lower Frame Section,
152: Upper Frame Section,
161, 162, 163: First Through Third Blanks,
164: Composite Blank,
166: Side Panel Outer Frame Section,
171: Extending Section,
178: Upper Member Joint Section,
181: Joint

The invention claimed is:

1. A vehicle body side part structure including a side panel outer member for covering a side of a vehicle body from the outside, wherein the side panel outer member comprises a front pillar lower section formed of a high-tensile steel sheet, a front pillar upper section formed of an ordinary steel sheet, and a reinforcing member disposed along the front pillar upper section, wherein the front pillar lower section and the front pillar upper section are manufactured separately from one another, the front pillar lower section has an upper end joined to an inside surface of a lower end of the front pillar upper section, and the reinforcing member has a front end connected to an inside surface of the upper end of the front pillar lower section, and wherein the reinforcing member has an extending section extending downward substantially vertically from a lower portion of the front end of the reinforcing member, the extending section being joined to the inside surface of the upper end of the front pillar lower section.

2. The vehicle body side part structure of claim 1, further including an upper member extending in a longitudinal direction of the vehicle body and having a closed section, the upper member being fan-shaped and flaring toward a rear end thereof, the upper member having, at the flared rear end thereof, an upper member joint section joined to a front part of the front pillar lower section and to the front end of the reinforcing member, wherein the upper member joint section of the upper member, the front part of the front pillar lower section and the front end of the reinforcing member are joined together such that an extension line extending in the longitudinal direction of the vehicle body along a joint between the front pillar lower section and the reinforcing member passes through a substantial center of the upper member joint section.

3. The vehicle body side part structure of claim 1, wherein the front pillar lower section formed of a high-tensile steel sheet is formed integrally with a side sill section extending toward the rear of the vehicle body via an elbow section from a lower portion of the front pillar lower section.

4. The vehicle body side part structure of claim 3, wherein each of the front pillar lower section, the elbow section, and the side sill section has side walls, and the side walls are smooth, flat surfaces.

5. The vehicle body side part structure of claim 2, wherein the upper member has a reinforcing structure facing the front pillar lower section, the reinforcing structure and the upper member together forming a closed section therebetween.

6. The vehicle body side part structure of claim 1, wherein the reinforcing member is joined to a side wall and a front wall of the front pillar lower section.

7. A vehicle body side part structure including a side panel outer member for covering a side of a vehicle body from the outside, wherein the side panel outer member includes:
   an upper frame section formed of an ordinary steel sheet and having a roof rail section and a rear panel section formed integrally with each other, the rear panel section including a rear fender panel;
   an L-shaped lower frame section formed of a high-tensile steel sheet and having a front pillar lower section, an elbow section, and a side sill section formed integral with one another;
   the upper frame section having a first end and a second end opposite to the first, and the lower frame section having a first end and a second end opposite to the first end of the lower frame section;
   a side panel outer frame section is formed by joining the first and second ends of the lower frame section and the first and second ends of the upper frame section, respectively, such that the first and second ends of the lower frame section are joined to inside surfaces of the first and second ends of the upper frame member;
   the elbow section being located between the front pillar lower section and the side sill section and having an outer surface formed flat from the front pillar lower section to the side sill section; and
   a side sill garnish formed separately from the side sill section and covering the side sill section, the side sill garnish having an outer surface made continuous with an outer surface of the fender panel.

8. The vehicle body side part structure of claim 7, wherein the side panel outer frame section is provided with a hot-stamped center pillar section, and door openings are formed in front of and behind the center pillar section.

9. The vehicle body side part structure of claim 8, wherein the center pillar section has an upper end and a lower end, the upper end being attached to an inner side of the side panel outer frame section, and the lower end of the center pillar section being attached to an outer side of the side panel outer frame section.

10. The vehicle body side part structure of claim 9, wherein the roof rail section of the side panel outer frame section is provided with a reinforcing member disposed inside the roof rail section and reinforcing the roof rail section, the roof rail section further has an extending section extending downward toward the center pillar section and placed over an outer surface of the upper end of the center pillar section, the upper end of the center pillar section is attached to an outer surface of the reinforcing member, and the lower end the center pillar section is attached to a side surface of the side sill section.

11. The vehicle body side part structure of claim 7, wherein:
 a first blank made of an ordinary steel sheet having a first thickness is used in the upper frame section of the side panel outer frame section, the first blank being press-formed;
 a second blank made of a high-tensile steel sheet having a second thickness is used in the front pillar lower section of the lower frame section; and
 a third blank made of a high-tensile steel sheet having a third thickness is used in the side sill section of the lower frame section, the second and third blanks being joined to form a composite blank, and the composite blank being press-formed.

12. A vehicle body side part structure including an inner side member provided on a side of a vehicle body and a side panel outer member covering the inner side member from the outside thereof, there being a closed section formed by the inner side member and the side panel outer member, wherein the side panel outer member comprises a side sill section extending in a longitudinal direction of the vehicle body, a front pillar lower section extending in a vertical direction of the vehicle body and formed integrally with the side sill section via an elbow section, an inner flange and an outer flange joined to the inner side member and formed continuously with the front pillar lower section, the side sill section, and the elbow section, and a substantially rectangular reinforcing member disposed in the elbow section and in the closed section, wherein the reinforcing member is provided with an inner joint portion formed at one corner of the substantially rectangular shape and joined to the inner flange, and an outer joint portion formed at another corner opposite the one corner and two edges on either side of the corner and joined to the outer flange, and the outer joint portion joined to the outer flange is formed in a substantially radial shape centered at the inner joint portion joined to the inner flange,
 wherein the outer joint portion of the reinforcing member is offset laterally inward from the inner joint portion, and the reinforcing member has a ridgeline formed so as to protrude toward the side panel outer member and disposed in a central area extending substantially radially from the inner joint portion toward the outer joint portion, and a reinforcing bead is formed astride the ridgeline.

13. The vehicle body side part structure of claim 12, wherein the reinforcing member is a jack-up base for accommodating a jack when the vehicle body is to be lifted.

14. The vehicle body side part structure of claim 12, wherein the reinforcing member has a cross-sectional variation for reinforcing the elbow section.

15. The vehicle body side part structure of claim 12, wherein the outer joint portion is formed so as to span a vertical section, a curved section, and a horizontal section of the elbow section, and the inner joint portion is formed only in a center portion of an arc of the curved section.

* * * * *